United States Patent [19]
Matsumoto et al.

[11] Patent Number: 5,256,950
[45] Date of Patent: Oct. 26, 1993

[54] WINDSHIELD WIPER ASSEMBLY AND SYNCHRONOUS SIGNAL GENERATING DEVICE FOR WINDSHIELD WIPER

[75] Inventors: Hiroshi Matsumoto, Hamamatsu; Hiroyuki Furukoshi, Toyohashi; Akio Oshiro, Hamamatsu, all of Japan

[73] Assignee: ASMO Co., Ltd., Osai, Japan

[21] Appl. No.: 738,256

[22] Filed: Jul. 30, 1991

[30] Foreign Application Priority Data

Nov. 29, 1990 [JP] Japan ................... 2-332153
Feb. 22, 1991 [JP] Japan ................... 3-028811
May 10, 1991 [JP] Japan ................... 3-105976

[51] Int. Cl.⁵ ................................. B60S 1/08
[52] U.S. Cl. ........................ 318/443; 318/DIG. 2
[58] Field of Search .............. 318/443, 444, DIG. 2; 15/250 R, 250.12, 250.17, 250.29

[56] References Cited

U.S. PATENT DOCUMENTS

| | | |
|---|---|---|
| 3,090,068 | 5/1963 | Brooks . |
| 3,721,878 | 3/1973 | Gumbert ................ 318/443 |
| 4,405,887 | 9/1983 | Tamura et al. ........... 318/443 |
| 4,431,954 | 2/1984 | Carpenter et al. ........ 318/443 |
| 4,585,980 | 4/1986 | Giles et al. . |
| 4,665,488 | 5/1987 | Graham et al. .......... 364/424 |
| 4,670,695 | 6/1987 | Licata et al. ............ 318/443 |
| 4,723,101 | 2/1988 | Bauer et al. . |
| 4,900,995 | 2/1990 | Wainwright ............ 318/443 |

FOREIGN PATENT DOCUMENTS

| | | |
|---|---|---|
| 2629885 | 1/1977 | Fed. Rep. of Germany . |
| 3441842A1 | 5/1986 | Fed. Rep. of Germany . |
| 3512941A1 | 10/1986 | Fed. Rep. of Germany . |
| 2316103 | 1/1977 | France . |
| 59-120551 | 7/1984 | Japan . |
| 1522521 | 8/1978 | United Kingdom . |
| 1522523 | 8/1978 | United Kingdom . |

Primary Examiner—Bentsu Ro
Attorney, Agent, or Firm—Venable, Baetjer, Howard & Civiletti

[57] ABSTRACT

A windshield wiper assembly which effects relatively smooth wiping motions as a pair of wiper blades are moved independently of each other such that the wiper blades do not interfere with each other. One wiper blade moving in a direction of approaching an overlapping area is stopped when that wiper blade has preceded the other wiper blade moving in a direction of moving away from the overlapping area by a first predetermined value or more. Meanwhile, the wiper blade moving in the direction of moving away from the overlapping area is stopped when that wiper blade has preceded the wiper blade moving in the direction of approaching the overlapping area by a second predetermined value or more exceeding the first predetermined value.

16 Claims, 41 Drawing Sheets

IN A CASE WHERE Dr MOVES TOWARD LOWER REVERSING POSITION
(Pa MOVES TOWARD UPPER REVERSING POSITION)

| $C_D - C_P$ | -3 | -2 | -1 | 0 | 1 | 2 | 3 |
|---|---|---|---|---|---|---|---|
| | Pa BRAKE | | Dr, Pa MOTORS ON | | Dr OFF | Dr BRAKE | |

IN A CASE WHERE Dr MOVES TOWARD UPPER REVERSING POSITION
(Pa MOVES TOWARD LOWER REVERSING POSITION)

| $C_P - C_D$ | -3 | -2 | -1 | 0 | 1 | 2 | 3 |
|---|---|---|---|---|---|---|---|
| | Dr BRAKE | | Dr, Pa MOTORS ON | | Pa OFF | Pa BRAKE | |

IN A CASE WHERE HYSTERESIS IS PROVIDED

WINDSHIELD WIPER ASSEMBLY AND SYNCHRONOUS SIGNAL GENERATING DEVICE FOR WINDSHIELD WIPER

BACKGROUND OF THE INVENTION

1. Field of the Invention

The present invention relates to a windshield wiper assembly and a synchronous signal generating device for a windshield wiper and, more particularly, to a windshield wiper assembly including a pair of wiper blades for wiping windshield glass and a pair of motors for moving the wiper blades independently of each other to effect wiping, as well as a synchronous signal generating device which can be used for the windshield wiper.

2. Description of the Related Art

Conventionally, a windshield wiper assembly is known which includes a pair of wiper blades and a pair of motors for moving the wiper blades, respectively, independently of each other to effect wiping. With this type of windshield wiper assembly, since each wiper blade is independently moved to effect wiping without using a link mechanism, there are cases where an interference of the wiper blades occurs. As a result, in order to prevent the interference, it is necessary to synchronize the wiping motions of the wiper blades by controlling the motors. U.S. Pat. No. 4,585,980 (Japanese Patent Application Laid-Open No. 59-120551) discloses such a synchronizing method in which one wiper blade is made to undergo a continuous wiping motion by continuously operating one motor, and only the other motor is subjected to on-off control in accordance with the angular positions of the two wiper blades.

With the above-described conventional technique, however, only one motor is subjected to on-off control. In addition there is another problem in that if the pair of wiper blades are stopped after they are brought in the vicinity of their lower reversing positions, the number of on-off operations of the motor increases during the starting period of wiper operation, i.e., during the early period of wiper operation when interference is most likely to occur. Furthermore, during high-speed running, the wiper blades are subjected to wind pressure, and the load acting on the wiper blades increases when they undergo wiping motions from an upper reversing position to a lower reversing position, whereas the load acting on them decreases when they undergo a wiping motion from the lower reversing position to the upper reversing position. For this reason, if the same synchronous control is effected irrespective of the wiping direction as in the conventional manner, there is a problem in that smooth, continuous wiping motions are hampered and the operational feeling deteriorates when the position of the driver-side wiper blade and that of the passenger-side wiper blade are considerably offset from their proper positions relative to each other.

FIG. 44 illustrates a conventional synchronous signal generating device used for synchronous control This synchronous signal generating device is attached to a side surface of a worm wheel 10, and has a cam plate 12 with toothed projections formed around its outer periphery. A sliding contact spring 14 is adapted to come into contact with each toothed projection of the cam plate 12, and a grounded sliding contact spring 15 is constantly brought into contact with the cam plate 12 in the vicinity of the toothed projections. According to this synchronous signal generating device, the rotation of the worm wheel 10 allows the sliding contact springs 14 and 15 to be made electrically conductive by means of the toothed projections of the cam plate 12, thereby outputting a synchronous signal consisting of a pulse train.

With the above-described synchronous signal generating device, however, if an attempt is made to produce a synchronous signal consisting of a multiplicity of pulses so as to accurately control the position of the wiper blade, it is necessary to increase the number of toothed projections formed around the outer periphery of the cam plate 12. If the number of the toothed projections is thus increased, the width of each toothed projection and the respective intervals between adjacent the toothed projections become small. Meanwhile, contacting portions of the sliding contact springs 14 and 15 are required to have areas of predetermined sizes. Hence, there is a problem in that limitations occur with respect to the pulse width of the synchronous signal produced, thereby making it impossible to output a synchronous signal consisting of a multiplicity of pulses. In addition, the increase in the number of toothed projections leads to increased production cost.

SUMMARY OF THE INVENTION

The present invention has been devised to overcome the above-described drawbacks of the conventional art, and it is a primary object of the present invention to provide a windshield wiper assembly capable of preventing the occurrence of an interference during an initial period of operation.

A second object of the present invention is to provide a windshield wiper assembly capable of ensuring relatively smooth wiping motions and, hence, improving the operational feeling of wiper blades by changing synchronous control in correspondence with the direction of the respective wiping motion.

A third object of the present invention is to provide a windshield wiper assembly in which the number of stopping operations of a motor is decreased by changing synchronous control in response to a leading wiper blade.

A fourth object of the present invention is to provide a synchronous signal generating device for a windshield wiper capable of outputting a synchronous signal consisting of a multiplicity of pulses whose pulse width and pulse interval are small for accurate control of the position of a respective wiper blade.

To attain the first object, in accordance with a first aspect of the present invention, there is provided a windshield wiper assembly comprising: a pair of wiper blades for wiping windshield glass; driving means for reciprocating the pair of wiper blades, respectively, independently of each other within wiping zones which partially overlap with each other a vicinity of lower reversing positions of the pair of wiper blades; detecting means for detecting respective positions of the pair of wiper blades; and control means for controlling the driving means on the basis of results of detection by the detecting means in such a manner that the pair of wiper blades is stopped in the vicinity of the respective lower reversing positions in the wiping zones thereof, and that the operation of one wiper blade is initiated after the other wiper blade has moved to an upper reversing position in the wiping zone.

To attain the second and third objects, in accordance with a second aspect of the present invention, there is provided a windshield wiper assembly comprising: a pair of wiper blades for wiping windshield glass; driving means for reciprocating the pair of wiper blades, respectively, independently of each other within wiping zones which partially overlap with each other in a vicinity of lower reversing positions of the pair of wiper blades; detecting means for detecting respective positions of the pair of wiper blades; determining means for determining on the basis of results of detection by the detecting means which of the wiper blade moving toward an upper reversing position in the wiping zone and the wiper blade moving toward the lower reversing position precedes the other; and control means for controlling the driving means on the basis of results of determination by the determining means in such a manner as to move the pair of wiper blades to effect wiping, and for controlling the driving means in such a manner that the wiper blade moving toward the lower reversing position is stopped when the wiper blade moving toward the lower reversing position has preceded the wiper blade moving toward the upper reversing position by a first predetermined value or more, and the wiper blade moving toward the upper reversing position is stopped when the wiper blade moving toward the upper reversing position has preceded the wiper blade moving toward the lower reversing position by a second predetermined value or more exceeding the first predetermined value.

The control means in accordance with this second aspect of the invention is capable of controlling the driving apparatus in such a manner that the wiper blade moving toward the lower reversing position is stopped suddenly when the wiper blade moving toward the lower reversing position has preceded the other wiper blade by a third predetermined value which is greater than the first predetermined value.

In addition, the control means in accordance with this second aspect of the invention is capable of controlling the driving apparatus in such a manner that the wiper blade moving toward the lower reversing position in a predetermined area in the wiping zone is stopped suddenly when the wiper blade moving toward the lower reversing position has preceded the other wiper blade by a third predetermined value which is greater than the first predetermined value.

To attain the aforementioned objects, in accordance with a third aspect of the present invention, there is provided a windshield wiper assembly comprising: a pair of wiper blades for wiping windshield glass; driving means for reciprocating the pair of wiper blades, respectively, independently of each other within wiping zones which partially overlap with each other in the vicinity of lower reversing positions of the pair of wiper blades; detecting means for detecting respective positions of the pair of wiper blades; determining means for determining on the basis of results of detection by the detecting means which of the pair of wiper blades precedes the other; and control means for controlling the driving means on the basis of the results of determination by the determining means in such a manner as to move the pair of wiper blades in the same direction so as to effect wiping, and for controlling the driving means in such a manner that the wiper blade moving in a direction of approaching an overlapping area is stopped when the wiper blade moving in the direction of approaching the overlapping area has preceded the wiper blade moving in a direction of moving away from the overlapping area by a first predetermined value or more, and that the wiper blade moving in the direction of moving away from the overlapping area is stopped when the wiper blade moving in the direction of moving away from the overlapping area has preceded the wiper blade moving in the direction of approaching the overlapping area by a second predetermined value or more exceeding the first predetermined value.

The control means in accordance with this third aspect of the invention is capable of controlling the driving means in such a manner that the wiper blade moving in the direction of approaching the overlapping area is stopped suddenly when the wiper blade moving in the direction of approaching the overlapping area has preceded by a third predetermined value or more exceeding the first predetermined value with the wiper blade moving in the direction of moving away from the overlapping area being located in the overlapping area or in a predetermined area including the overlapping area.

To attain the fourth object, in accordance with a fourth aspect of the present invention, there is provided a synchronous signal generating device for a windshield wiper, comprising: a speed-reducing mechanism having a plurality of gears and adapted to reduce a rotational speed of a rotating shaft of a motor so as to transmit torque of the motor to a driven shaft connected to a wiper arm; a rotating member secured to the rotating shaft of the motor in such a manner as to rotate with the rotating shaft of the motor; pulse signal generating means for generating a pulse signal in conjunction with a rotation of the rotating member; signal outputting means having a cam plate disposed on a driven shaft-side gear of the speed-reducing mechanism and a contact spring adapted to be brought into contact with the cam plate, the signal outputting means being adapted to output a signal which is set at a predetermined level within a predetermined range of a rotational angle of the driven shaft-side gear; and a logical circuit for allowing the pulse signal outputted from the pulse signal generating means to be passed therethrough as a synchronous signal when the signal is outputted from the signal outputting means.

A description will be given of the operation of the first aspect of the invention. The pair of wiper blades of this invention are reciprocated independently of each other in wiping zones which partially overlap with each other at their lower reversing positions. The position of each wiper blade undergoing a reciprocating motion is detected by each detecting means. On the basis of the results of detection by the detecting means, the control means stops the pair of wiper blades in the vicinity of the respective lower reversing positions in the wiping zones. When initiating the wiper blade operation, the control means controls the driving means in such a manner that the operation of one wiper blade is commenced after the other wiper blade has moved to the upper reversing position in its wiping zone. An overlapping area is present in the vicinity of the lower reversing positions, and although the pair of wiper blades is stopped in the vicinity of the lower reversing positions, since the operation of one wiper blade is commenced after the other wiper blade has moved to the upper reversing position in its wiping zone, the operation of one wiper blade is commenced after the other wiper blade has moved to the position farthest from the overlapping area. For this reason, it is possible to ensure that the wiper blades will not interfere with each other at the start of wiper operation.

The determining means in accordance with the second aspect of the invention determines on the basis of the results of detection by the detecting means which of the wiper blade moving toward the upper reversing position in the wiping zone and the wiper blade moving toward the lower reversing position precedes the other. The control means controls the driving means on the basis of the results of determination by the determining means in such a manner as to move the pair of wiper blades to effect wiping, and stops the wiper blade moving toward the lower reversing position when the wiper blade moving toward the lower reversing position has preceded the wiper blade moving toward the upper reversing position by a first predetermined value or more. In addition, the control means controls the driving means in such a manner that the wiper blade moving toward the upper reversing position is stopped when the wiper blade moving toward the upper reversing position has preceded the wiper blade moving toward the lower reversing position by a second predetermined value or more. This second predetermined value is a value greater than the first predetermined value. In a case where the wiper blade moving toward the lower reversing position precedes the wiper blade moving toward the upper reversing position, i.e., when the wiper blade approaching the overlapping area precedes the wiper blade leaving the overlapping area, there is a high possibility of interference between the wiper blades since the wiper blade moving toward the lower reversing position can enter the overlapping area before the wiper blade moving toward the upper reversing position leaves the overlapping area. Accordingly, even if the value of the preceding wiper blade is small, the preceding wiper blade is stopped so as to prevent interference between of the wiper blades.

On the other hand, in a case where the wiper blade moving toward the upper reversing position precedes the wiper blade moving toward the lower reversing position, i.e., when the wiper blade leaving the overlapping area precedes the wiper blade approaching the overlapping area, the possibility of interference between the wiper blades is small since the wiper blade moving toward the lower reversing position enters the overlapping area after the wiper blade moving toward the upper reversing position has left the overlapping area. For this reason, the wiper blade moving toward the upper reversing position is stopped when the wiper blade moving toward the upper reversing position has preceded the wiper blade moving toward the lower reversing position by the second predetermined value or more, thereby ensuring that the leading wiper blade will not be stopped until the value of the preceding wiper blade becomes large.

Thus, in the case in which there is a high possibility of interference, the wiper blade preceding the other wiper blade at a faster pace is stopped, and in the event that the possibility of interference is small, the preceding wiper blade is not stopped until the amount of difference between the positions of the wiper blades becomes large. This measure reduces the number of stopping operations of the wiper blades, thereby assuring relatively smooth wiping motions.

It should be noted that since synchronous control of the wiper blade is not required for an area where there is no possibility of interference, it suffices that the wiper blades are controlled only when the wiper blades are located in the overlapping area or in a predetermined area including the overlapping area.

In accordance with the second aspect of the invention, in the event that the wiper blade moving toward the lower reversing position has preceded the wiper blade moving toward the upper reversing position by the third predetermined value or more, i.e., when the amount of difference has become large in a state in which the possibility of interference is high, the wiper blade is stopped suddenly so that interference will not occur.

In addition, since an increase in the number of times when the wiper blade is stopped suddenly is likely to present a problem in terms of the operational feeling, it is effective to suddenly stop the wiper blade only when the wiper blade is located in a predetermined area within the wiping zone, e.g, in the overlapping area.

The pair of wiper blades in the above-described aspect of the invention reciprocates in mutually different directions in the wiping zones which partially overlap each other in the vicinity of their lower reversing positions, i.e., in such a manner that when one wiper blade moves toward the upper reversing position, the other wiper blade moves toward the lower reversing position. The pair of wiper blades in accordance with the third aspect of the invention which will be described below are reciprocated respectively in the same direction, i.e., in such a manner that when one wiper blade moves toward the upper reversing position, the other wiper blade also moves toward the upper reversing position. In a typical example of such a windshield wiper, the two wiping zones partially overlap in an area which is substantially defined by the upper reversing position of one wiper blade, a locus depicted by the lower end of that wiper blade, and a locus depicted by the upper end of the other wiper blade.

The determining means in accordance with the third aspect of the invention determines on the basis of results of detection by the detecting means which of the pair of wiper blades precedes the other. The control means controls the driving means on the basis of the results of determination by the determining means in such a manner as to move the pair of wiper blades in the same direction so as to effect wiping, and stops the wiper blade moving in a direction of approaching an overlapping area when the wiper blade moving in the direction of approaching the overlapping area has preceded the wiper blade moving in a direction of moving away from the overlapping area by a first predetermined value or more. In addition, the control means controls the driving means such that the wiper blade moving in the direction of moving away from the overlapping area is stopped when the wiper blade moving in the direction of moving away from the overlapping area has preceded the wiper blade moving in the direction of approaching the overlapping area by a second predetermined value or more. In a typical example, the direction of approaching the overlapping area is the direction of moving from the lower reversing position to the upper reversing position in a first wiping zone, and the direction of moving from the upper reversing position to the lower reversing position in a second wiping zone. The direction of moving away from the overlapping area is the direction opposite to the aforementioned direction. The second predetermined value is greater than the first predetermined value. In a case where the wiper blade moving in the direction of approaching the overlapping area precedes that wiper blade moving in the direction of moving away from the overlapping area, the possibility of interference is high since the wiper blade moving in the direction of approaching the overlapping area can enter the overlapping area before the wiper blade moving in the direction of moving away from the overlapping area leaves the overlapping area. Accordingly, when the preceding wiper blade has preceded the other by the first predetermined amount or more, i.e., even when the amount of the preceding wiper blade is small, the preceding wiper blade is stopped so as to prevent interference between the wiper blades.

On the other hand, in a case where the wiper blade moving in the direction of moving away from the overlapping area precedes the wiper blade moving in the direction of approaching the overlapping area, the possibility of interference is small since the wiper blade moving in the direction of approaching the overlapping area enters the overlapping area after the wiper blade moving in the direction of moving away from the overlapping area has left the overlapping area. For this reason, an arrangement is provided such that the wiper blade moving in the direction of moving away from the overlapping area is stopped when that wiper blade has preceded the wiper blade moving in the direction of approaching the overlapping area by the second predetermined value or more. Therefore the preceding wiper blade is not stopped until the value of the preceding wiper blade becomes large.

As described above, in a case where the possibility of occurrence of an interference is high, wiper blade preceding at a faster pace is stopped, and in a case where the possibility of occurrence of interference is small, the preceding wiper blade is not stopped until the amount of difference between the positions of the wiper blades becomes large. By adopting this measure, it is possible to reduce the number of times the wiper blade is stopped, thereby assuring relatively smooth wiping motions.

It should be noted that since synchronous control of the wiper blades is not required for the area in which there is no possibility of interference, it suffices that the wiper blades are controlled only when the wiper blades are located in the overlapping area or in a predetermined area including the overlapping area.

In accordance with the third aspect of the invention, when the wiper blade moving in the direction of approaching the overlapping area has preceded the wiper blade moving in the direction of moving away from the overlapping area by a third predetermined value or more with the wiper blade moving in the direction of moving away from the overlapping area being located in the overlapping area, i.e., when the possibility of interference is high and the amount of difference has become large, the wiper blade moving in the direction of approaching the overlapping area may be stopped suddenly so as to prevent the occurrence of interference. Thus, by suddenly stopping the wiper blade only when one wiper blade is located in the overlapping area, the number of times when the wiper blade is stopped suddenly can be reduced, thereby ensuring relatively smooth wiping motions.

The speed-reducing mechanism in accordance with the fourth aspect of the invention has a plurality of gears and is adapted transmit the torque of the motor to the driven shaft connected to the wiper arm after reducing the rotational speed of the rotating shaft of the motor. The rotating member is secured to the rotating shaft of the motor in such a manner as to rotate with the rotating shaft of the motor. The pulse signal generating means is provided for generating a pulse signal in conjunction with the rotation of the rotating member. The signal outputting means has a cam plate disposed on a driven shaft-side gear of the speed-reducing mechanism and a contact spring which is brought into contact with the cam plate, the signal outputting means outputting a signal which is set at a predetermined level within a predetermined range of the rotational angle of the driven shaft-side gear. The logical circuit allows the pulse signal outputted from the pulse signal generating means to be passed therethrough as a synchronous signal when the signal is outputted from the signal outputting means. Since the driving shaft of the speed-reducing mechanism rotates by a multiplicity of revolutions while the driven shaft-side gear rotates by one revolution, it is possible to generate a synchronous signal consisting of a multiplicity of pulses by securing the rotating member onto the rotating shaft of the motor, i.e., the driving shaft of the speed-reducing mechanism, and by producing the pulse signal in conjunction with the rotation of the rotating member. In the case where a worm having one helical thread and a worm wheel having m teeth are used as the speed-reducing mechanism as in this aspect of the invention, since the worm rotates by m revolutions while the worm wheel rotates by one revolution, it is possible to produce the synchronous signal consisting of a number of pulses which corresponds to the number of the teeth of the worm wheel, i.e., a speed reduction ratio. Accordingly, it is possible to reduce the pulse width and pulse interval of the synchronous signal, without reducing the width of each toothed projection as in the conventional manner. It should be noted that, by increasing at least one of the number of teeth of the driven shaft-side gear of the speed-reducing mechanism and the number of rotating members, it is possible to generate a synchronous signal whose pulse width and pulse interval are further reduced.

As described above, in accordance with the first aspect of the invention, the operation of one wiper blade is initiated after the other wiper blade is moved to the upper reversing position, so that it is possible to obtain the advantage that a pattern of wiper operation in which the mutual interference of the wiper blades is unlikely to occur can be obtained.

In addition, in accordance with the second and third aspects of the invention, in a case where that the possibility of occurrence of interference is high, the wiper blade preceding at a faster pace is stopped, and in a case where the possibility of interference is small, the preceding wiper blade is not stopped until the amount of difference becomes large. Therefore, it is possible to obtain the advantage that the number of times the wiper blade is stopped can be reduced, thereby assuring relatively smooth wiping motions.

Further, in the above-described aspects of the invention, since the preceding wiper blade is stopped suddenly when the amount of difference has become large in a state in which the possibility of occurrence of interference is high, it is possible to obtain the advantage that interference between the wiper blades can be prevented efficiently.

Also, if the area in which each wiper blade is subjected to a sudden stop is restricted, it is possible to obtain the advantage that the number of times the wiper blade is stopped suddenly can be reduced, thereby assuring relatively smooth wiping motions.

In accordance with the fourth aspect of the invention, since the rotating member is secured to the rotating shaft of the motor so as to generate the synchronous signal consisting of a number of pulses which corresponds to a speed reduction ratio, it is possible to generate a synchronous signal whose pulse width and pulse interval are reduced without reducing the width of the toothed projections. As as result, it is possible to obtain the advantage that a synchronous signal capable of accurately controlling the positions of the wiper blades can be generated.

The above and other objects, features and advantages of the present invention will become more apparent from the following description of the invention when read in conjunction with the accompanying drawings.

DESCRIPTION OF THE PREFERRED EMBODIMENTS

Figure 1:
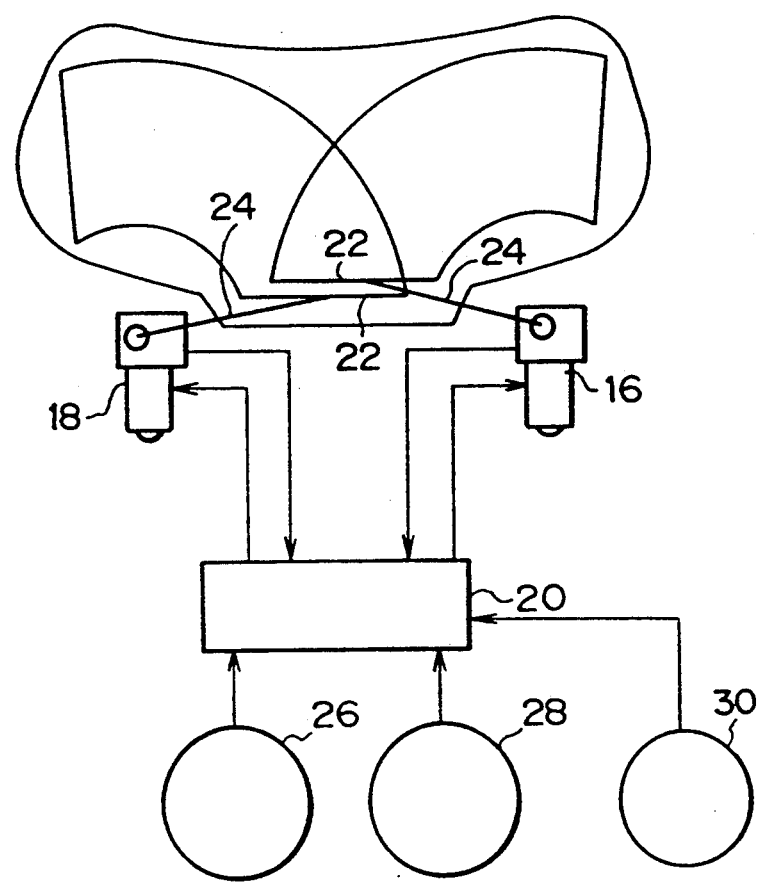
FIG. 1 is a schematic diagram of a windshield wiper assembly.

Referring now to the accompanying drawings, a detailed description will be given of a first embodiment of the present invention. FIG. 1 schematically illustrates a windshield wiper assembly in accordance with the first embodiment. This wiper assembly comprises a driver-side (Dr-side) driving device 16 and a passenger-side (Pa-side) driving device 18 each having a motor. Ones of ends of wiper arm 24, each having a wiper blade 22 at the other end thereof, are connected to the driver-side driving device 16 and the passenger-side driving device 18, respectively. The driver-side driving device 16 and the passenger-side driving device 18 are connected to a control circuit 20 so as to supply synchronous signals, i.e., pulse signals, and reversing signals, i.e., cam signals, to the control circuit 20. The control circuit 20 controls the respective motors of the driver-side driving device 16 and the passenger-side driving device 18. Also connected to the control circuit 20 are a wiper switch 26, an ignition switch 28, and a washer switch 30 that are used to switch the wiper assembly on and off.

A detailed description will be given of the driver-side driving device 16 and the passenger-side driving device 18. It should be noted that since the arrangement of the driver-side driving device 16 and the arrangement of the passenger-side driving device 18 are the same, a description will be given hereinunder of only the driver-side driving device 16, and a description of the passenger-side driving device 18 will be omitted.

Figure 2:
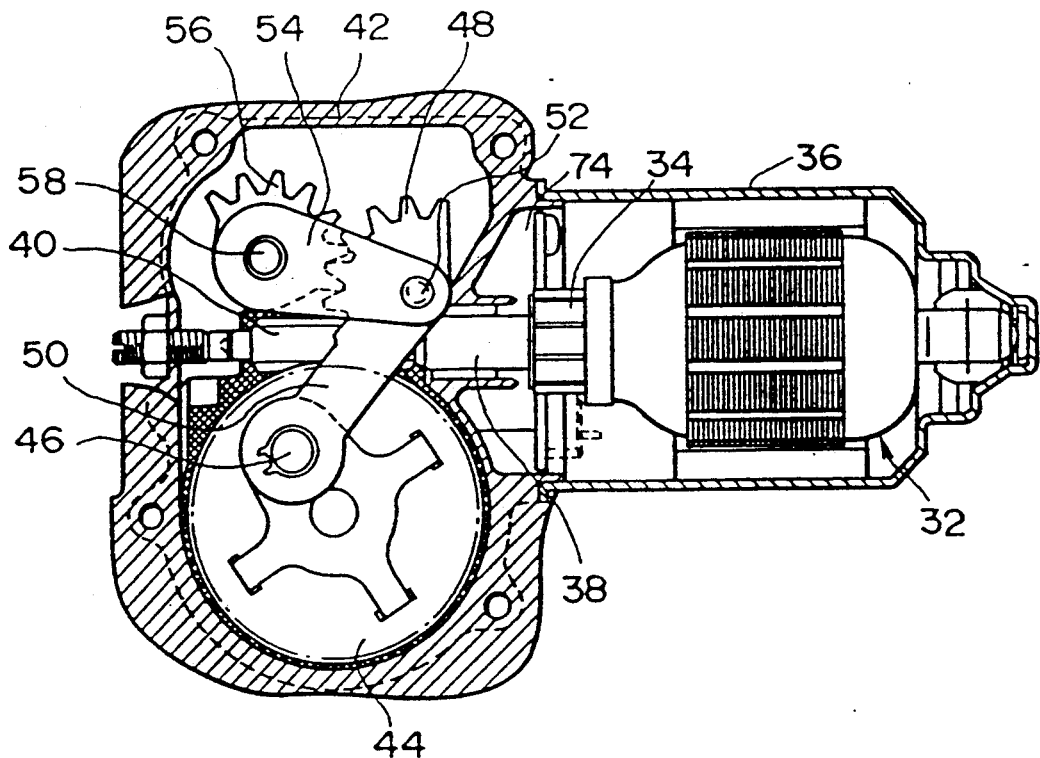
FIG. 2 is a cross-sectional view of a driving device for driving a wiper blade.

FIG. 2 illustrates a cross-sectional view of the driver-side driving device 16. A motor 32 having a commutator 34 is accommodated in a first casing 36 in such a manner that a rotating shaft 38 projects out of the opening side of the first casing 36. A worm 40 having one helical thread is secured to the tip of the rotating shaft 38.

A worm wheel 44 meshing with the worm 40 is rotatably accommodated in a second casing 42 coupled with the first casing 36. An eccentric shaft 46 is secured to one surface of the worm wheel 44 at a position eccentric with the rotational center of the worm wheel 44. One end of a first link 50 having a sector gear 48 formed at the other end thereof is rotatably supported on the eccentric shaft 46. A pin 52 is secured to a central portion of the sector gear 48. One end of a second link 54 is rotatably supported by the pin 52. In addition, a sector gear 56 meshing with the sector gear 48 is also provided. An output shaft 58 is secured to the center of the sector gear 56, and this output shaft 58 is rotatably supported by the second casing 42 such that one end thereof projects out of the second casing 42. The other end of the second link 54 is rotatably supported by this output shaft 58. A wiper arm (not shown) is connected to the tip of this output shaft 58.

Figure 3:
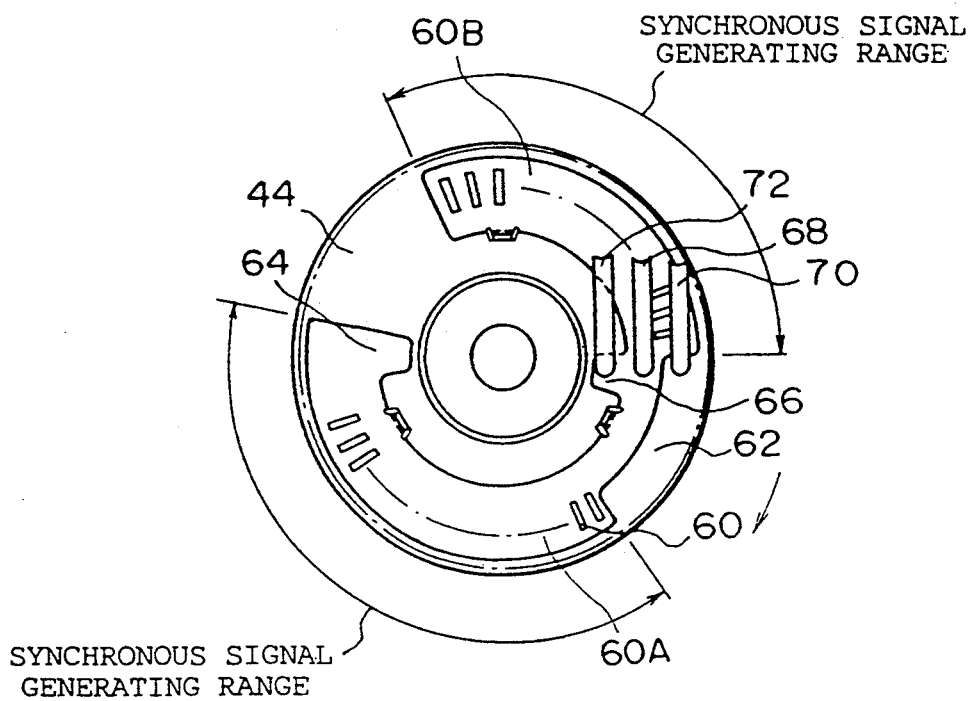
FIG. 3 is a schematic diagram of a driver-side position detecting device.

As shown in FIG. 3, a cam plate 60 constituting a position detector and formed of an electrically conductive material is secured to the other surface of the worm wheel 44 along the circumferential direction of the worm wheel 44. An upper reversing projection 64 and a lower reversing projection 66 which project toward the rotating shaft are respectively formed at positions of this cam plate 60 which oppose each other with the rotating shaft placed therebetween. The circumferentially opposite ends of the cam plate 60 oppose each other by being spaced apart by a predetermined distance, and a notched portion 62 is formed at a circumferentially central portion of the cam plate 60, so that the width thereof is smaller than that of the remaining portions. Toothed portions 60A and 60B, in which electrically conductive and nonconductive portions are arranged alternately by providing rectangular openings in the circumferential direction, are respectively provided between the notched portion 62 and the respective ends of the cam plate 60. A first contact spring 72 is disposed at a position which enables the same to come into contact with the upper reversing projection 64 and the lower reversing projection 66. A second contact spring 70 is disposed at a position which enables the same to come into contact with the toothed portions 60A and 60B. A grounded common contact spring 68 is disposed at a position which enables the same to come into contact with the remaining portion of the cam plate 60 where the toothed portions 60A and 60B are not formed.

The reason why the toothed portions 60A and 60B are formed in limited portions of the cam plate 60 is as follows: when one wiper blade moves from the lower reversing position to the upper reversing position, the other wiper blade moves from the upper reversing position to the lower reversing position, with the result that there is the possibility of interference until one wiper blade moves out of the overlapping area. Accordingly, the toothed portion 60B is disposed such that the signal is generated in an area in the vicinity of the lower reversing position when the wiper blade moves from the lower reversing position to the upper reversing position, while the toothed portions 60A is disposed such that the synchronous signal is generated in an area in the vicinity of the upper reversing position when the wiper blade moves from the upper reversing position to the lower reversing position. Since the one wiper blade is located in an area in the vicinity of the upper reversing position after the one wiper blade has moved out of the overlapping area, there is no possibility of interference even if the other wiper blade enters the overlapping area. Thus, tooth portions are not provided for the area in the vicinity of the upper reversing position when the wiper blade moves from the lower reversing position to the upper reversing position and in the area in the vicinity of the lower reversing position when the wiper blade moves from the upper reversing position to the lower reversing position, since the synchronous signal is not required for these areas.

Figure 4:
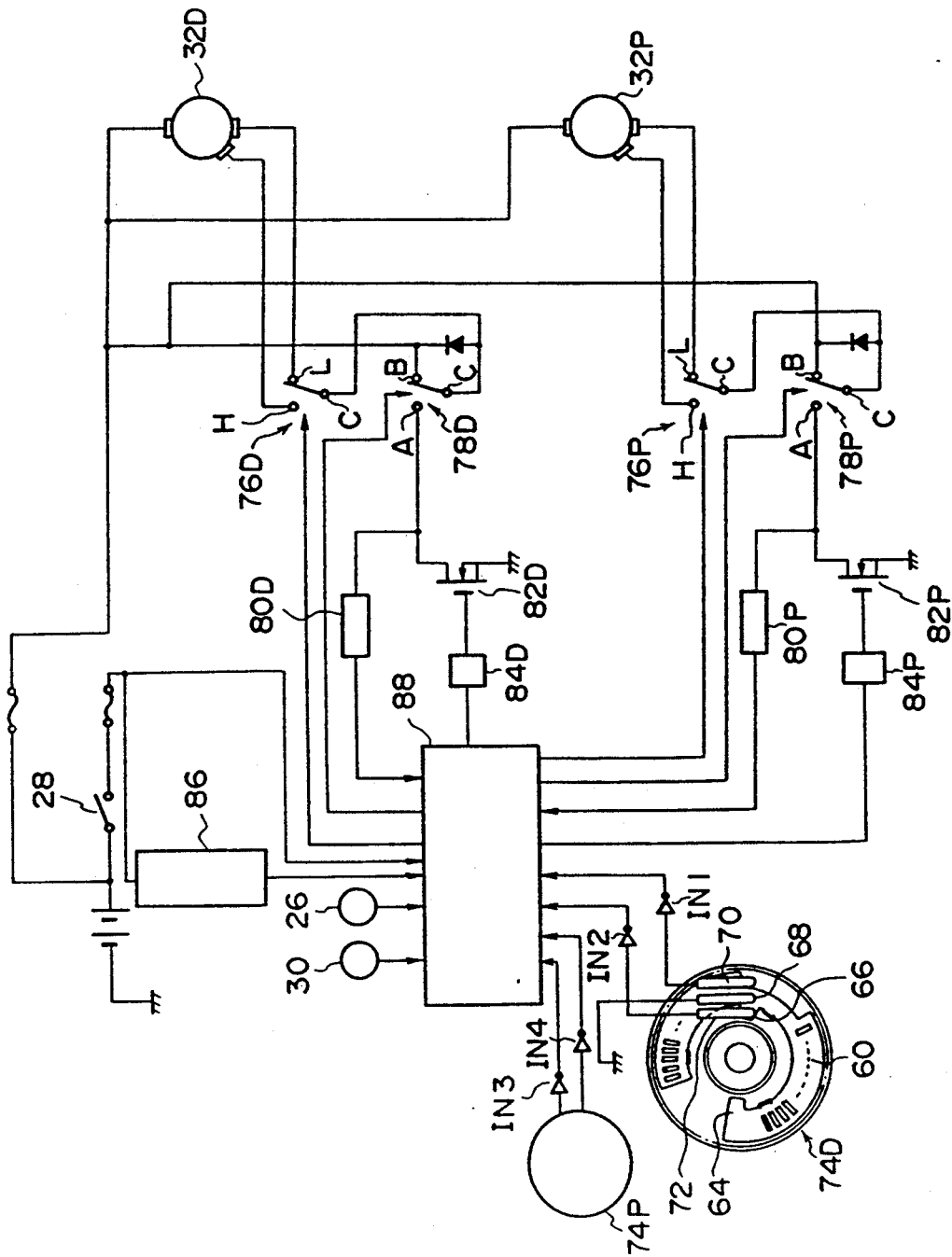
FIG. 4 is a circuit diagram illustrating details of a control circuit.

Referring now to FIG. 4, a detailed description will be given of details of the control circuit 20. The common brush of a driver-side motor 32D is connected to a vehicle mounted battery via a fuse. The high-speed brush of the driver-side motor 32D is connected to the contact H of a driver-side speed changeover switch 76D constituted by a relay, while the low-speed brush thereof is connected to the contact L of the driver-side speed changeover switch 76D. The common contact C of the driver-side speed changeover switch 76D is connected to the common contact C of a driver-side shortcircuiting switch 78D constituted by a relay. These common contacts C are constantly connected to the contact B of the driver-side shortcircuiting switch 78D. This contact B of the driver-side shortcircuiting switch 78D is connected to a power supply, while the contact A of the driver-side shortcircuiting switch 78D is connected to the drain of a driver-side FET 82D and is connected to an input port of a microcomputer 88 via a driver-side current detector 80D. The source of the driver-side FET 82D is grounded, and the gate thereof is connected to an output port of the microcomputer 88 via a driver-side driving circuit 84D.

A passenger-side motor 32P is connected in the same way as the driver-side motor 32D. A speed changeover switch 76P, a shortcircuiting switch 78P, a current detector 80P, an FET 82P, and a driving circuit 84P are provided on the passenger side in the same way as the driver side, and these components are connected in the same way as the driver side.

Figure 5:
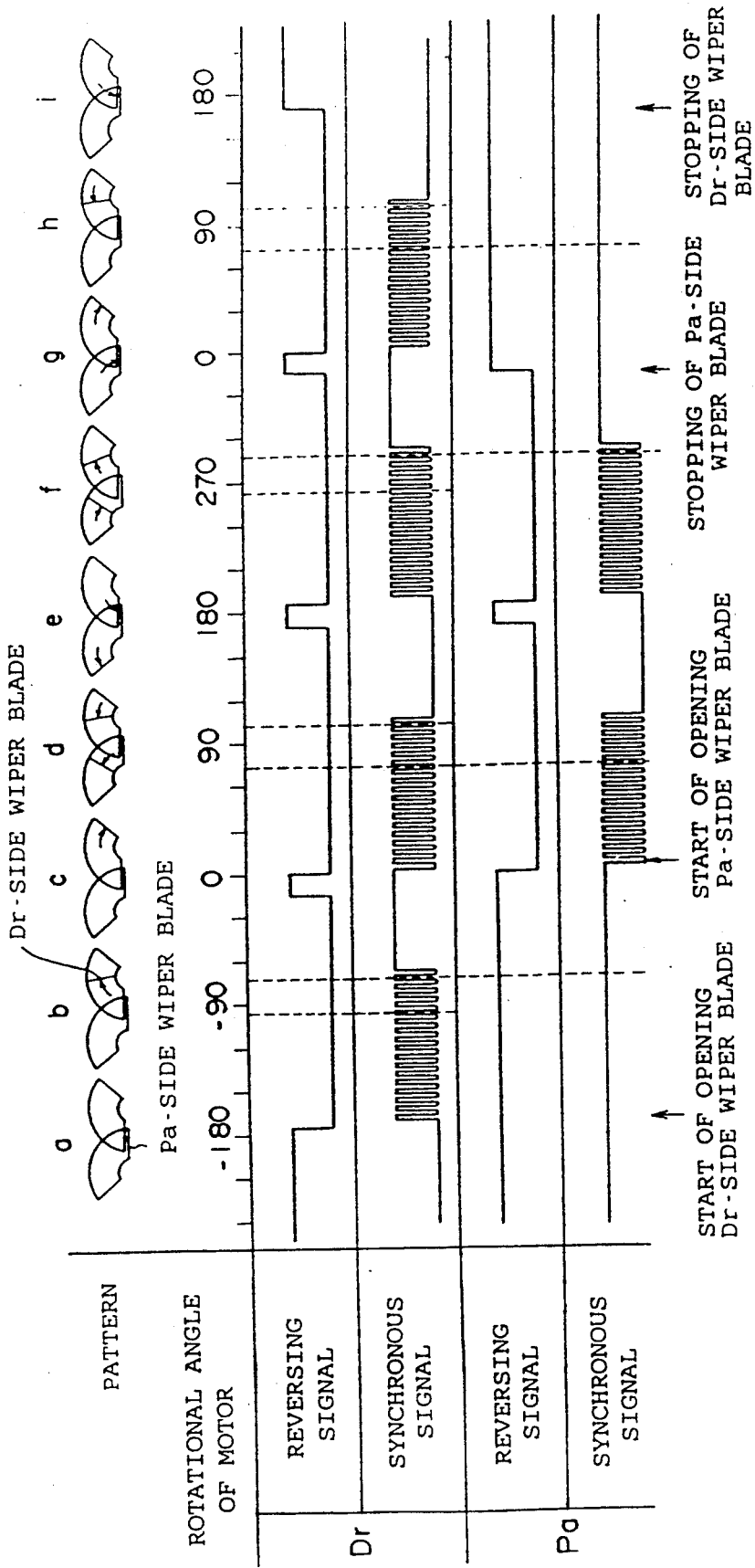
FIG. 5 is a diagram illustrating the relationship between a synchronous signal and a reversing signal on the one hand, and the position of a respective wiper blade on the other.

The power supply of the microcomputer 88 is connected to the vehicle-mounted battery, and a driver-side position detector 74D, a passenger-side position detector 74P, the wiper switch 26, the ignition switch 28, and the washer switch 30 are connected to the microcomputer 88 to deliver signal inputs thereto. It should be noted that reference characters IN1, IN2, IN3, and IN4 denote inverters. Next, the operation of the driving device will be described. As the rotating shaft 38 of the motor is rotated, the output shaft 58 is reciprocatingly rotated within the range of a predetermined angle via the worm 40, worm wheel 44, first link 50, sector gear 48, and sector gear 56, thereby causing the wiper arm 24 to swing. The worm wheel 44 is rotated in conjunction with the rotation of the rotating shaft 38, and when the rotation of the worm wheel 44 causes the common contact spring 68 and the second contact spring 70 to be made electrically conductive by means of the cam plate 60 of the position detector, the input terminal of the inverter is grounded via the second contact spring 70, the cam plate 60, and the common contact spring 68. Accordingly, as shown in FIG. 5, a synchronous signal which is a pulse signal which is at high level while the common contact spring 68 and the second contact spring 70 are conductive is outputted from the output terminal of the inverter. By counting the number of pulses of this synchronous signal, the position of the wiper blade 22 is detected, and the driver-side driving device 16 and the passenger-side driving device 18 are respectively controlled so that the driver-side wiper blade and the passenger-side wiper blade do not interfere with each other.

When the second contact spring 70 is brought into contact with the cam plate 60 and the first contact spring 72 is brought into contact with the upper reversing projection 64, a reversing signal indicating the upper reversing position of the wiper blade is outputted as shown in FIG. 5. On the other hand, when the second contact spring 70 is not in contact with the cam plate 60 and the first contact spring 72 is brought into contact with the lower reversing projection 66, a reversing signal indicating the lower reversing position of the wiper blade is outputted as shown in FIG. 5.

Figure 6:
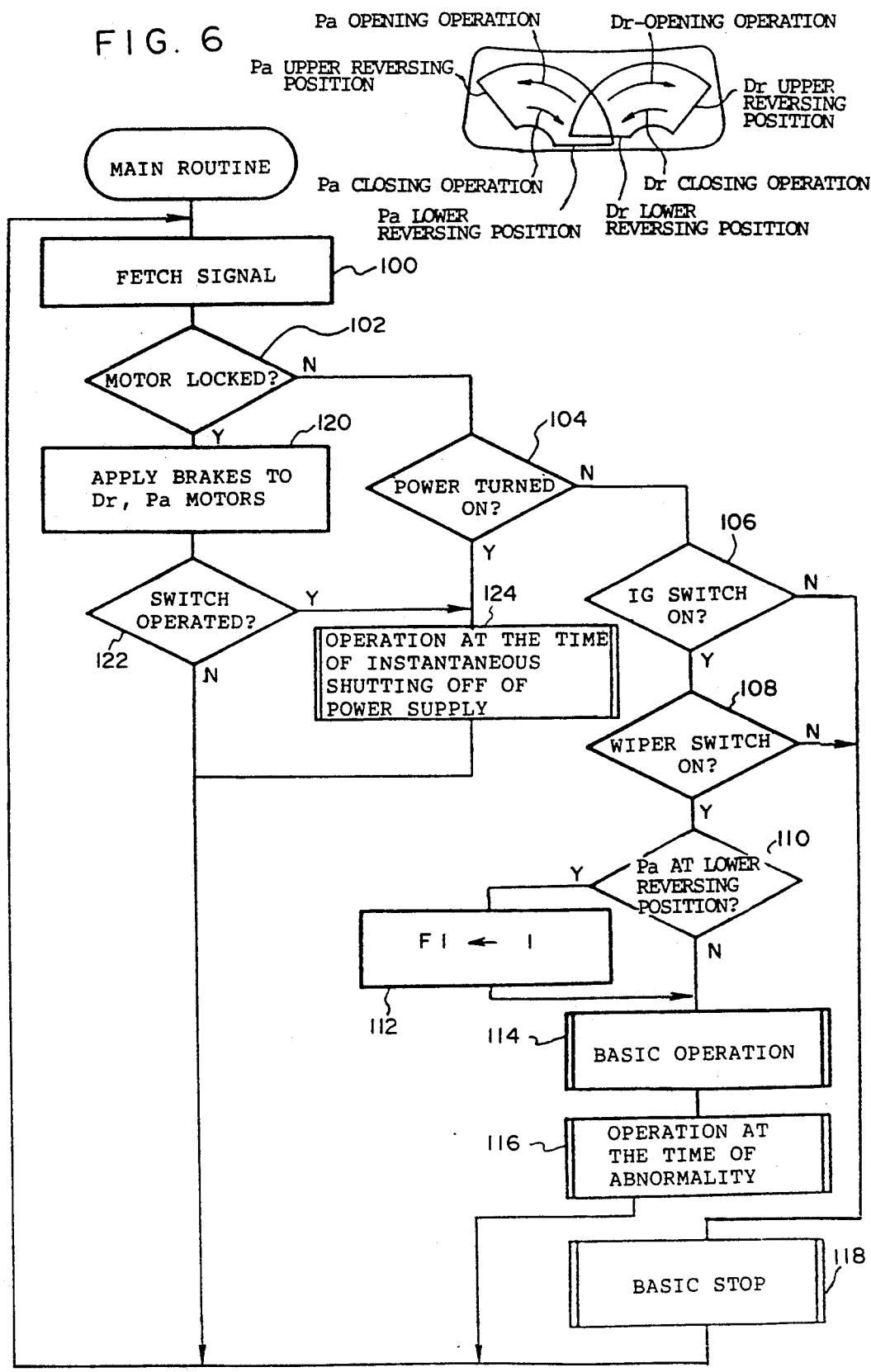
FIG. 6 is a flowchart illustrating a main routine according to first and second embodiments.

A description will now be given of a routine of the operation of the wiper blade by means of the microcomputer 88. FIG. 6 shows a main routine. In Step 100, signals outputted from the position detectors 74D, 74P, the current detectors 80D, 80P, and the like are fetched. In Step 102, a determination is made as to whether or not the current detected by the current detectors 80D, 80P is at a predetermined value or more for a predetermined time (e.g., 20 sec), so as to determine whether or not the motor 32D and/or the motor 32P is locked. If the motor is locked, an eddy current flows across the motor, so that the locked state of the motor can be detected by determining whether or not the current flowing across the motor is at a predetermined value or more. Alternatively, an arrangement may be provided such that a determination is made as to whether there has been no change in the signal from the first contact spring 72 or the second contact spring 70 for a predetermined time (e.g., 20 sec) or more, so as to determine whether the motor 32D and/or the motor 32P is locked. If the motor is locked, the synchronous signal and the reversing signal undergo no change, with the result that the locked state of the motor can be detected by adopting the above described measure. If it is determined that either or both of the motors 32D and 32P are locked, in Step 120, the respective common contacts C of the driver-side shortcircuiting switch 78D and the passenger-side shortcircuiting switch 78P are changed over to the contact B, which in turn causes the common brush and the high-speed brush (or low-speed brush) to be shortcircuited with each other for both the driver-side motor 32D and the passenger-side motor 32P, thereby applying brakes to the motors 32D and 32P and stopping them. In an ensuing Step 122, a determination is made as to whether any of the wiper switch, washer switch, and ignition switch has been operated. If any of the switches has been operated, in Step 124, the operation at the time of instantaneous shutting off of power supply, which will be described later, is conducted. If no switch has been operated, the process returns directly to Step 100.

If it is determined in Step 102 that neither of the motors is locked, a determination is made in Step 104 as to whether or not the power supply of the microcomputer 88 has been turned on. If the power supply has been turned on, the operation at the time of instantaneous shutting off of power supply is conducted in Step 124. If the power supply has not been turned on, determinations are made in Steps 106 and 108 as to whether the ignition switch (IG switch) has been turned on, or the wiper switch has been turned on. If either of the ignition switch and the wiper switch is off, a basic stopping operation which will be described later is conducted in Step 118, while if both of the ignition switch and the wiper switch are on, the process proceeds to Step 110. In Step 110, a determination is made as to whether or not the passenger (Pa) side wiper blade is at the lower reversing position on the basis of the reversing signals outputted from the driver-side position detector 74D and the passenger-side position detector 74P. If YES is the answer, in Step 112, a flag F1 is set, and after the basic operation which will be described later is conducted in Step 114, operation at the time of an abnormality, which will also be described later, is conducted in Step 116. If NO is the answer in Step 110, the process proceeds directly to Step 114.

Figure 7:
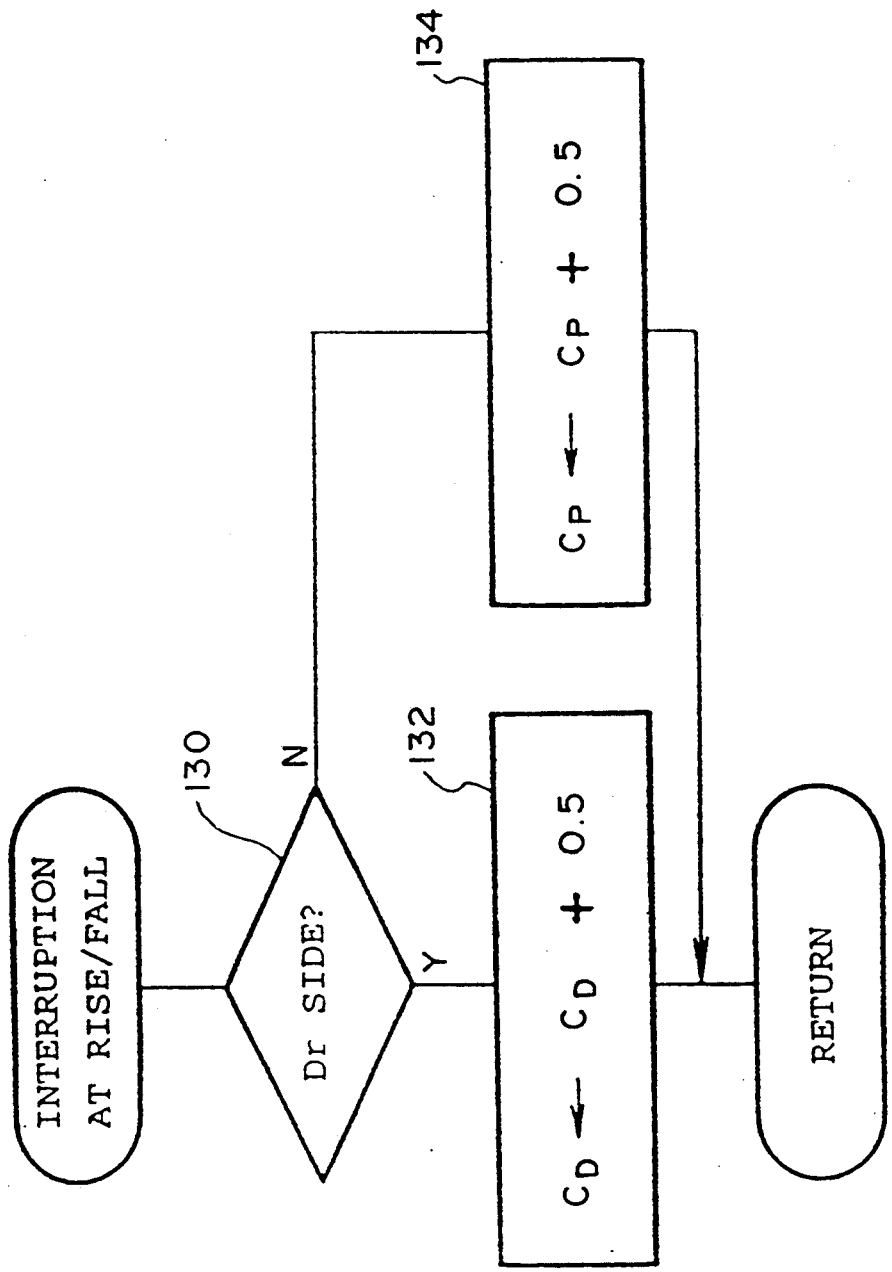
FIG. 7 is a flowchart illustrating an interruption routine which is executed at the rise or fall of the synchronous signal.

FIG. 7 shows an interruption routine which is executed when the synchronous signals outputted from the driver-side position detector 74D and the passenger-side position detector 74P have risen or fallen. In Step 130, a determination is made as to whether or not the risen or fallen synchronous signal has been outputted from the driver-side position detector 74D. If it is determined that the synchronous signal has been outputted from the driver-side position detector 74D, in Step 132, a driver-side count value $C_D$ is incremented by 0.5. Meanwhile, if it is determined in Step 130 that the risen or fallen synchronous signal has been outputted from the passenger-side position detector 74P, in Step 134, a passenger-side counter value $C_P$ is incremented by 0.5, and the process returns to the main routine.

As a result, the count values $C_P$ and $C_D$ are incremented by 1 each time one pulse is outputted from each position detector.

Figure 8:
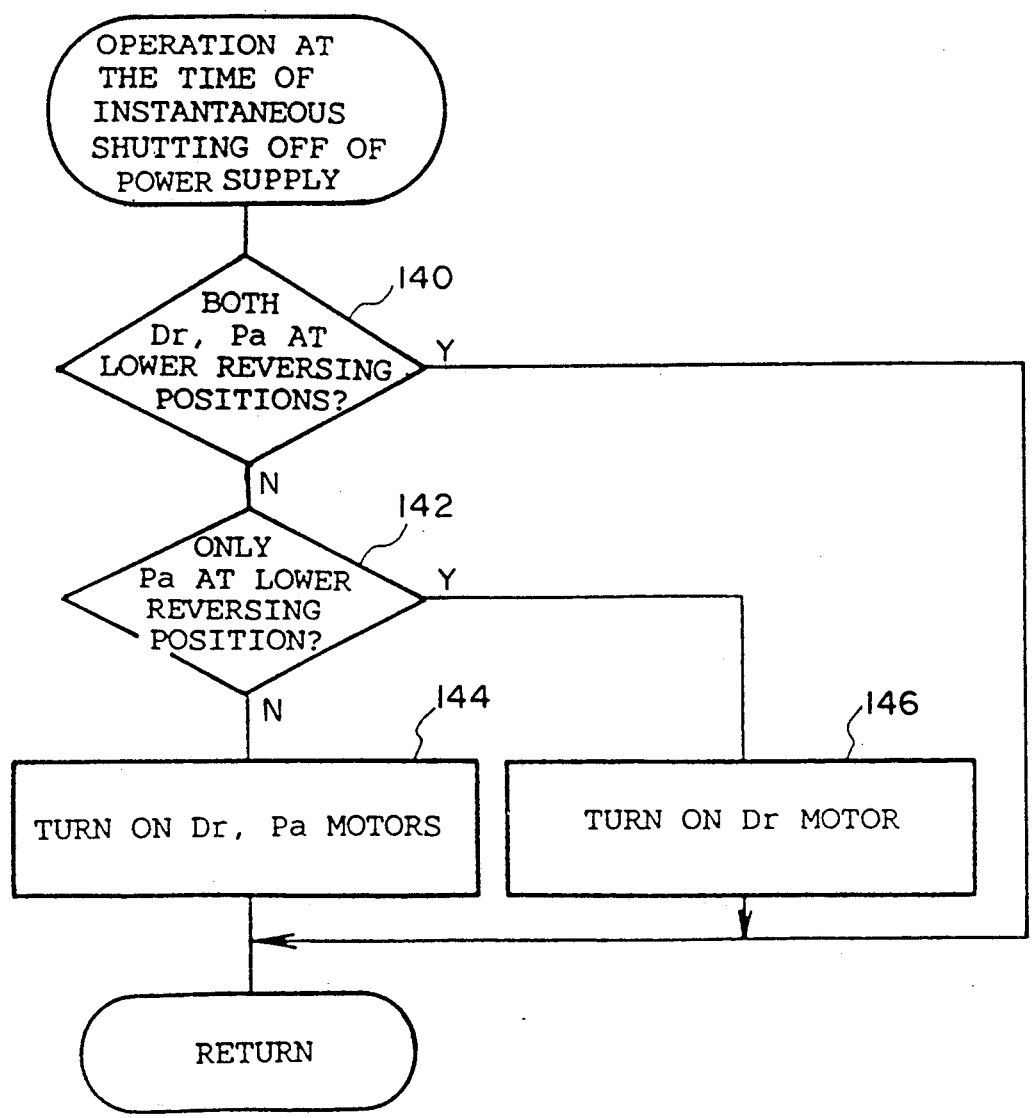
FIG. 8 is a flowchart illustrating a routine of operation at the time of instantaneous shutting off of power supply.

FIG. 8 illustrates details of the operation at the time of instantaneous shutting off of power supply in Step 124. In Step 140, a determination is made as to whether both of the driver-side wiper blade and the passenger-side wiper blade are located at their lower reversing positions on the basis of the reversing signals. If YES is the answer, the process proceeds directly to an ensuing step, while if NO is the answer, a determination is made in Step 142 as to whether only the passenger-side wiper blade is located at the lower reversing position. If only the passenger-side wiper blade is located at the lower reversing position, the driver-side motor 32D is turned on in Step 146, while if neither of the wiper blades is located at the lower reversing position, both the driver-side motor 32D and the passenger-side motor 32P are turned on in Step 144.

As a result, in the event that the power supply is instantaneously shut off due to some cause before the wiper blade is located at the lower reversing position, and the power supply is subsequently turned on, the motor of the wiper blade which is not located at the lower reversing position is turned on, so that the driver-side wiper blade and the passenger-side wiper blade are located at the lower reversing positions.

Figure 9:
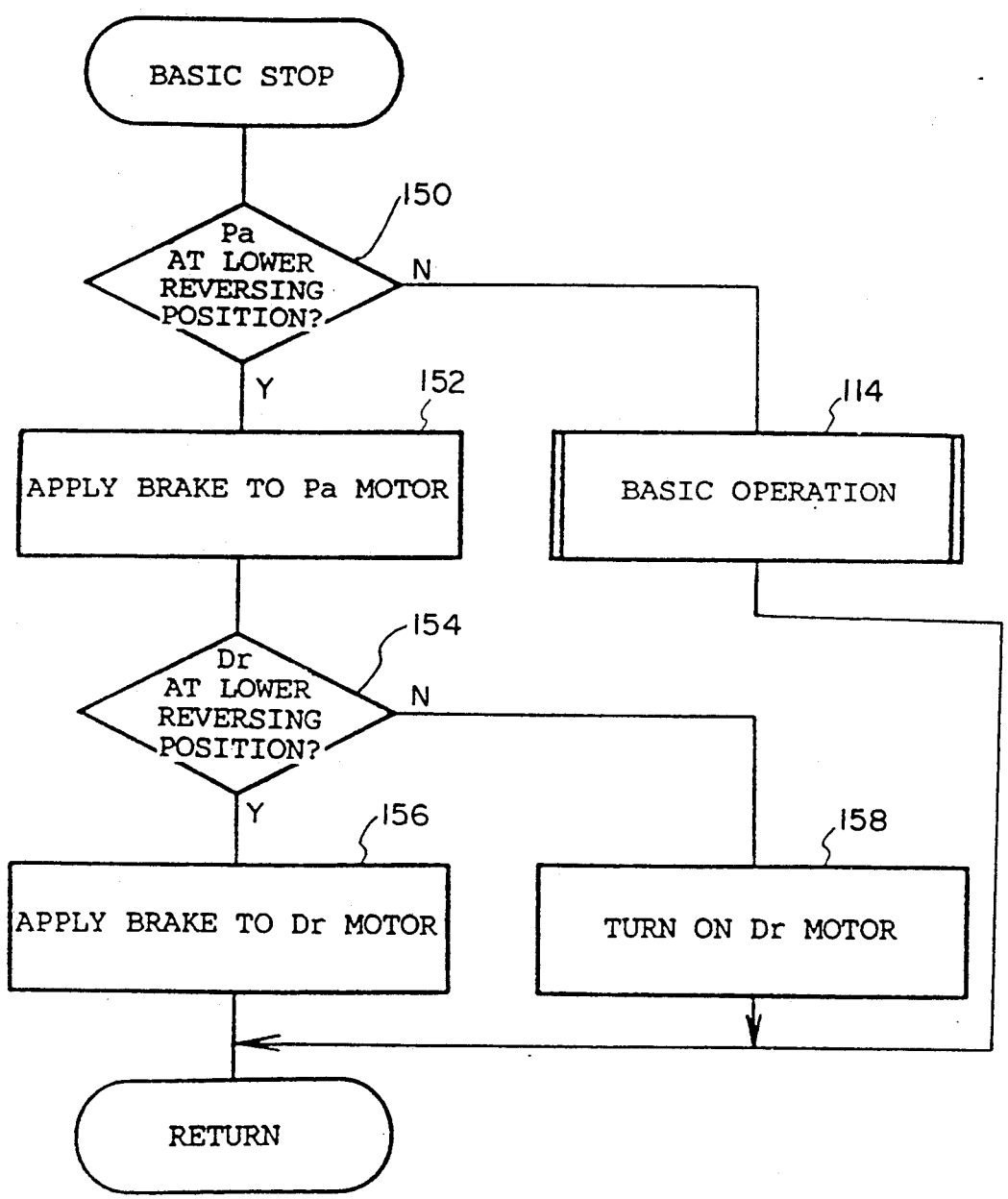
FIG. 9 is a flowchart illustrating a basic stopping routine.

FIG. 9 shows details of the basic stopping routine of Step 118. In Step 150, a determination is made as to whether or not the passenger-side wiper blade is located at the lower reversing position on the basis of the reversing signal. If it is not located at the lower reversing position, the basic operation is conducted in Step 114, and if it is located at the lower reversing position, the brushes of the passenger-side motor 32P are shortcircuited in Step 152 as described above, thereby applying a brake to the passenger-side motor 32P to stop the same. In Step 154, a determination is made as to whether the driver-side wiper blade is located at the lower reversing position. If the driver-side wiper blade is not located at the lower reversing position, the driver-side motor 32D is continued to be turned on in Step 158. When the driver-side wiper blade has reached the lower reversing position, the brushes of the driver-side motor 32D are shortcircuited in Step 156 to stop the driver-side motor 32D.

As a result, when the ignition switch or the wiper switch is turned off, after the passenger-side wiper blade is stopped at the lower reversing position by means of the brake, the driver-side wiper blade is stopped at the lower reversing position by means of the brake. This state is shown at g, h, and i of FIG. 5.

Figure 10:
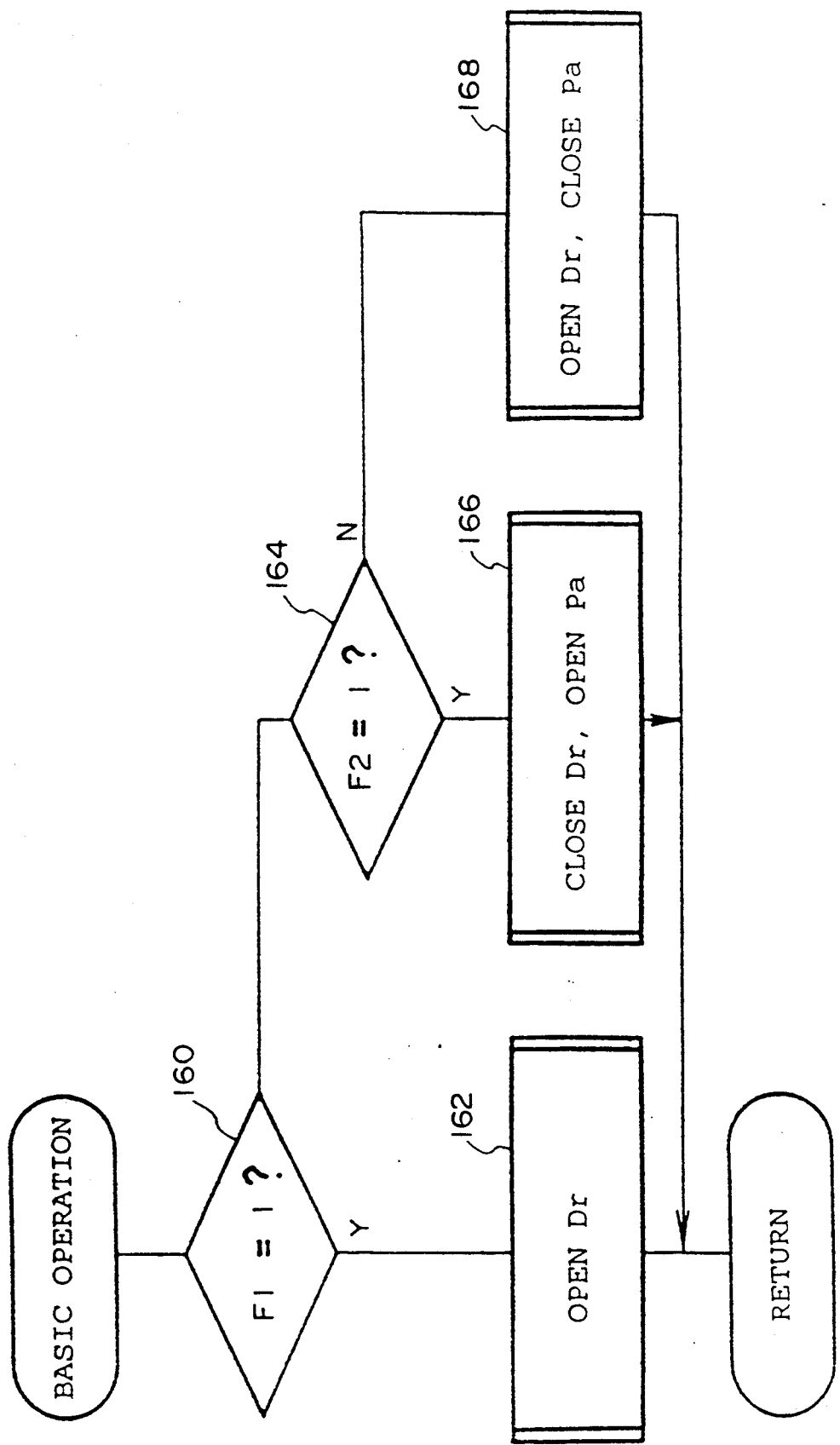
FIG. 10 is a flowchart illustrating a basic operation routine.

FIG. 10 shows the basic operation routine of Step 114. In Step 160, a determination is made as to whether the flag F1 has been set. If the flag F1 has been set, i.e., if the passenger-side wiper blade is located at the lower reversing position, in Step 162, the driver-side wiper blade is moved from the lower reversing position to the upper reversing position (this operation will be hereinafter referred to as the opening operation). If it is determined in Step 160 that the flag F1 has been reset, a determination is made in Step 164 as to whether a flag F2 has been set. If the flag F2 has been set, i.e., if the driver-side wiper blade is located at the upper reversing position and the passenger-side wiper blade at the lower reversing position, the driver-side wiper blade is moved from the upper reversing position to the lower reversing position (this operation will be hereinafter referred to as the closing operation) and, at the same time, the passenger-side wiper blade is made to undergo the opening operation. On the other hand, if the flag F2 has been reset, i.e., if the driver-side wiper blade is located at the lower reversing position and the passenger-side wiper blade at the upper reversing position, the driver-side wiper blade is made to undergo the opening operation, and the passenger-side wiper blade is made to undergo the closing operation.

Figure 11:
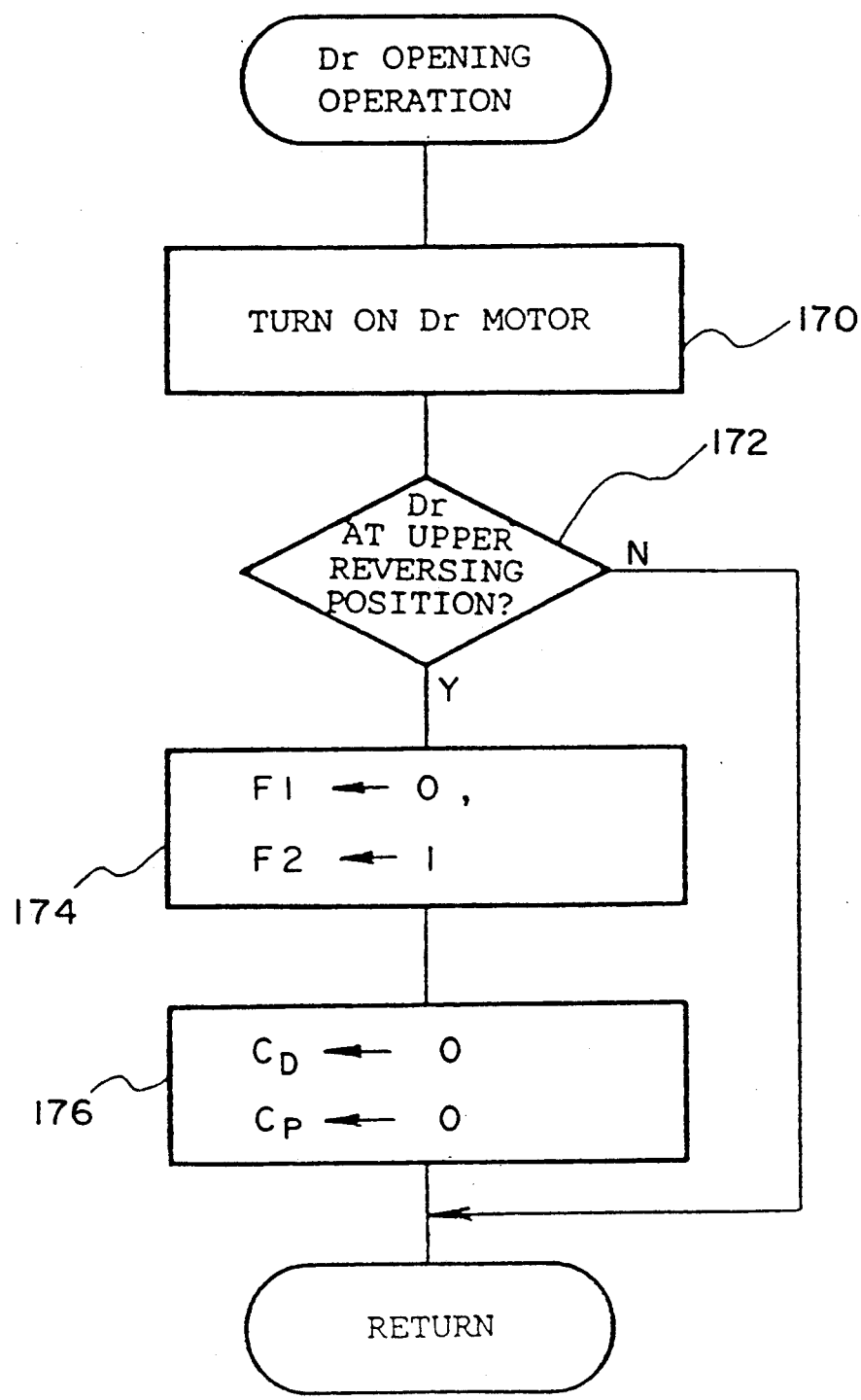
FIG. 11 is a flowchart illustrating a routine for opening the driver-side wiper blade.

FIG. 11 shows a detailed routine of the opening operation of the driver-side wiper blade in Step 162. In Step 170, the driver-side motor 32D is turned on, and a determination is made in Step 172 as to whether the driver-side wiper blade has reached the upper reversing position. If the driver-side wiper blade has reached the upper reversing position, in Step 174, the flag F1 is reset and the flag F2 is set. Then, the count values $C_D$ and $C_P$ are cleared in Step 176.

As a result, when the ignition switch and the wiper switch are turned on with the driver-side wiper blade and the passenger-side wiper blade located at the lower reversing positions, only the driver-side wiper blade is made to undergo the opening operation until it reaches the upper reversing position. This state is shown at a, b, and c in FIG. 5.

Figure 12:
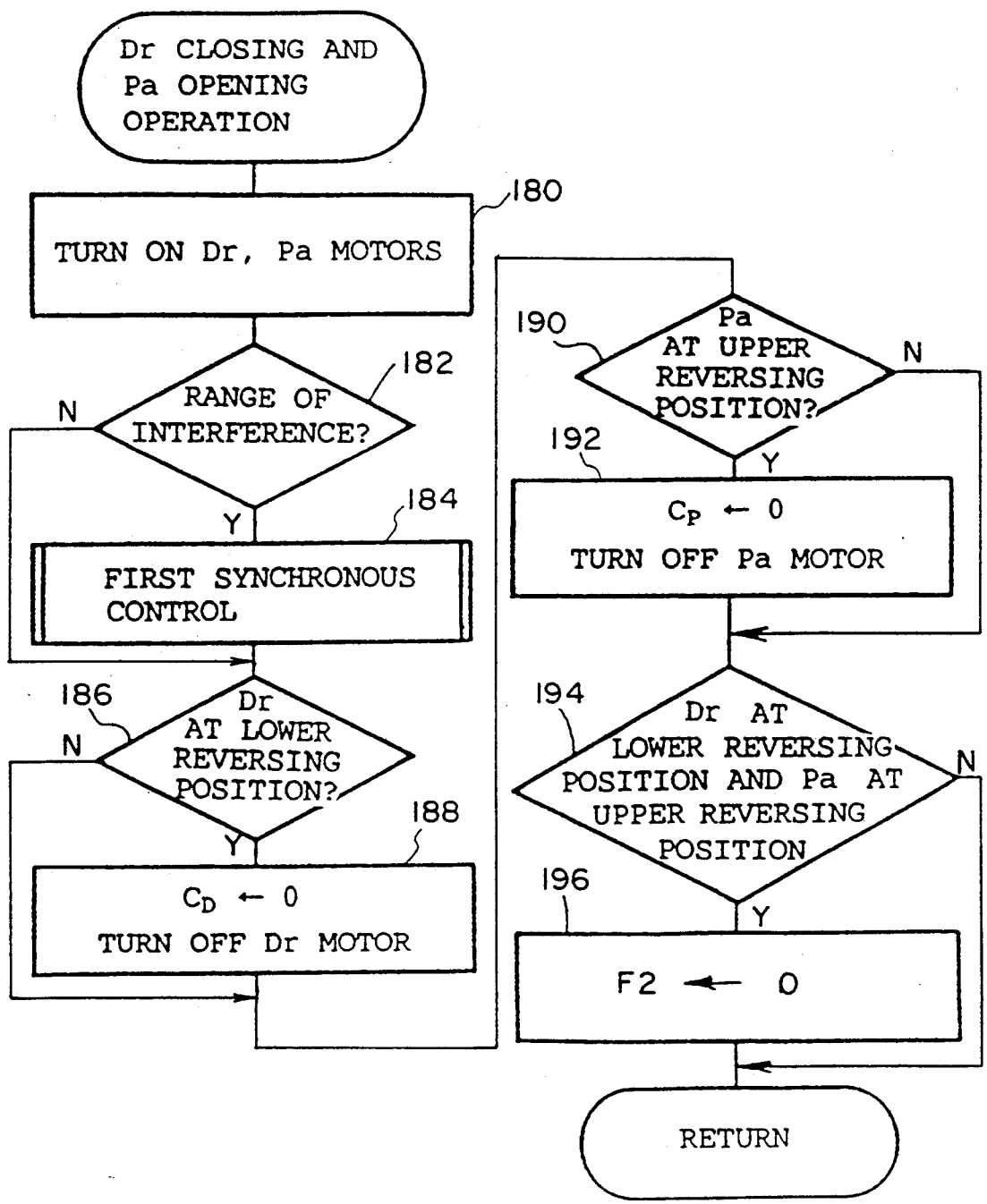
FIG. 12 is a flowchart illustrating a routine for closing the driver-side wiper blade and opening the passenger-side wiper blade.

FIG. 12 shows details of the routine of Step 166 in which the driver-side wiper blade is made to undergo the closing operation and the passenger-side wiper blade is made to undergo the opening operation. In Step 180, the driver-side motor 32D and the passenger-side motor 32P are turned on, and a determination is made in Step 182 as to whether synchronous signals have been outputted, so as to determine whether the wiper blades are in the range of interference. If they are in the range of interference, the first synchronous control which is described below is conducted in Step 184. In an ensuing Step 186, a determination is made as to whether or not the driver-side wiper blade has reached the lower reversing position, and if it has reached the lower reversing position, the count value $C_D$ is cleared, and the driver-side FET 82D is turned off, thereby turning off the driver-side motor 32D. In an ensuing Step 190, a determination is made as to whether the passenger-side wiper blade has reached the upper reversing position, and if it has reached the upper reversing position, in Step 192, the count value $C_P$ is cleared, and the passenger-side FET 82P is turned off, thereby turning off the passenger-side motor 32P. In an ensuing Step 194, a determination is made as to whether the driver-side wiper blade is located at the lower reversing position and the passenger-side wiper blade at the upper reversing position. If YES is the answer, the flag F2 is reset in Step 196.

As a result, at the time of effecting the operation of closing the driver-side wiper blade and opening the passenger-side wiper blade, the driver-side wiper blade is stopped temporarily at the lower reversing position and the count value $C_P$ is cleared, while the passenger-side wiper blade is temporarily stopped at the upper reversing position and the driver-side count value $C_D$ is also cleared.

Figure 13:
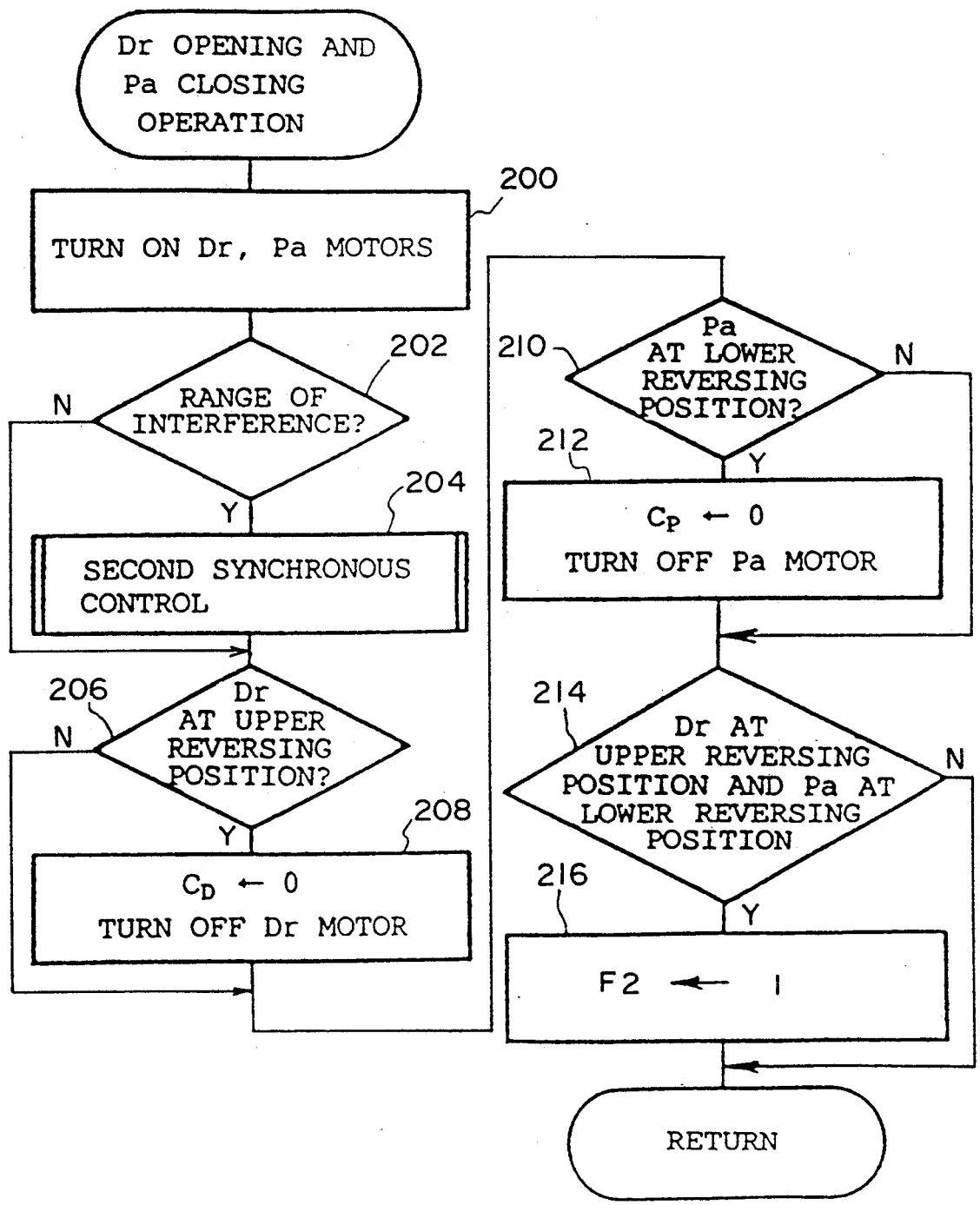
FIG. 13 is a flowchart illustrating a routine for opening the driver-side wiper blade and closing the passenger-side wiper blade.

FIG. 13 shows details of the routine of Step 168 in FIG. 12 in which the driver-side wiper blade is made to undergo the opening operation and the passenger-side wiper blade is made to undergo the closing operation. In Step 200, the driver-side motor 32D and the passenger-side motor 32P are turned on, and a determination is made in Step 202 as to whether the synchronous signals have been outputted, so as to determine whether the wiper blades are in the range of interference. If they are in the range of interference, the second synchronous control which will be described below is conducted in Step 204. In an ensuing Step 206, a determination is made as to whether the driver-side wiper blade is located at the upper reversing position, and if it is located at the upper reversing position, the count value $C_D$ is cleared and the driver-side motor 32D is turned off. In an ensuing Step 210, a determination is made as to whether the passenger-side wiper blade is located at the lower reversing position, and if it is located at the lower reversing position, in Step 212, the count value $C_P$ is cleared and the passenger-side motor 32P is turned off. In Step 214, a determination is made as to whether the driver-side wiper blade is located at the upper reversing position and the passenger-side wiper blade at the lower reversing position, and if YES is the answer, the flag F2 is set in Step 216.

As a result, at the time of effecting the operation of opening the driver-side wiper blade and closing the passenger-side wiper blade, when the driver-side wiper blade has reached the upper reversing position, the count value $C_D$ is cleared and the driver-side motor 32D is turned off, while when the passenger-side wiper blade has reached the lower reversing position, the count value $C_P$ is cleared and the passenger-side motor 32P is also turned off.

Figure 14:
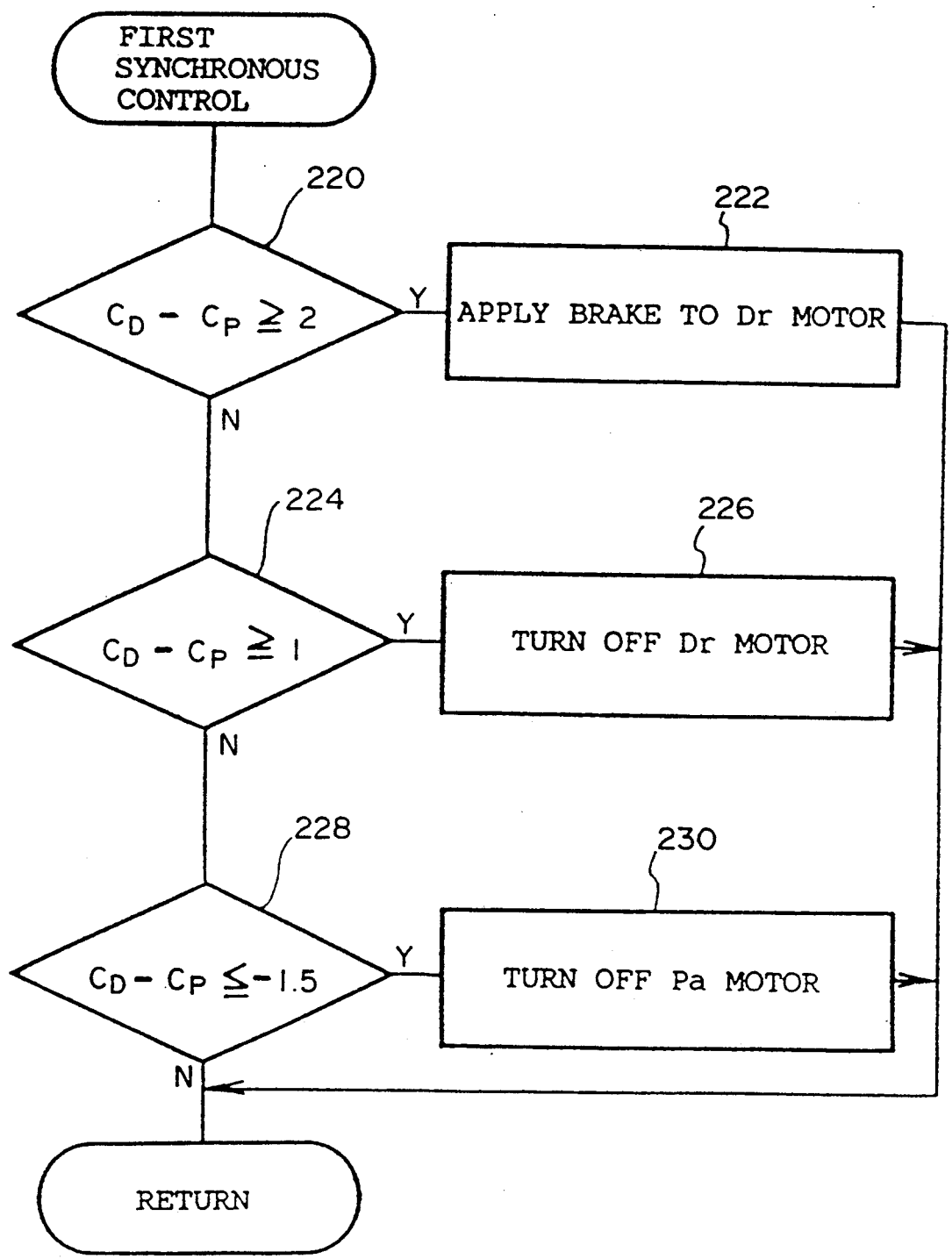
FIG. 14 is a flowchart illustrating a first synchronous control routine.

Referring now to FIG. 14, a description will be given of details of the first synchronous control of Step 184 in FIG. 12. In Step 220, a determination is made as to whether a difference (synchronization difference) $C_D-C_P$ in which the count value $C_P$ is subtracted from the count value $C_D$ is at a third predetermined value (e.g., 2) or more, so as to determine whether the driver-side wiper blade precedes the passenger-side wiper blade by the third predetermined value or more. If YES is the answer in Step 220, the brushes of the driver-side motor 32D are shortcircuited in Step 222 so as to apply a brake to the driver-side motor 32D and suddenly stop the same. If NO is the answer in Step 220, a determination is made in Step 222 as to whether the difference $C_D-C_P$ is at a first predetermined value (e.g., 1) or more. If YES is the answer in Step 224, the driver-side FET 82D is turned off to turn off the driver-side motor 32D. If NO is the answer in Step 224, a determination is made in Step 228 as to whether or not the difference $C_D-C_P$ is at a second predetermined value (e.g., $-1.5$) or less. If YES is the answer in Step 228, i.e., when the passenger-side wiper blade precedes the driver-side wiper blade by the second predetermined value or more, the passenger-side FET 82P is turned off, thereby turning off the passenger-side motor 32P.

Figure 24:
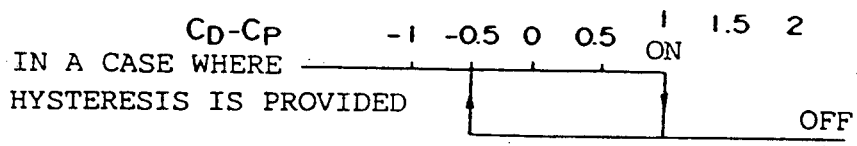
FIG. 24 is a diagram illustrating the on-off state of the driver-side wiper motor and the passenger-side wiper motor.

As a result, as shown in FIG. 24, at the time when the wiper blade undergoing the closing operation, i.e., the wiper blade entering the overlapping area, precedes the wiper blade undergoing the opening operation, i.e., the wiper blade leaving the overlapping area, by the first predetermined value or more, the motor of the wiper blade undergoing the closing operation is turned off to stop the wiper blade. In the event that the synchronization difference has arisen by the third predetermined value or more exceeding the first predetermined value, the motor of the leading wiper blade is suddenly stopped by application of a brake thereto. In addition, in a case where the leading wiper blade is the one leaving the overlapping area, the possibility of occurrence of interference is small. Hence, a measure is provided such that the motor of the leading wiper blade is not stopped until the leading wiper blade precedes the other wiper blade by the second predetermined value or more which is a level at which a problem arises in the operational feeling in terms of for example, the driver's sense of sight. The number of the on-off operations of the motor is reduced by the aforementioned measure.

Figure 15:
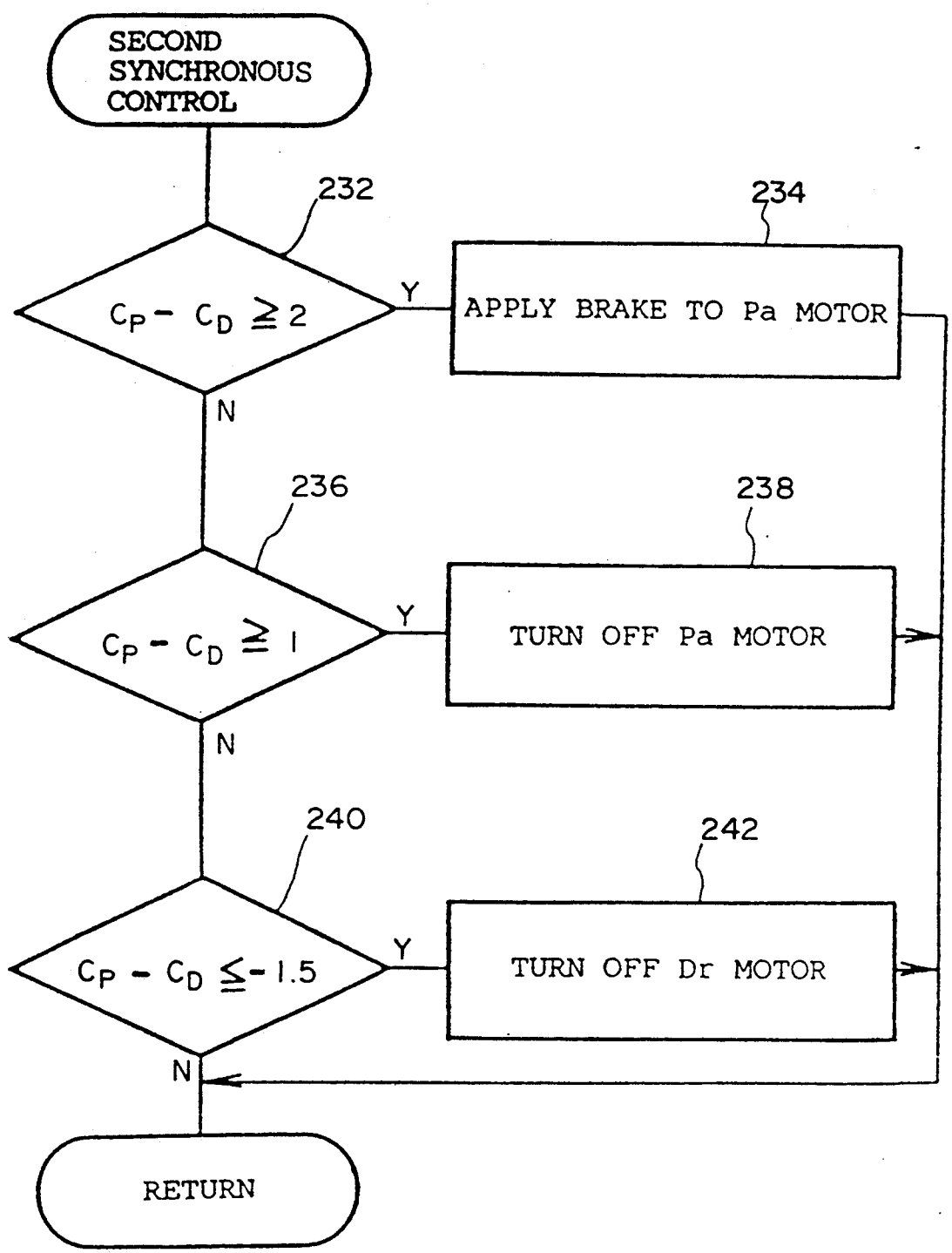
FIG. 15 is a flowchart illustrating a second synchronous control routine.

FIG. 15 shows details of the second synchronous control routine of Step 204 in FIG. 13. In Step 232, a determination is made as to whether or not the difference $C_P-C_P$ in which the count value $C_D$ is subtracted from the count value $C_P$ is at the third predetermined value (e.g., 2) or more. If YES is the answer, the passenger-side motor 32P is suddenly stopped by a brake in Step 234. If NO is the answer in Step 232, a determination is made in Step 236 as to whether the difference $C_P-C_D$ is the first predetermined value (e.g., 1) or more. If YES is the answer in step 236, the passenger-side FET 82P is turned off in Step 238, thereby turning off the passenger-side motor 32P. If NO is the answer in Step 236, a determination is made in Step 240 as to whether the difference $C_P-C_D$ is the second predetermined value (e.g., $-1.5$) or less, so as to determine whether the driver-side wiper blade precedes the passenger-side wiper blade by the second predetermined value or more. If YES is the answer in Step 240, the driver-side FET 82D is turned off in Step 242, thereby turning off the driver-side motor 32D.

As a result, in the same way as described above, when the wiper blade undergoing the closing operation precedes the other wiper blade by the first predetermined value or more, the motor of the wiper blade undergoing the closing operation is stopped. In addition, when the wiper blade undergoing the closing operation precedes the other wiper blade by the third predetermined value or more, the motor of the leading wiper blade is suddenly stopped by a brake. Meanwhile, when the wiper blade undergoing the opening operation precedes, the other wiper blade the possibility of occurrence of interference is to small. Therefore a measure is provided to not turn off the motor of the leading wiper blade until the wiper blade undergoing the opening operation precedes the other wiper blade by the second predetermined value or more.

Figure 16:
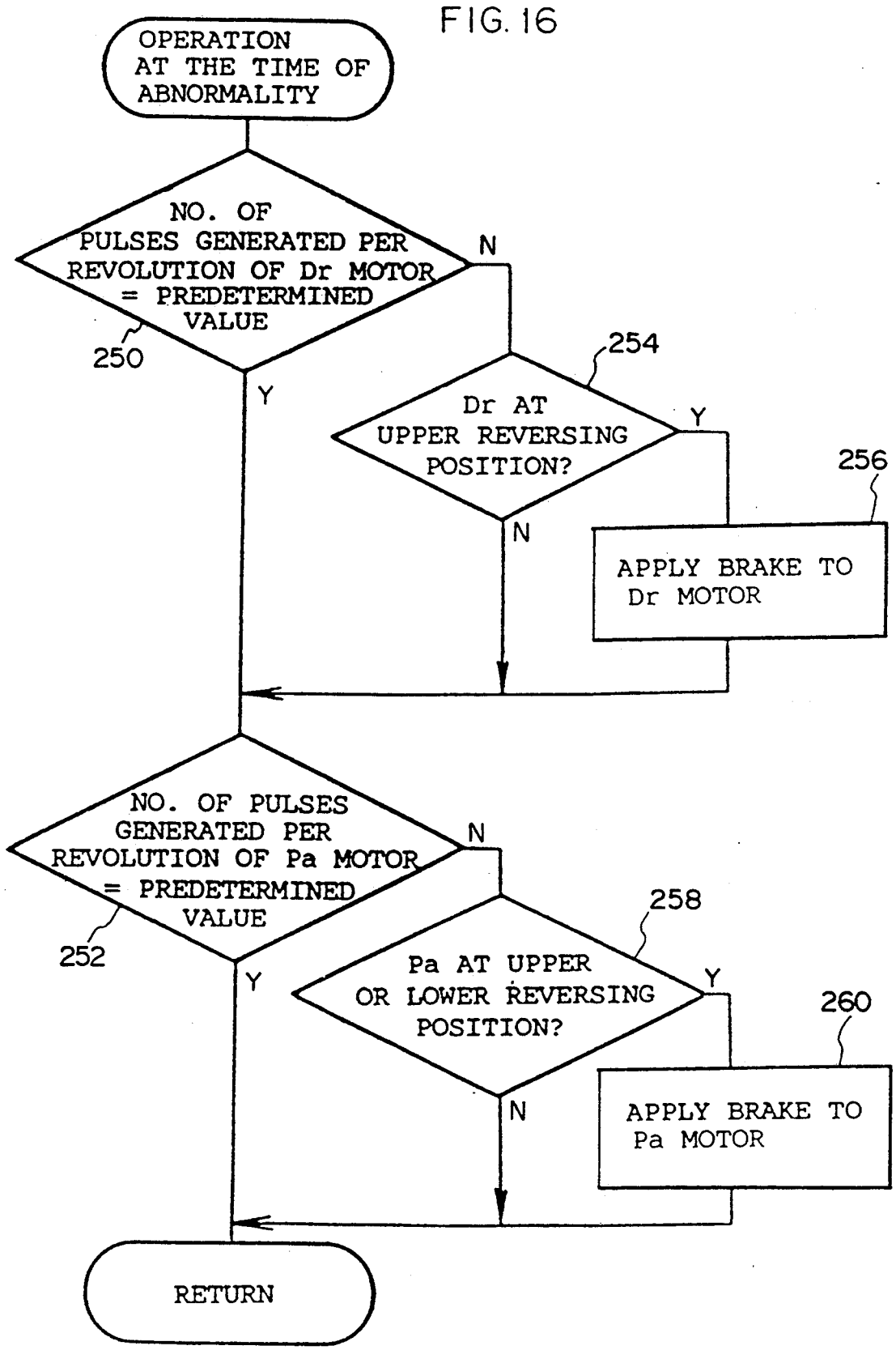
FIG. 16 is a flowchart illustrating a routine of operation at the time of an abnormality.

FIG. 16 shows details of the routine of operation at the time of an abnormality referred to in Step 116 in FIG. 6. In Step 250, a determination is made as to whether the count value $C_D$ at the time when the driver-side motor 32D has undergone one revolution is a predetermined value (corresponding to the number of pulses during normal operation when the motor 32D has undergone one revolution). If YES is the answer, the operation is normal, and a determination is made in Step 252 as to whether the count value $C_P$ at the time when the passenger-side motor 32P has undergone one revolution is a predetermined value (corresponding to the number of pulses during normal operation when the motor 32P has undergone one revolution). If YES is the answer, the operation is normal, and the process proceeds to an ensuing step. If NO is the answer in Step 250, the count value $C_D$ is abnormal. A determination is then made in Step 254 as to whether the driver-side wiper blade is located at the upper reversing position. If the driver-side wiper blade is located at the upper reversing position, a brake is applied to the driver-side motor 32D in Step 256 to stop the driver-side wiper blade, and only the passenger-side wiper blade is operated. If NO is the answer in Step 252, the count value $C_P$ is abnormal. Hence, a determination is made in Step 258 as to whether the passenger-side wiper blade is either of located at the upper or lower reversing positions. If YES is the answer, a brake is applied to the passenger-side motor 32P in Step 260 so as to stop the passenger-side wiper blade, and only the driver-side wiper blade is operated.

Figure 17:
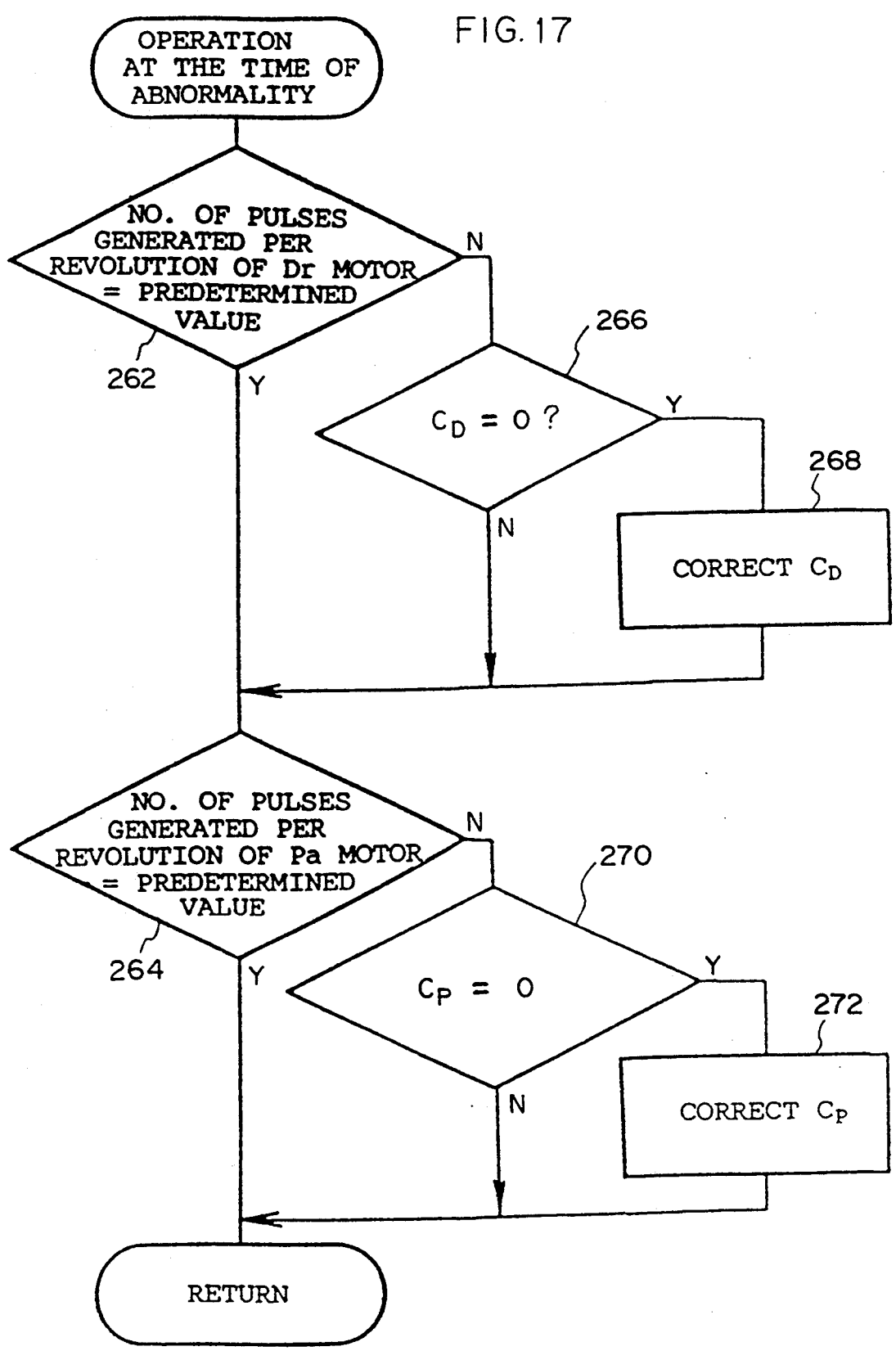
FIG. 17 is a flowchart illustrating a modification of the routine of operation at the time of an abnormality.

FIG. 17 shows another routine of operation at the time of an abnormality. In Step 262, in the same way as FIG. 16, a determination is made as to whether the count value at the time when the driver-side motor 32D has undergone one revolution is a predetermined value. If it is not the predetermined value, a determination is made in Step 266 as to whether the count value $C_D$ has been cleared. If the count value $C_D$ has been cleared, the wiper blade is at the upper reversing position or the lower reversing position, so that, in Step 266, the count value $C_D$ is corrected by the difference between the count value and the predetermined value. In an ensuing Step 264, in the same way as Step 252, a determination is made as to whether the count value at the time when the passenger-side motor 32P has undergone one revolution is a predetermined value. If it is not the predetermined value, a determination is made in Step 270 as to whether the count value $C_P$ has been cleared. If the count value $C_P$ has been cleared, in Step 272, the count value $C_P$ is corrected by the difference between the count value $C_P$ and the predetermined value.

As a result, even in cases where the number of pulses occurring during rotation of the motor has become abnormal and the count values have become abnormal due to electric noise or the like, it is possible to accurately control the positions of the wiper blades by correcting the count values.

Figure 18:
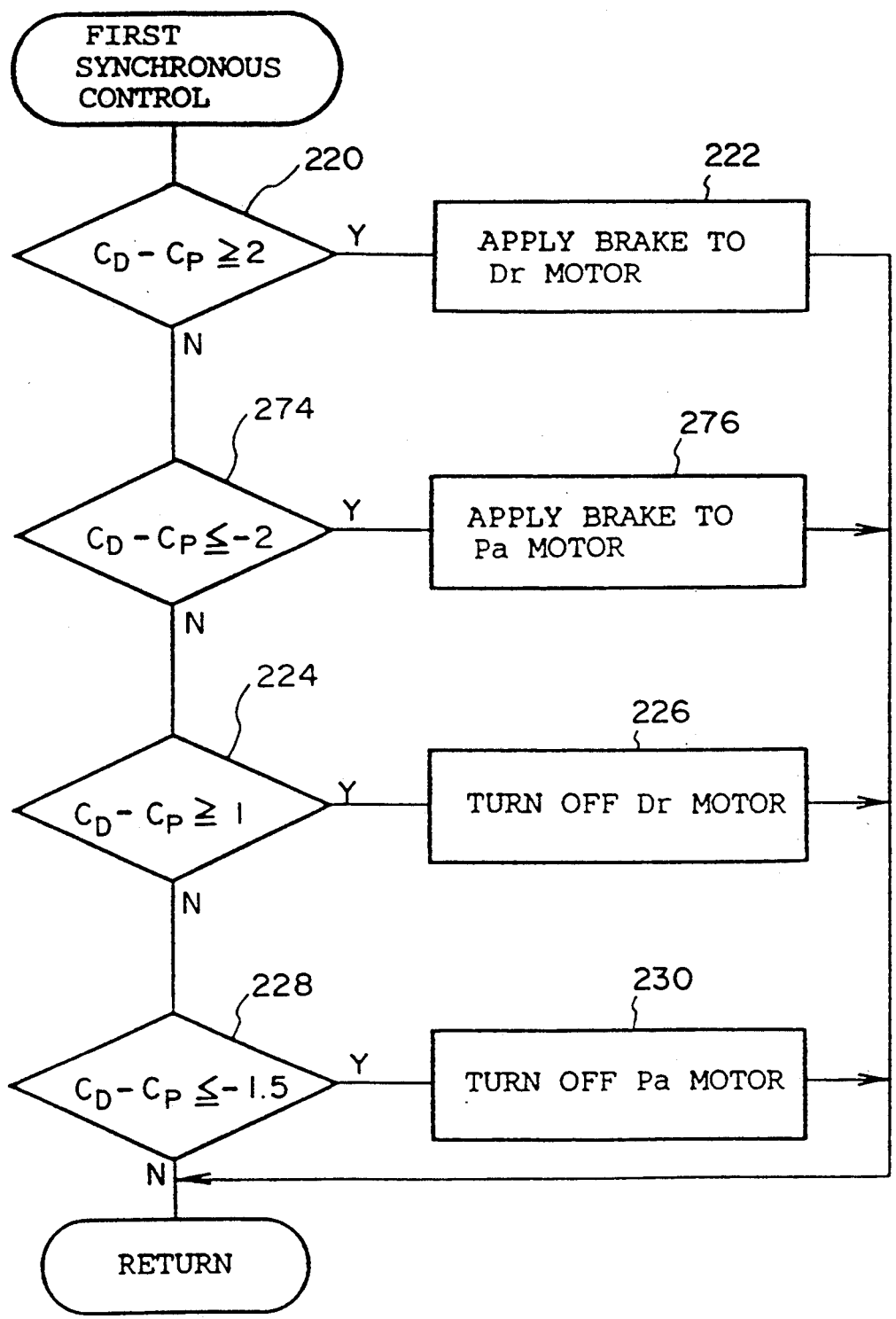
FIG. 18 is a flowchart illustrating a first modification of the first synchronous control routine.

FIG. 18 shows a first modification of the first synchronous control. In this routine, Steps 274 and 276 are added to the routine shown in FIG. 14. In Step 276, a determination is made as to whether the difference $C_D-C_P$ is a second predetermined value (e.g., $-2$) or less, so as to determine whether the passenger-side wiper blade undergoing the opening operation precedes the driver-side wiper blade undergoing the closing operation by the second predetermined value or more. If YES is the answer, the passenger-side motor 32P is stopped by the brake in Step 276.

As a result, even in cases where the possibility of occurrence of interference is small, if the passenger-side wiper blade has preceded the driver-side wiper blade by the third predetermined value or more, the passenger-side wiper blade is stopped suddenly, as shown in FIG. 24.

Figure 19:
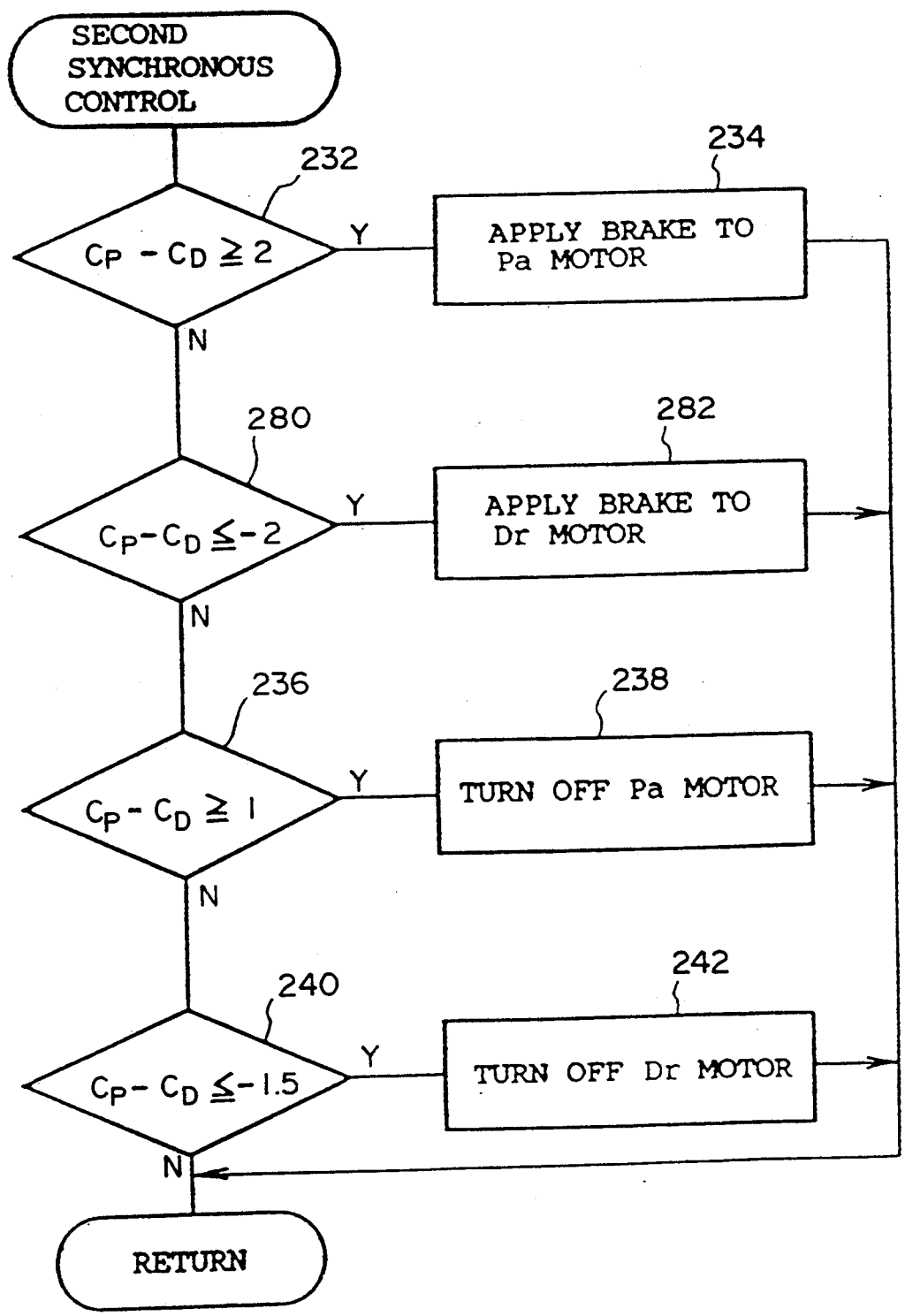
FIG. 19 is a flowchart illustrating a first modification of the second synchronous control routine.

FIG. 19 shows a first modification of the second synchronous control. In this modification, Steps 280 and 282 are added to the routine shown in FIG. 15. In the same way as the routine shown in FIG. 18, the arrangement provided is such that even in cases where the possibility of occurrence of interference is small, if the driver-side wiper blade has preceded the passenger-side wiper blade by the third predetermined value or more, the leading driver-side wiper blade is stopped suddenly.

Figure 20:
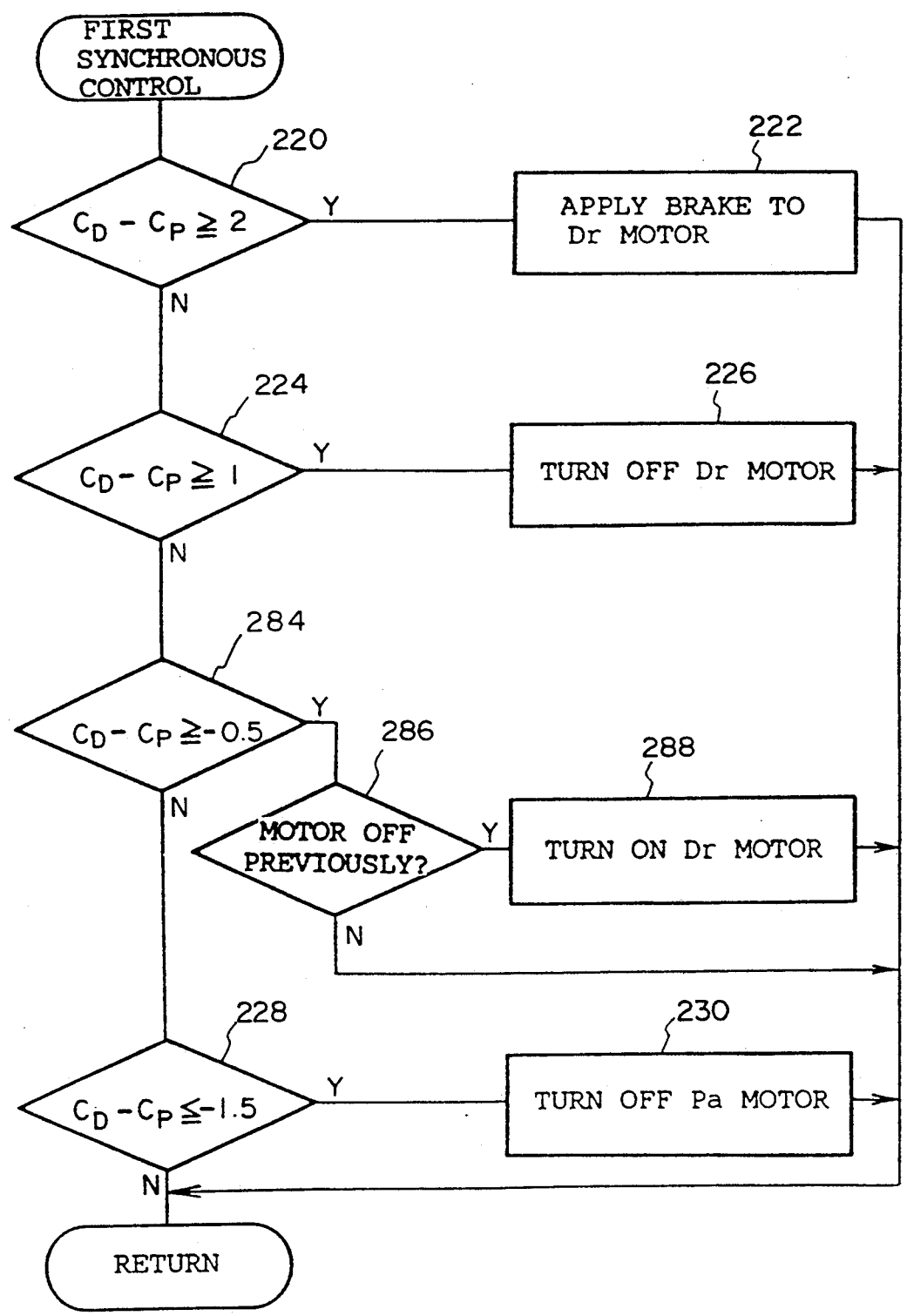
FIG. 20 is a flowchart illustrating a second modification of the first synchronous control routine.

FIG. 20 shows a second modification of the first synchronous control. In this routine, Steps 284, 286, and 288 are added to the routine shown in FIG. 14. In Step 284, a determination is made as to whether the difference $C_D-C_P$ is a predetermined value (e.g., $-0.5$) or more, so as to determine whether the passenger-side wiper blade undergoing the opening operation precedes the driver-side wiper blade undergoing the closing operation by the predetermined value or more. If YES is the answer in Step 284, a determination is made in Step 286 as to whether the driver-side motor 32D was previously off. If the driver-side motor 32D was previously off, the driver-side motor 32D is turned on in Step 288.

As a result, as shown in FIG. 24, the driver-side motor 32D is turned off when the difference $C_D-C_P$ has reached 1, and the motor is turned on again when the difference $C_D-C_P$ has reached $-0.5$. Thus the on-off operation of the motor is provided with a hysteresis characteristic.

Figure 21:
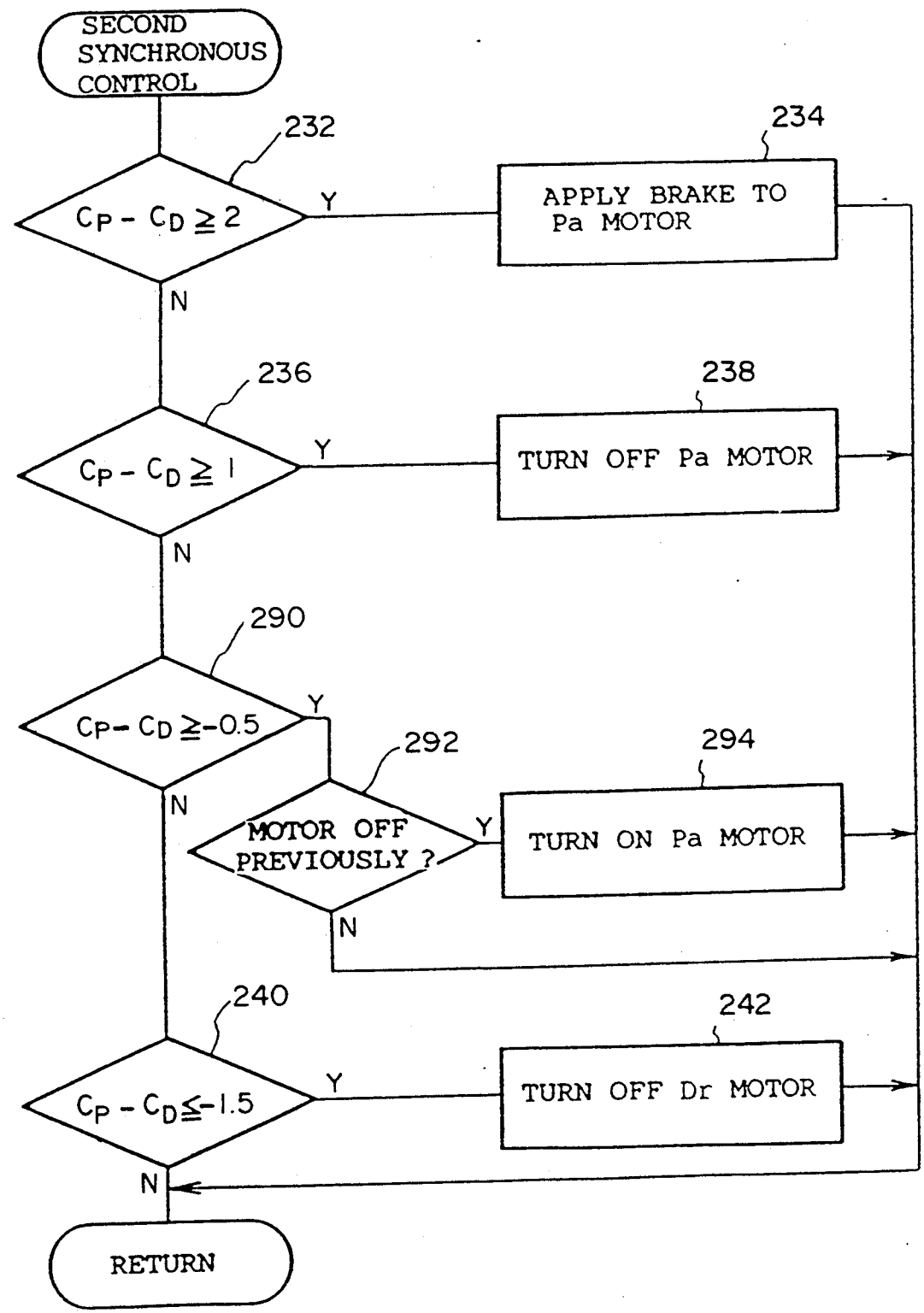
FIG. 21 is a flowchart illustrating a second modification of the second synchronous control routine.

FIG. 21 shows a second modification of the second synchronous control. In this routine, in the same way as the routine shown in FIG. 20, Steps 290, 292, and 294 are added to the routine shown in FIG. 15. The arrangement provided is such that when the difference $C_P-C_D$ is 1 or more, the passenger-side motor 32P is turned off, and when the difference $C_P-C_D$ has reached $-0.5$ or more, the passenger-side motor 32P is turned on. Thus the on-off operation of the motor is provided with the hysteresis characteristic.

Figure 22:
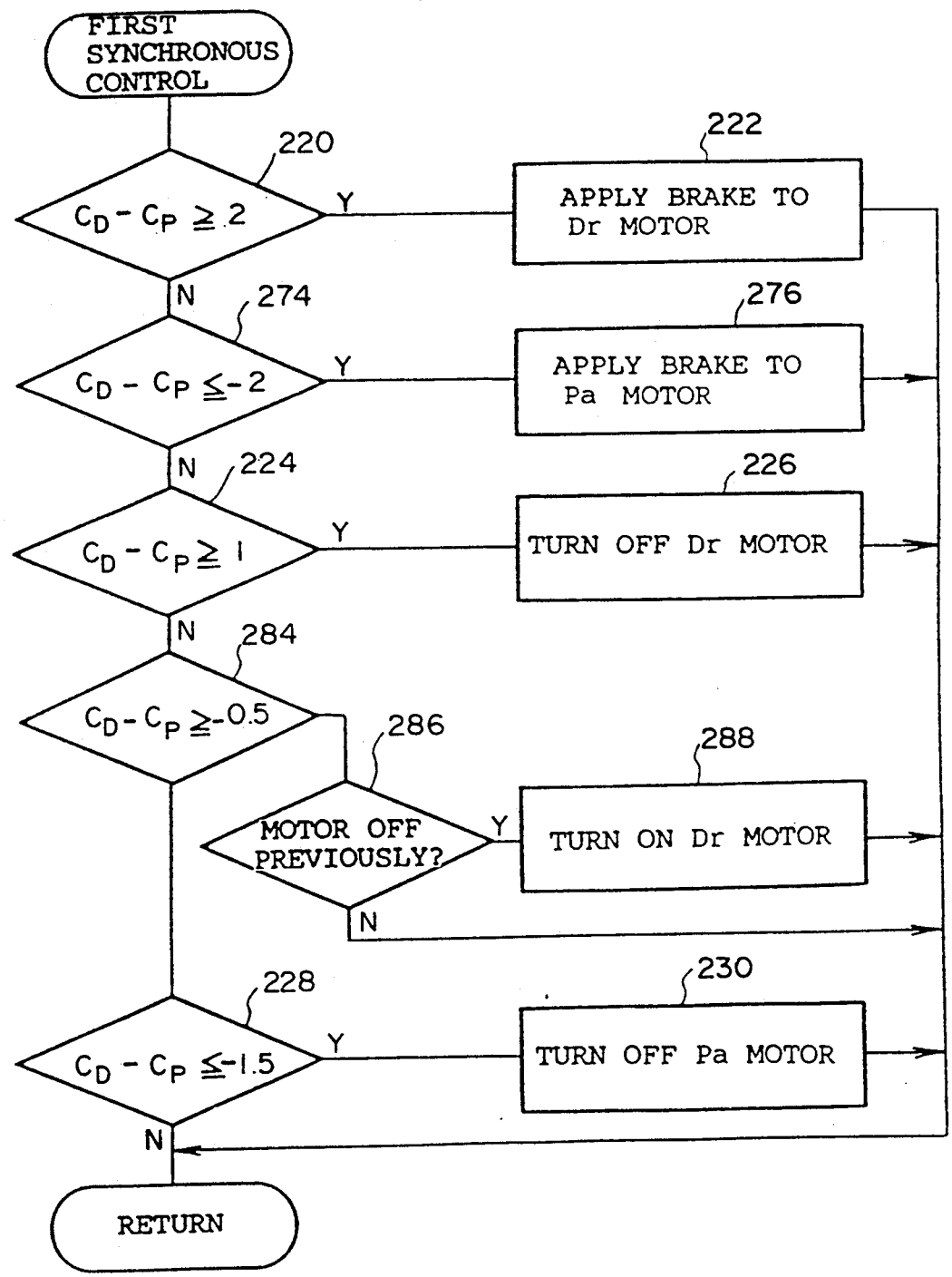
FIG. 22 is a flowchart illustrating a third modification of the first synchronous control routine.

FIG. 22 shows a third modification of the first synchronous control. In this third modification, the first and second modifications are added to the first synchronous control routine shown in FIG. 14. Accordingly, corresponding portions are denoted by the same reference numerals, and a description thereof will be omitted.

Figure 23:
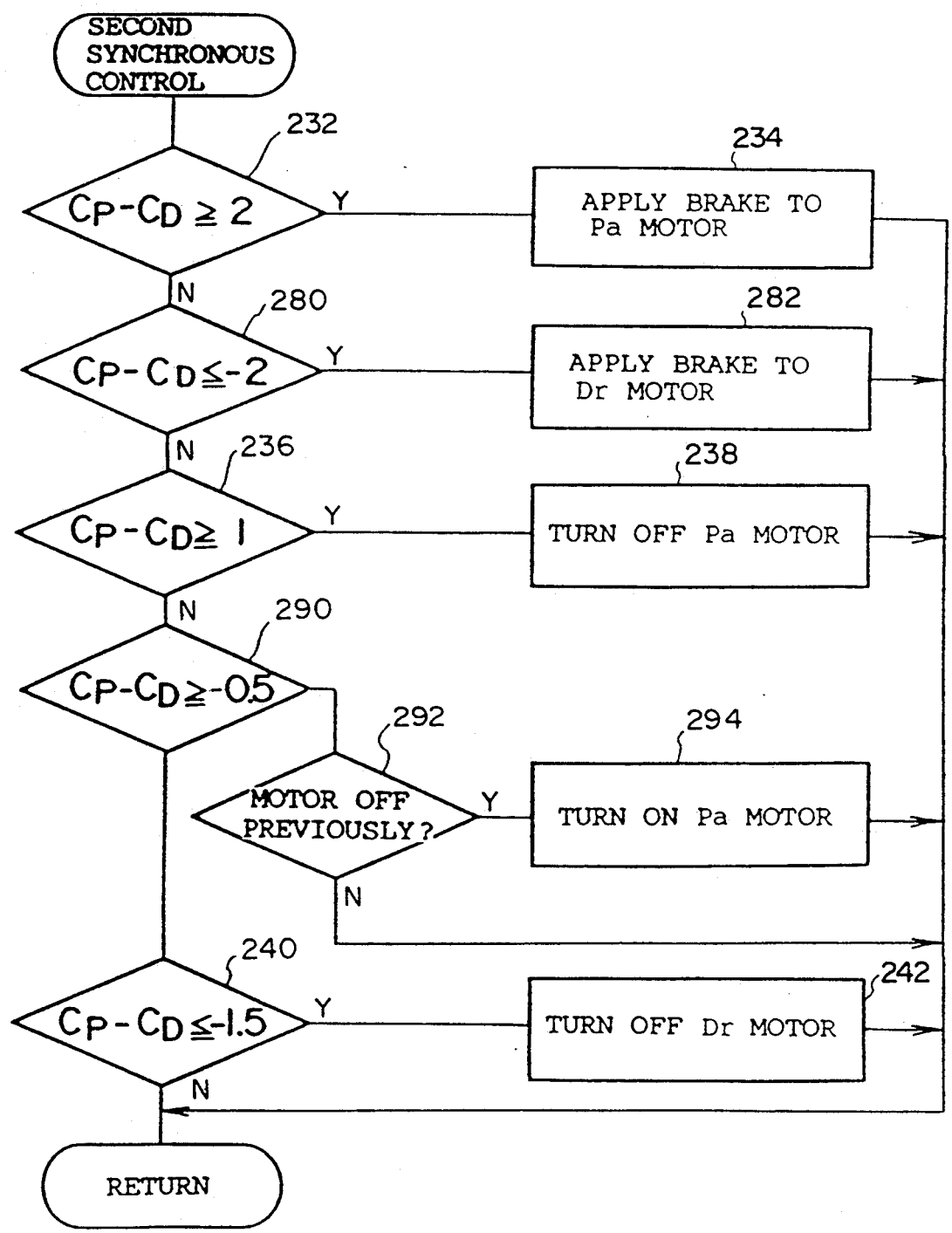
FIG. 23 is a flowchart illustrating a third modification of the second synchronous control routine.

FIG. 23 shows a third modification of the second synchronous control. In this third modification, the first and second modifications are added to the second synchronous control routine shown in FIG. 15. Accordingly, corresponding portions are denoted by the same reference numerals, and a description thereof will be omitted.

Next, a detailed description will be given of a second embodiment of the present invention. In this embodiment, each of the wiper blades is stopped suddenly only in a specific area so as to reduce the number of sudden stops, thereby improving the operational feeling.

Figure 25:
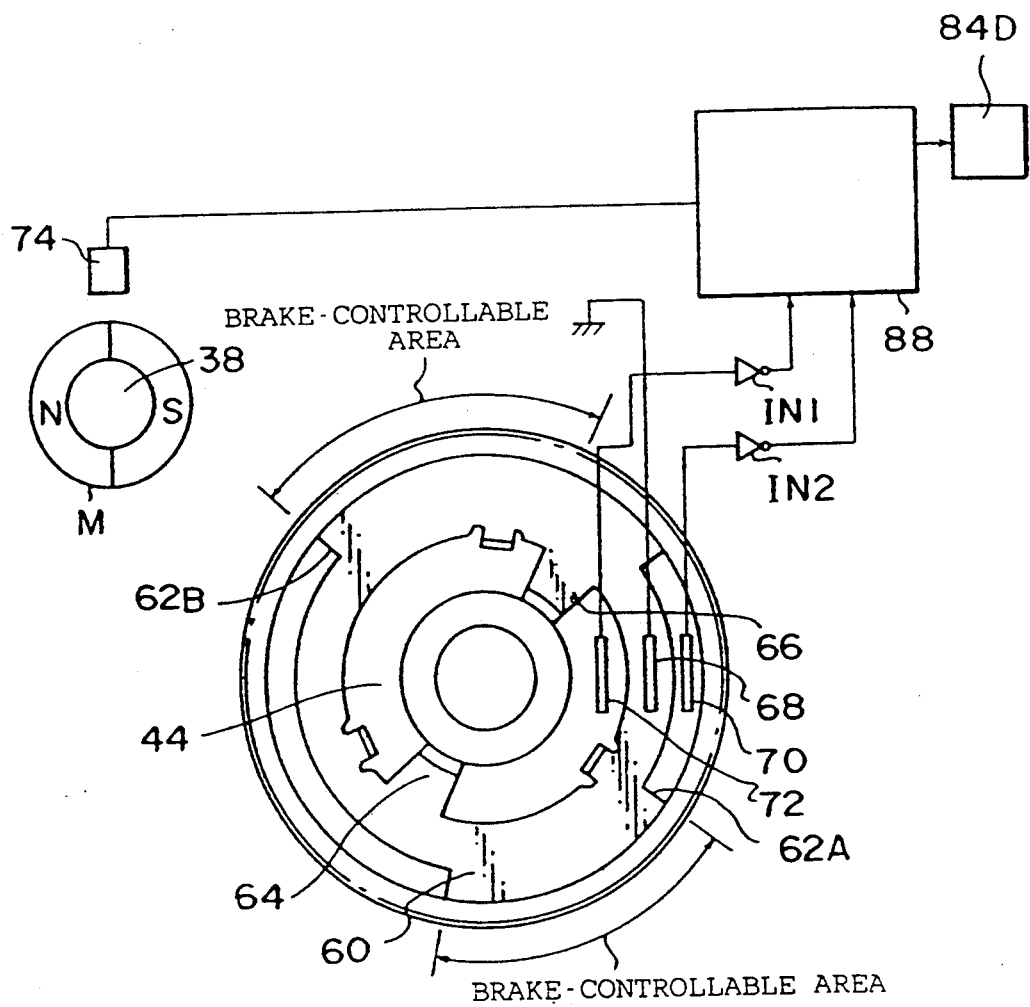
FIG. 25 is a schematic diagram of another embodiment of the driver-side position detecting device.

FIG. 25 shows the driver-side position detector in accordance with this embodiment. A description will be given of FIG. 25 by denoting portions corresponding to those of FIG. 3 by the same reference numerals. The cam plate 60 formed of an electrically conductive material is secured along the circumferential direction of the worm wheel 44. The upper reversing projection 64 and the lower reversing projection 66 are respectively formed at the cam plate 60 at positions thereof opposing each other with the rotating shaft of the worm wheel 44 placed therebetween. Notched portions 62A, 62B are formed around an outer peripheral portion of the cam plate 60, and the thickness of these notched portions is made smaller than that of the remaining portions. The first contact spring 72 is disposed at a position which enables the same to come into contact with the upper reversing projection 64 and the lower reversing projection 66. A second contact spring 70 is disposed at a position which enables the same to come into contact with the outer peripheral portion of the cam plate 60. The grounded common contact spring 68 is disposed at a position which enables the same to come into contact with a central portion of the cam plate 60. The first contact spring 72 is connected to the microcomputer 88 via the inverter IN1, while the second contact spring 70 is also connected to the microcomputer 88 via the inverter IN2.

Figure 40A:
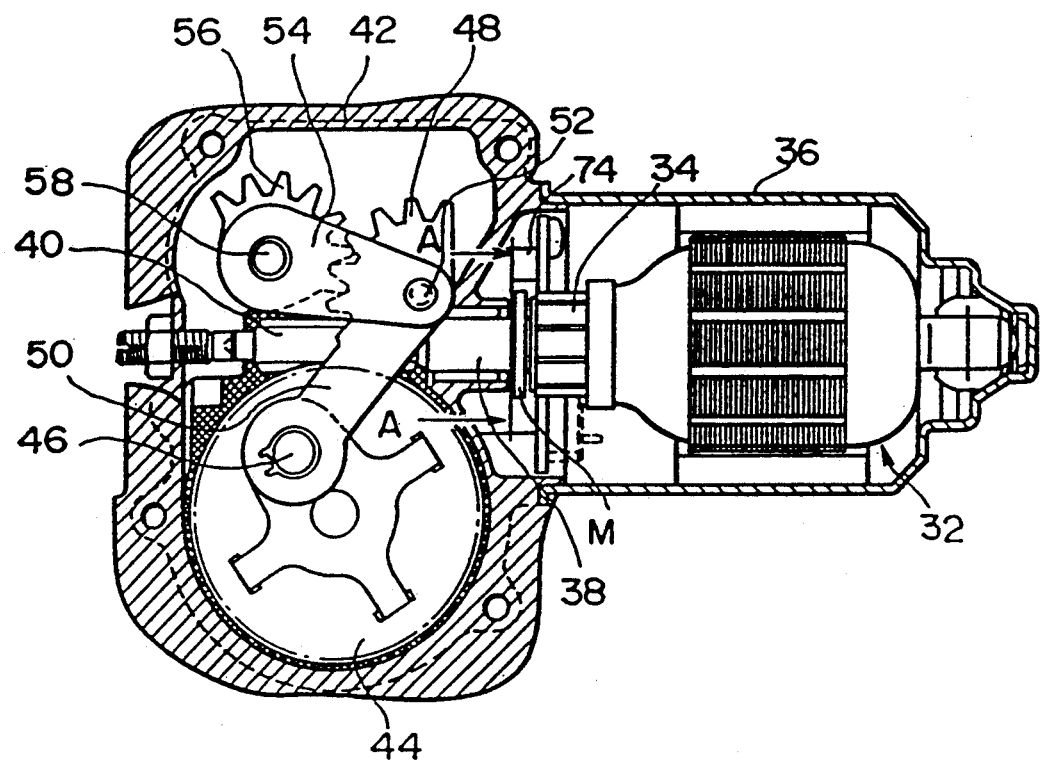
FIG. 40A is a cross-sectional view illustrating another embodiment of the driving device for driving the wiper blade.
Figure 40B:
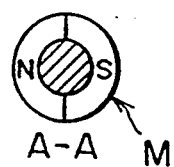
FIG. 40B is a cross-sectional view taken along line A—A of FIG. 40A.

As shown in FIGS. 40A and 40B, an annular bipolar magnet M is secured to the rotating shaft 38 on the commutator 34 side in such a manner as to surround the rotating shaft 38. A Hall element 74 is disposed in the vicinity of the magnet M in such a manner as to face the outer periphery of the magnet M. Accordingly, a synchronous signal corresponding to the rotation of the motor is generated from the Hall element 74. It should be noted that the synchronous signal may be generated by making use of a rotary encoder or a magnetoresistance element (MRE).

It should be noted that the passenger-side position detector is arranged in the same way as the driver-side position detector.

Figure 26:
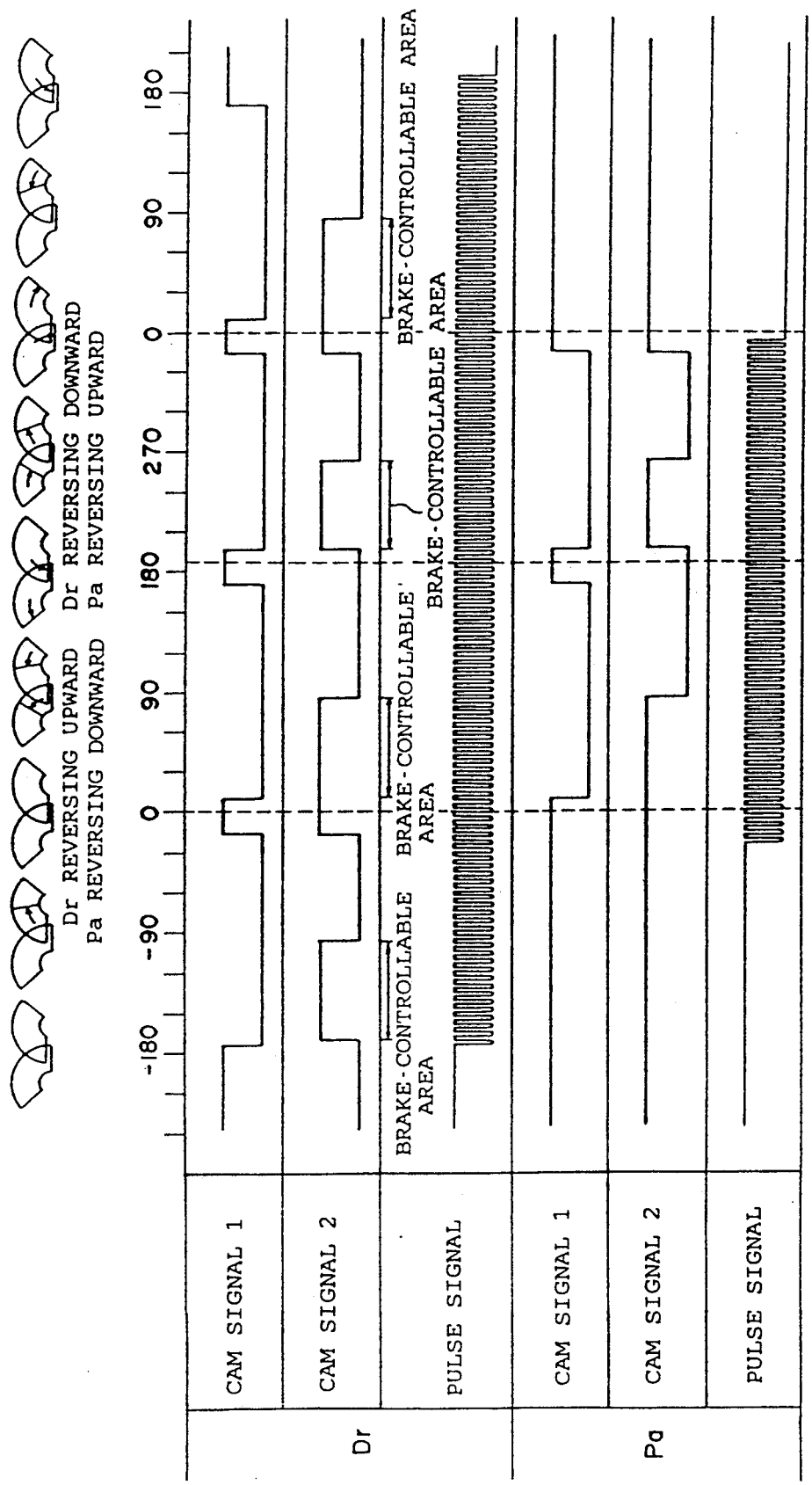
FIG. 26 is a diagram illustrating the relationship between the respective positions of the wiper blades on the one hand, and a cam signal 1, a cam signal 2, and a synchronous signal that are outputting from the driver-side position detecting device shown in FIG. 25 on the other.

The cam signal 1, the cam signal 2, and the synchronous signal shown in FIG. 26 are outputted from the inverter IN1, the inverter IN2, and the Hall element 74. With this position detector, the upper reversing position, the lower reversing position, and a brake-controllable area can be determined by the combination of the cam signal 1 and the cam signal 2.

Figure 27:
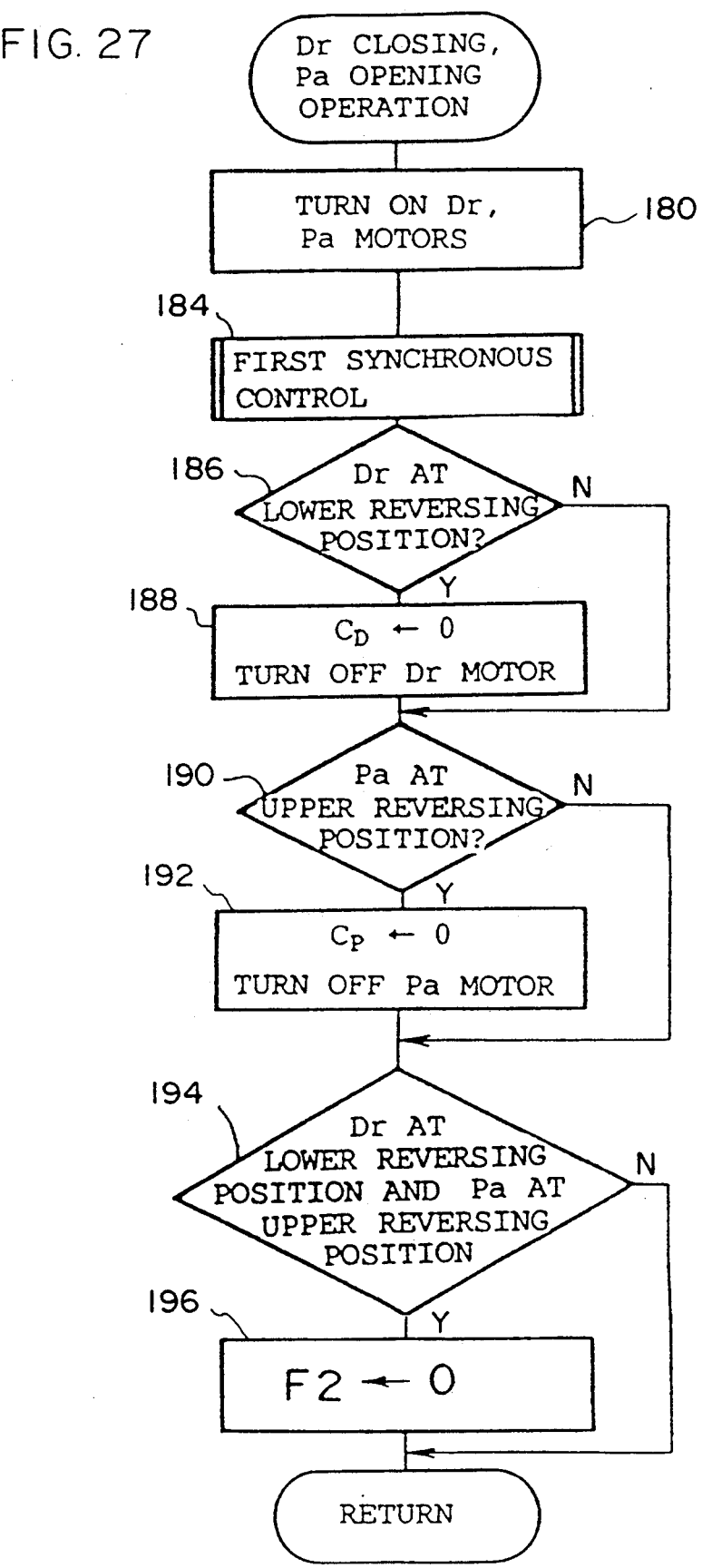
FIG. 27 is a flowchart illustrating a routine for closing the driver-side wiper blade and opening the passenger-side wiper blade in accordance with the second embodiment of the present invention.

Since the operation of the wiper blade operation in accordance with this embodiment is substantially the same as the above-described embodiment, only differences will be described. In this embodiment, since the interference preventing control is effected over the entire wiping zones, the routine of operation for closing the driver-side wiper blade and opening the passenger-side wiper blade is shown in FIG. 27. In the same way as this routine, the step of determining the range of interference is omitted in the routine of operation for opening the driver-side wiper blade and closing the passenger-side wiper blade.

Figure 28:
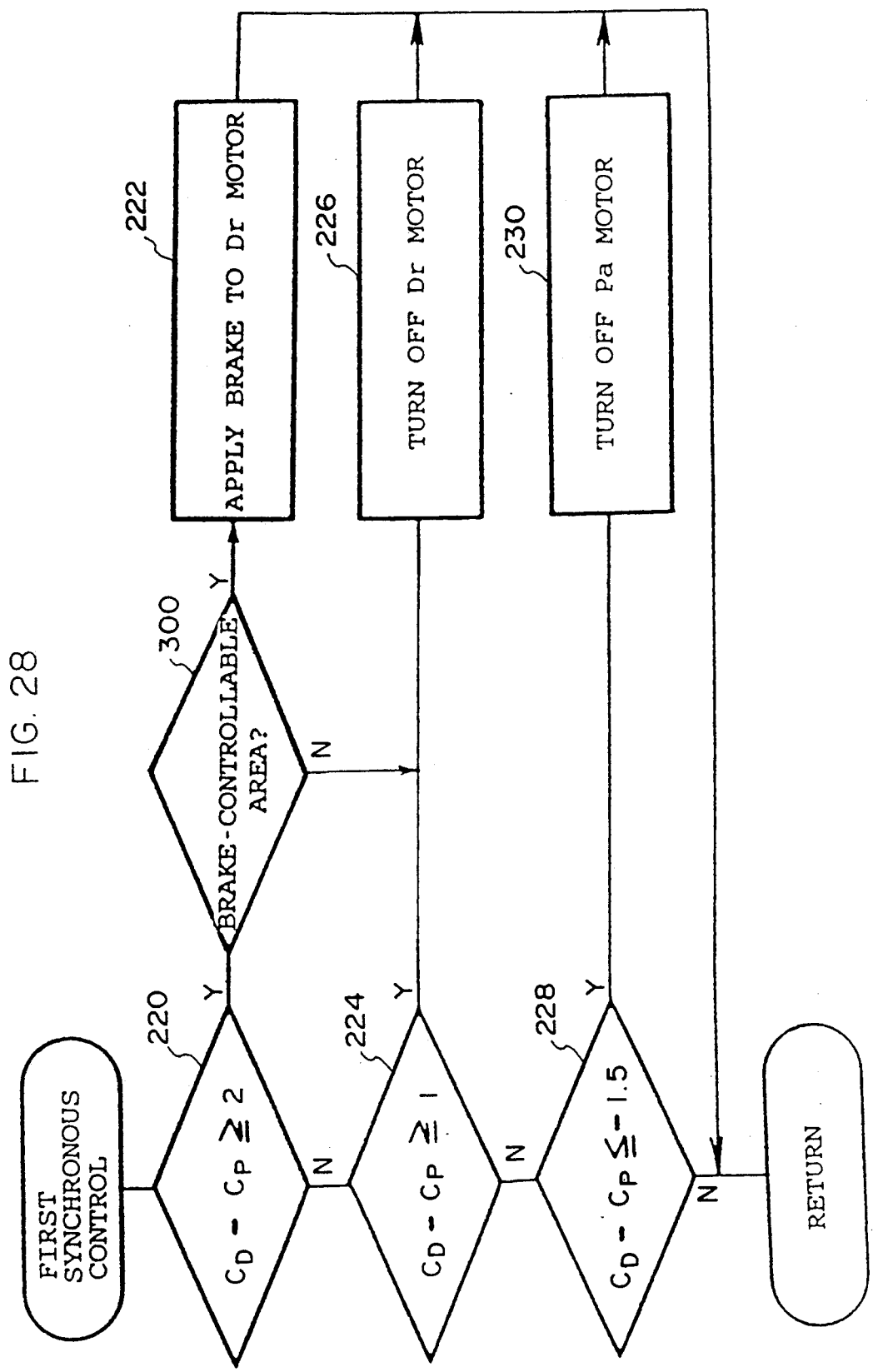
FIG. 28 is a flowchart illustrating the first synchronous control routine in accordance with the second embodiment of the present invention.

In addition, when the wiper blade is stopped by applying a brake to the motor since the wiper blade moving toward the lower reversing position has preceded, the other wiper blade Step 300 for determining on the basis of the cam signals 1 and 2 whether the wiper blade is in the brake-controllable area is provided before the step for applying a brake to the driver-side motor or the passenger-side motor, as shown in FIG. 28 by way of example. If it is determined that the wiper blade is in the brake-controllable area, a brake is applied to the motor, and if it is determined that the wiper blade is not in the brake-controllable area, the motor is turned off.

Alternatively, an arrangement may be provided such that, by combining the cam plate shown in FIG. 3 and the cam plate shown in FIG. 25, the synchronous signal is generated only for the area in which interference can possibly occur, and the operation of the wiper blade is controlled by setting as the brake-controllable area an area which is narrower than that area, e.g., the overlapping area in which the wiping zones partially overlap.

Figure 29:
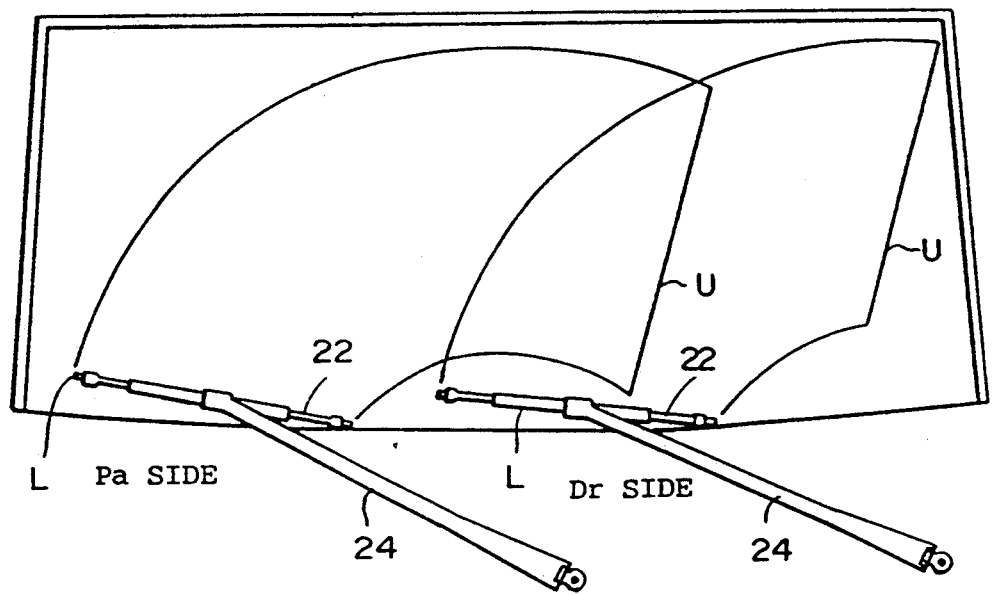
FIG. 29 is a schematic diagram illustrating a windshield wiper assembly of another type to which the present invention is applicable.
Figure 30:
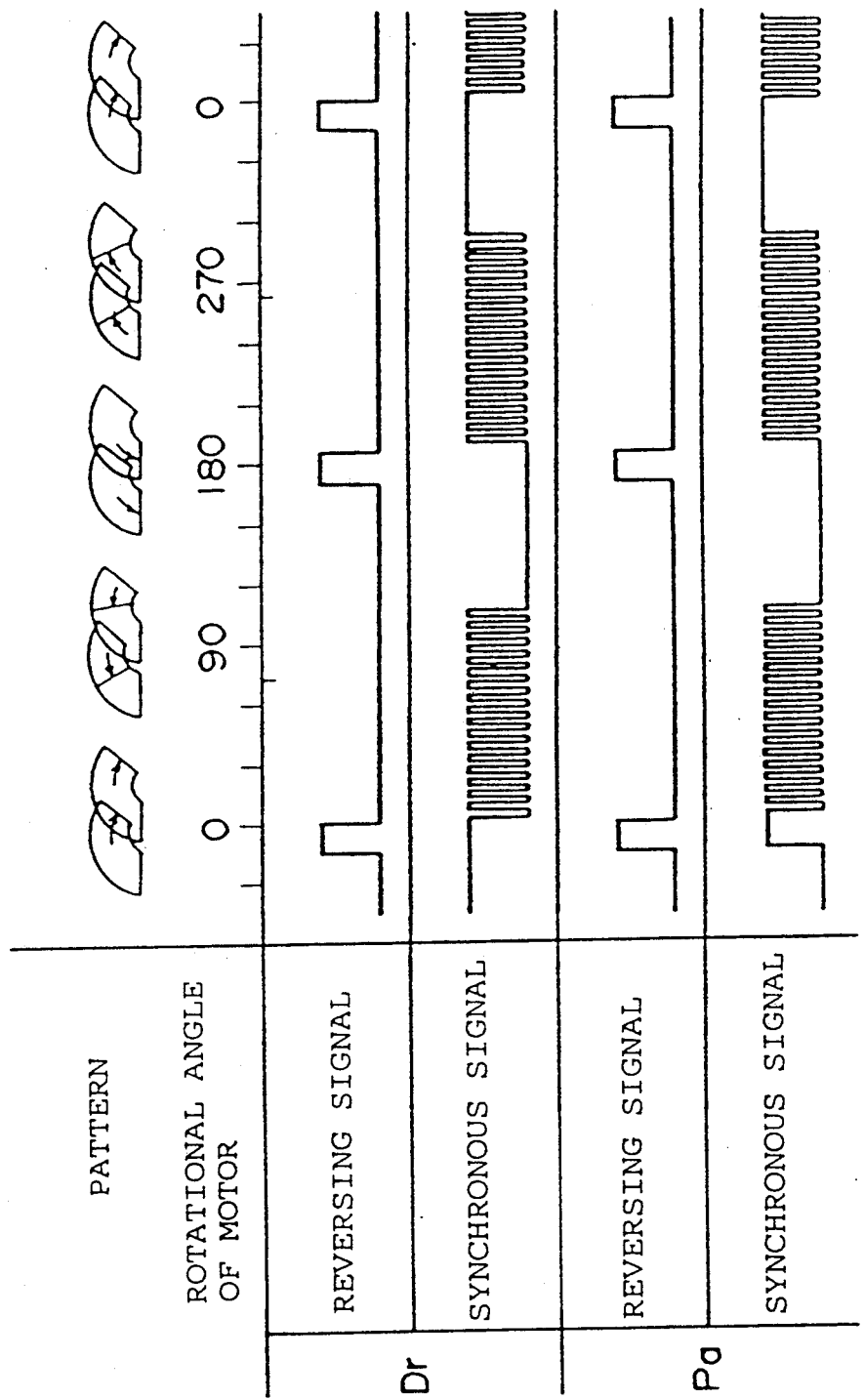
FIG. 30 is a diagram illustrating the relationship between the synchronous signal and the reversing signal on the one hand, and the respective positions of the wiper blades on the other.

A description will now be given of a third embodiment of the present invention. In this embodiment, the present invention is applied to a windshield wiper assembly of a type in which the driver-side wiper blade and the passenger-side wiper blade are made to undergo wiping motions in the same direction. As shown in FIG. 29, this windshield wiper assembly comprises the pair of wiper arms 24 each having the wiper blade 22 at one end thereof. These wiper arms are connected to the driver-side driving device and the passenger-side driving device, respectively, as described before. The wiping zone of the passenger-side wiper blade partially overlaps with that of the driver-side wiper blade in an area which is substantially defined by the upper reversing position of the passenger-side wiper blade, a locus depicted by the lower end of the passenger-side wiper blade, and a locus depicted by the upper end of the driver-side wiper blade. The configurations of the position detectors and the control circuit in accordance with this embodiment are similar to those of the above-described embodiments. The reversing signals and the synchronous signals of this embodiment are shown in FIG. 30. It should be noted that since the operation routine of this embodiment is substantially similar to that of the first embodiment, corresponding portions are denoted by the same reference numerals, and only differences will be described.

Figure 31:
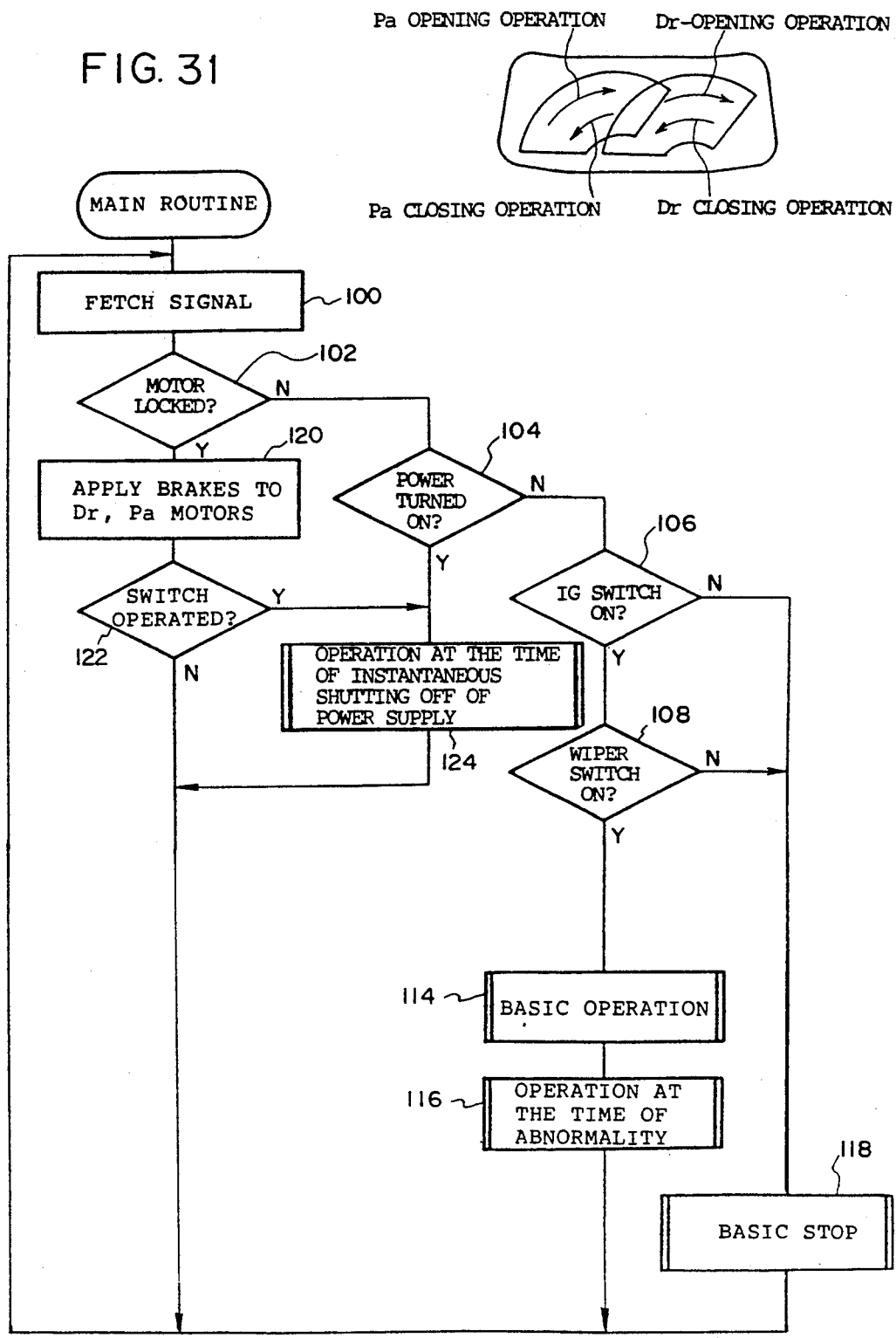
FIG. 31 is a flowchart illustrating a main routine in accordance with a third embodiment.

FIG. 31 shows the main routine of this embodiment. In FIG. 31, Steps 110 and 112 of FIG. 6 are omitted. Accordingly, if it is determined in Step 108 that the wiper switch is on, the process proceeds directly to Step 114.

Since the interruption routine which is effected at the rise or fall of the synchronous signal in accordance with this embodiment is similar to FIG. 7, an illustration thereof will be omitted.

Figure 32:
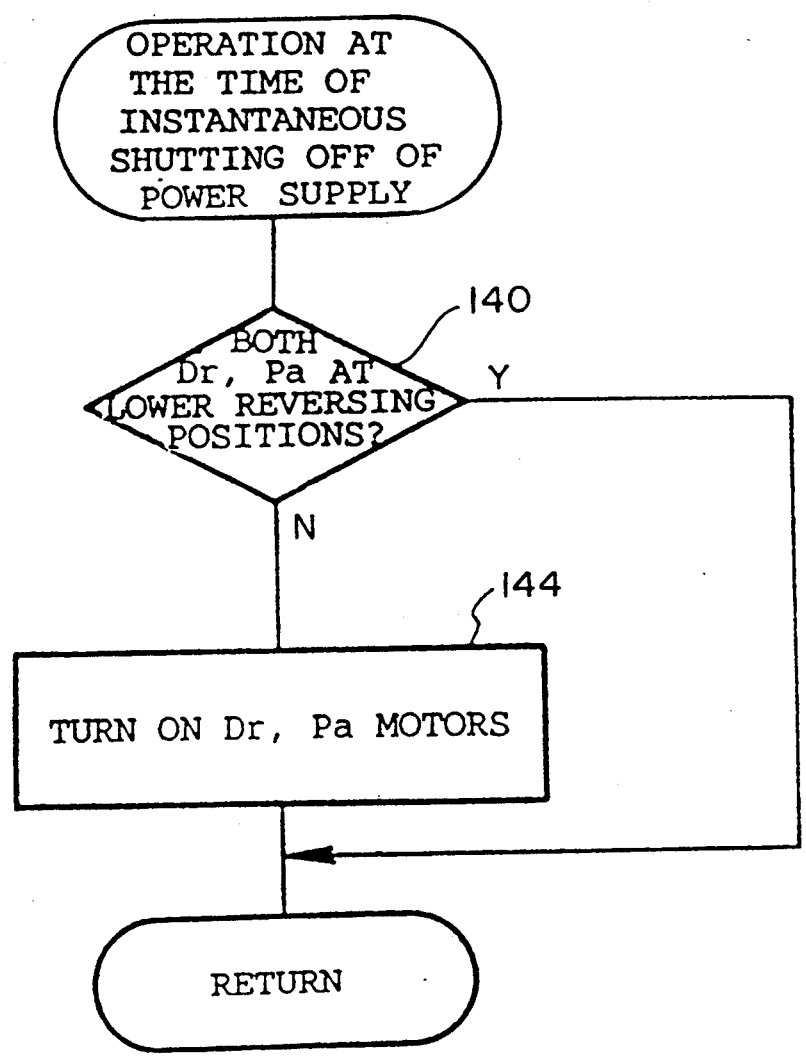
FIG. 32 is a flowchart illustrating a routine of operation at the time of instantaneous shutting off of power supply in accordance with the third embodiment.

FIG. 32 illustrates a routine of operation at the time of instantaneous shutting off of power supply. In FIG. 32, Steps 142 and 146 of FIG. 8 are omitted. Accordingly, when neither the driver-side wiper blade nor the passenger-side wiper blade is located at the lower reversing position, the driver- and passenger-side motors are turned on.

Figure 33:
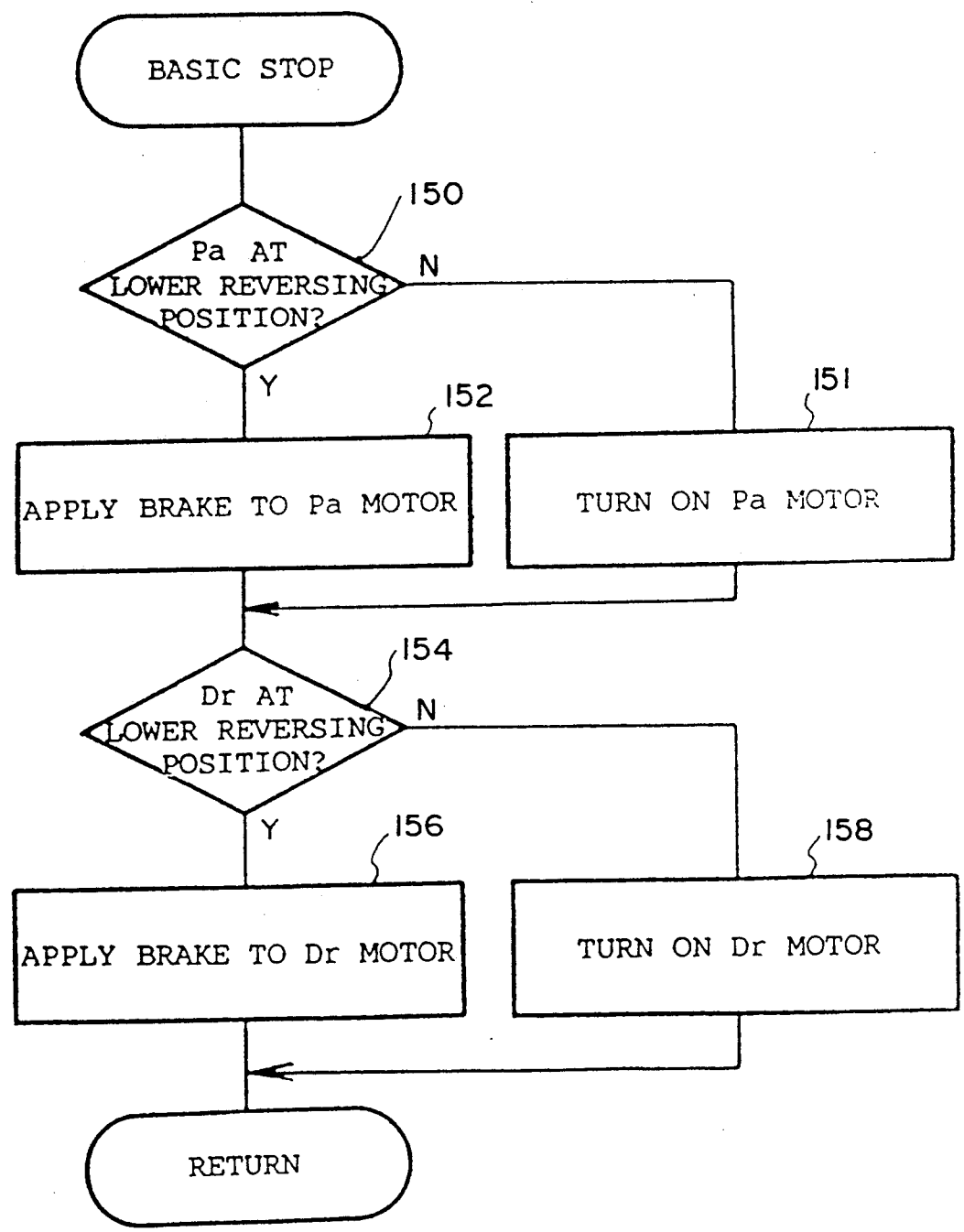
FIG. 33 is a flowchart illustrating a basic stopping routine in accordance with the third embodiment.

FIG. 33 shows a basic stopping routine in accordance with this embodiment. In FIG. 33, Step 114 of FIG. 9 is omitted, and Step 151 is newly added. Accordingly, when the passenger-side wiper blade is not located at the lower reversing position, the on-state of the passenger-side motor is continued in Step 151.

Figure 34:
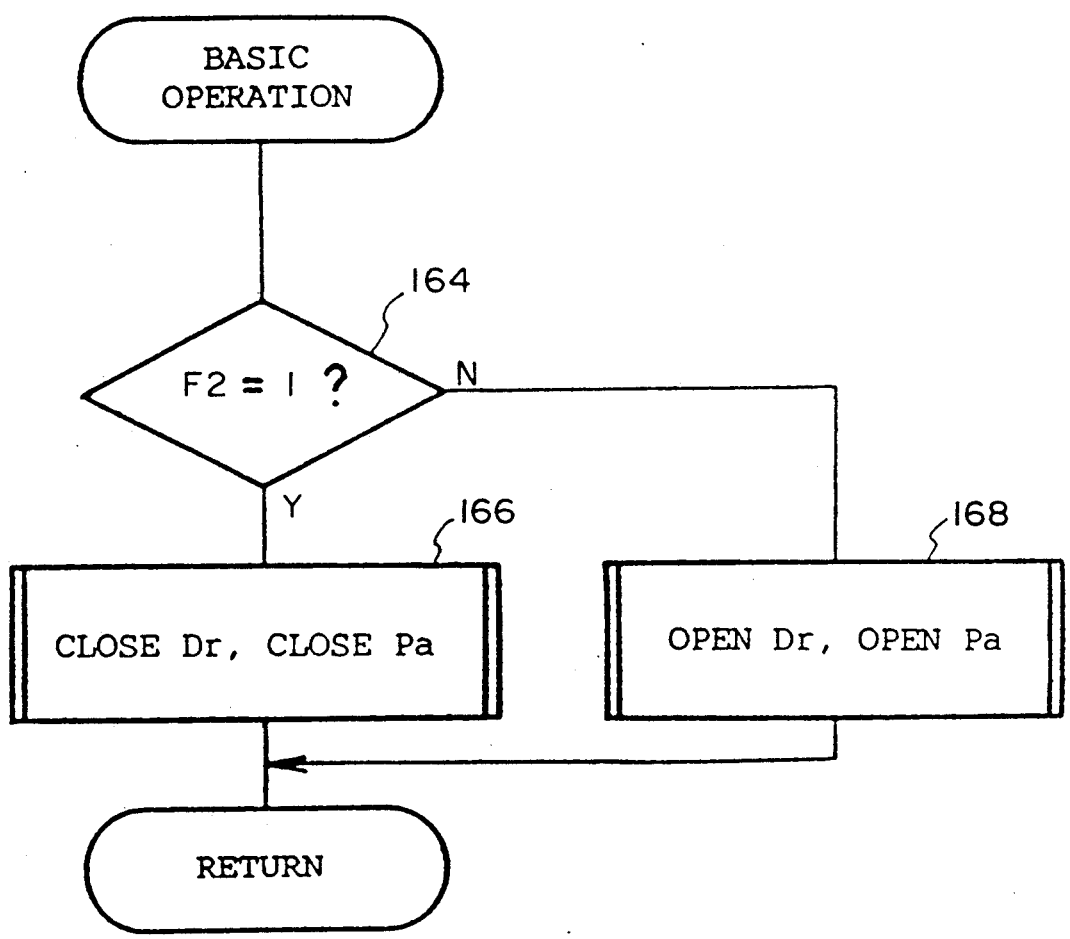
FIG. 34 is a flowchart illustrating a basic operation routine in accordance with the third embodiment.

FIG. 34 illustrates a basic operation routine in accordance with this embodiment. In FIG. 34, Steps 160 and 162 of FIG. 10 are omitted. In addition, in Step 166 in FIG. 34, the driver-side wiper blade and the passenger-side wiper blade are made to undergo the closing operation, and in Step 168 the two wiper blades are made to undergo the opening operation. Accordingly, the two wiper blades are made to effect the wiping operation in the same direction.

In this embodiment, the routine of opening the driver-side wiper blade shown in FIG. 11 is omitted, and when the ignition switch and the wiper switch are turned on, both the driver- and passenger-side wiper blades are opened simultaneously.

Figure 35:
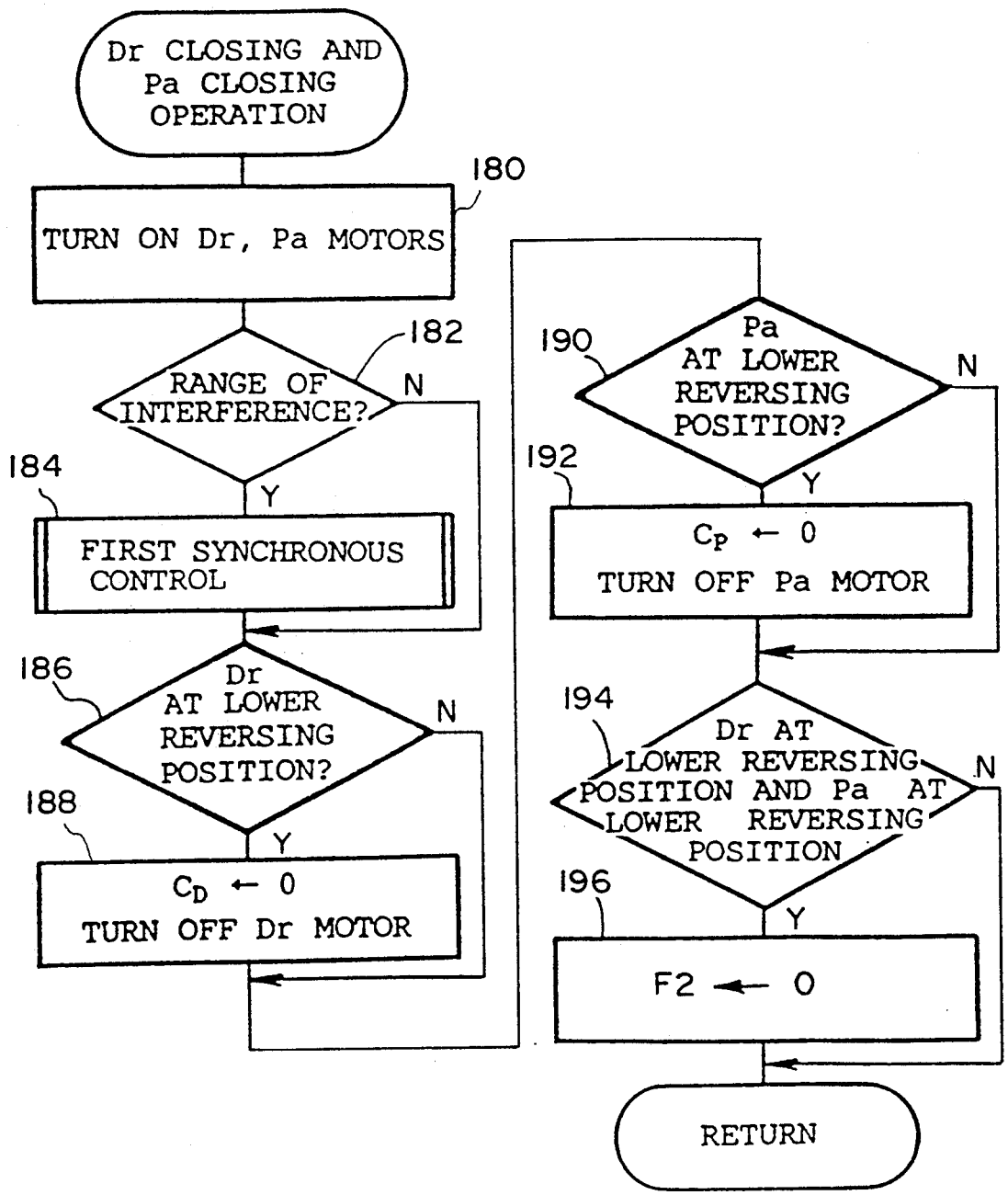
FIG. 35 is a flowchart illustrating a routine for closing the driver-side wiper blade and the passenger-side wiper blade in accordance with the third embodiment.

FIG. 35 illustrates details of the routine for closing both the driver-side and passenger-side wiper blades shown in Step 166 of FIG. 34. Although FIG. 35 is substantially similar to FIG. 12, in this embodiment, when the driver- and passenger-side wiper blades are located at the lower reversing positions, the count values $C_D$ and $C_P$ are cleared, the driver- and passenger-side motors are turned off, and the flag F2 is reset.

Figure 36:
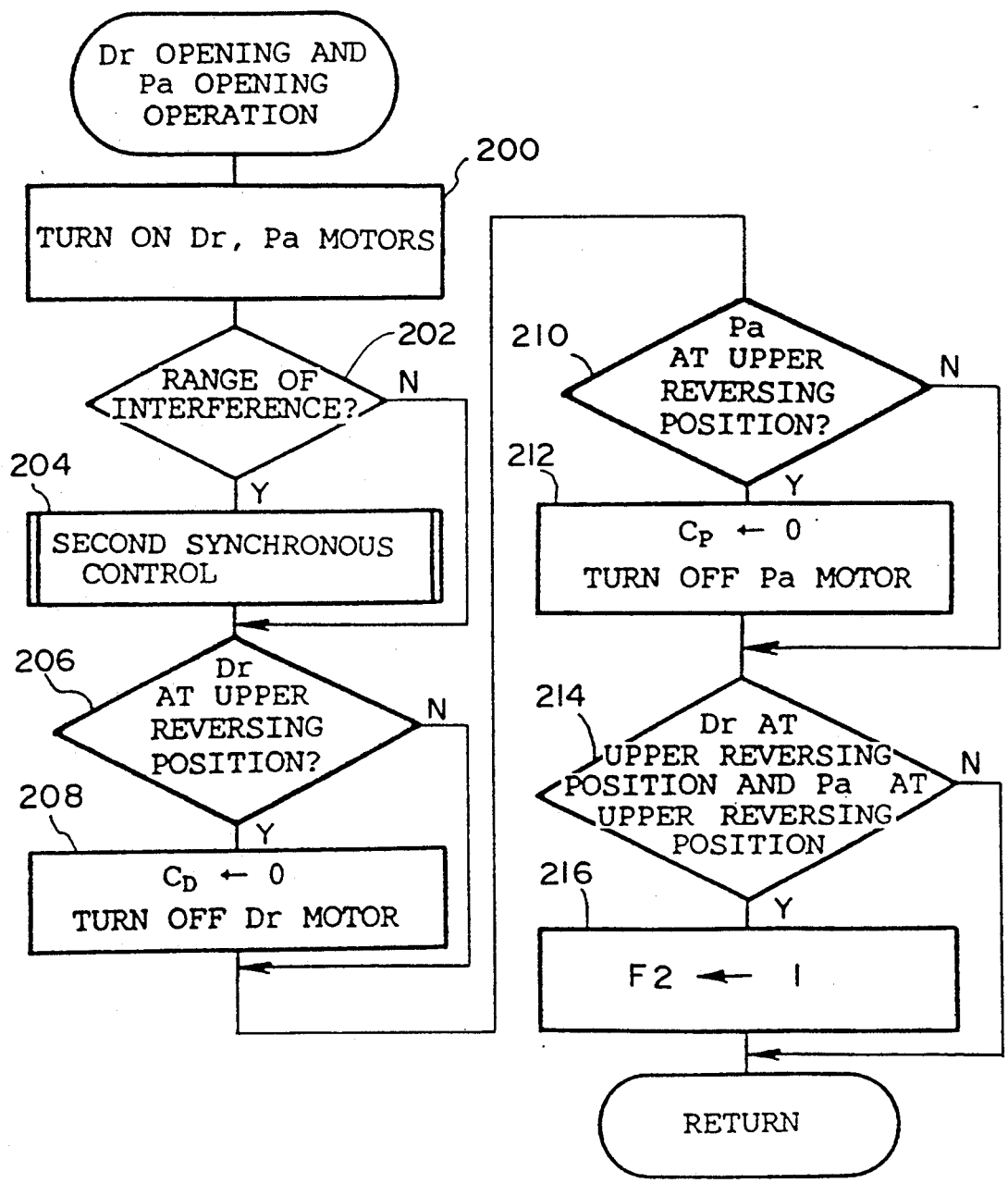
FIG. 36 is a flowchart illustrating a routine for opening the driver-side wiper blade and the passenger-side wiper blade in accordance with the third embodiment.

FIG. 36 shows details of the routine for opening both the driver-side and passenger-side wiper blades shown in Step 168 of FIG. 34. Although FIG. 36 is substantially similar to FIG. 13, in this embodiment, when the driver- and passenger-side wiper blades are located at the upper reversing positions, the count values $C_D$ and $C_P$ are cleared, the driver- and passenger-side motors are turned off, and the flag F2 is set.

Since the first synchronous control routine and the second synchronous control routine in accordance with this embodiment are similar to those shown in FIGS. 14 and 15, respectively, illustrations thereof will be omitted.

Figure 37:
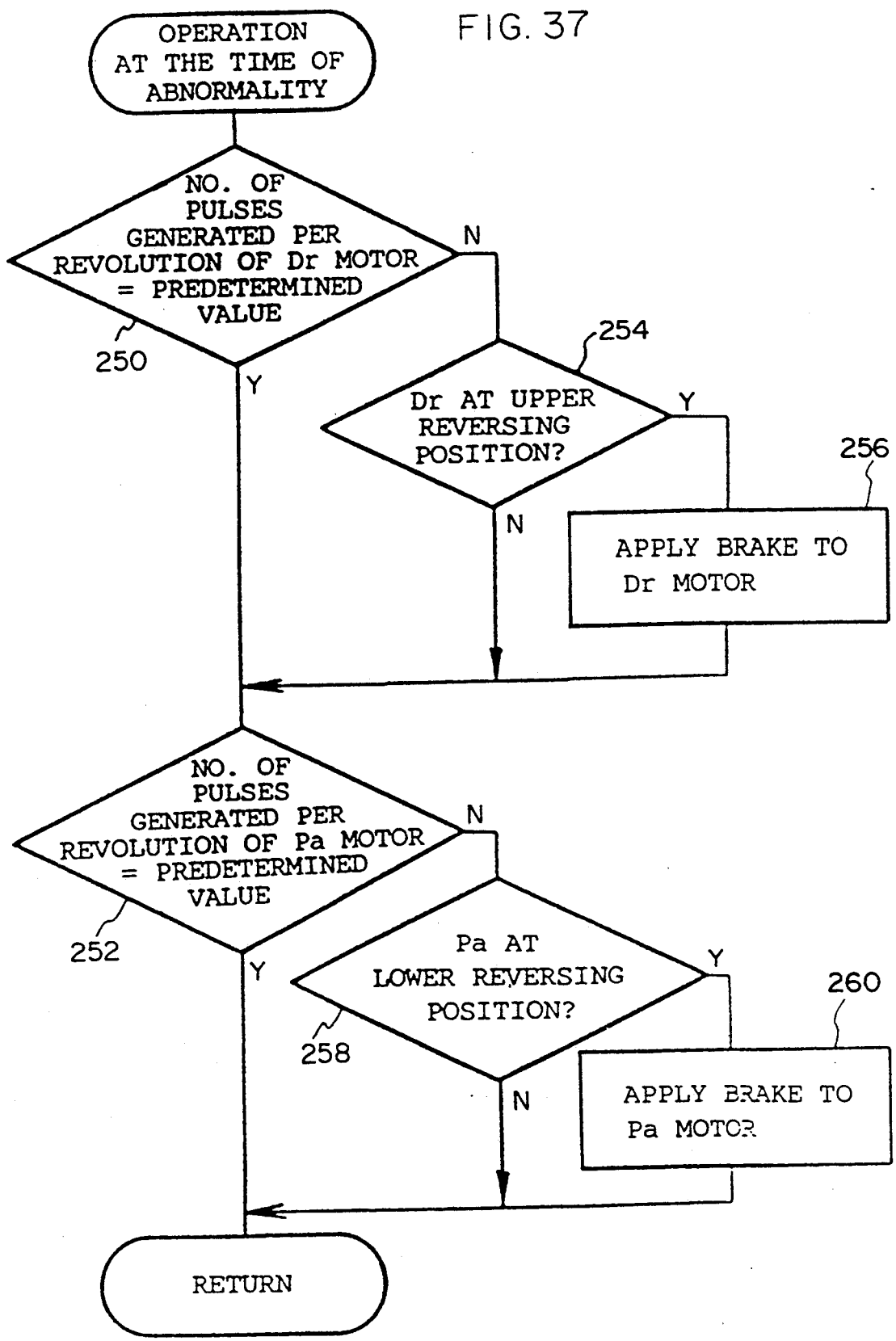
FIG. 37 is a flowchart illustrating a routine of operation at the time of an abnormality in accordance with the third embodiment.

FIG. 37 illustrates the routine of operation at the time of an abnormality in accordance with this embodiment and corresponding to FIG. 16. In Step 258 in FIG. 37, a determination is made as to whether the passenger-side wiper blade is located at the lower reversing position, and if YES is the answer, a brake is applied to the passenger-side motor in Step 260 so as to stop the passenger-side wiper blade.

It should be noted that the following modifications are directly applicable to this third embodiment: the modification (FIG. 17) of the routine of operation at the time of an abnormality in accordance with the first embodiment; the first modification (FIG. 18) of the first synchronous control routine; the first modification (FIG. 19) of the second synchronous control routine; the second modification (FIG. 20) of the first synchronous control routine; the second modification (FIG. 21) of the second synchronous control routine; the third modification (FIG. 22) of the first synchronous control routine; and the third modification (FIG. 23) of the second synchronous control routine.

Figure 38:
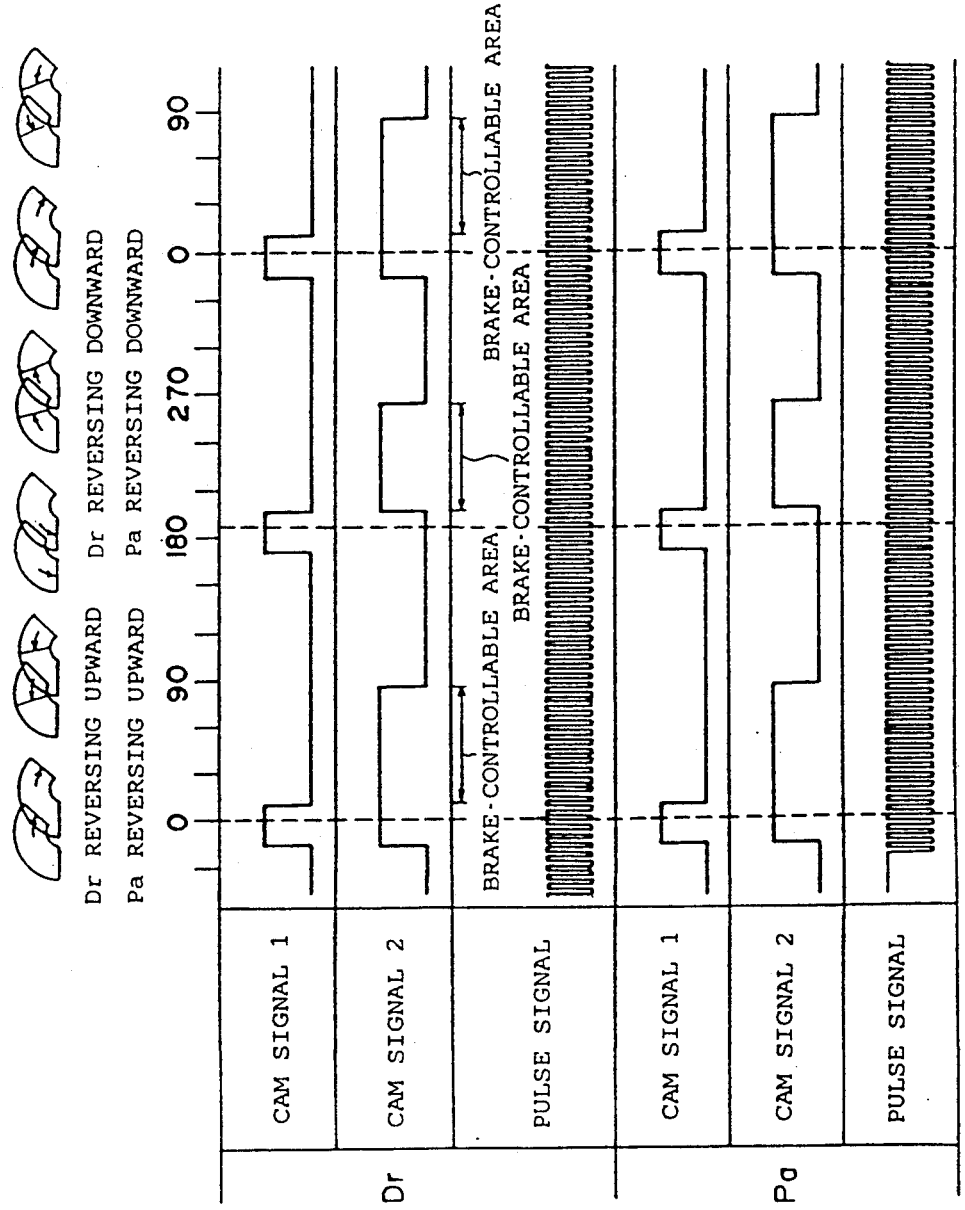
FIG. 38 is a diagram illustrating the relationship between the respective positions of the wiper blades on the one hand, and the cam signal 1, the cam signal 2, and the synchronous signal that are outputted from the driver-side position detecting device shown in FIG. 25 on the other, in a case where the driver-side position detecting device shown in FIG. 25 is applied to the third embodiment.
Figure 39:
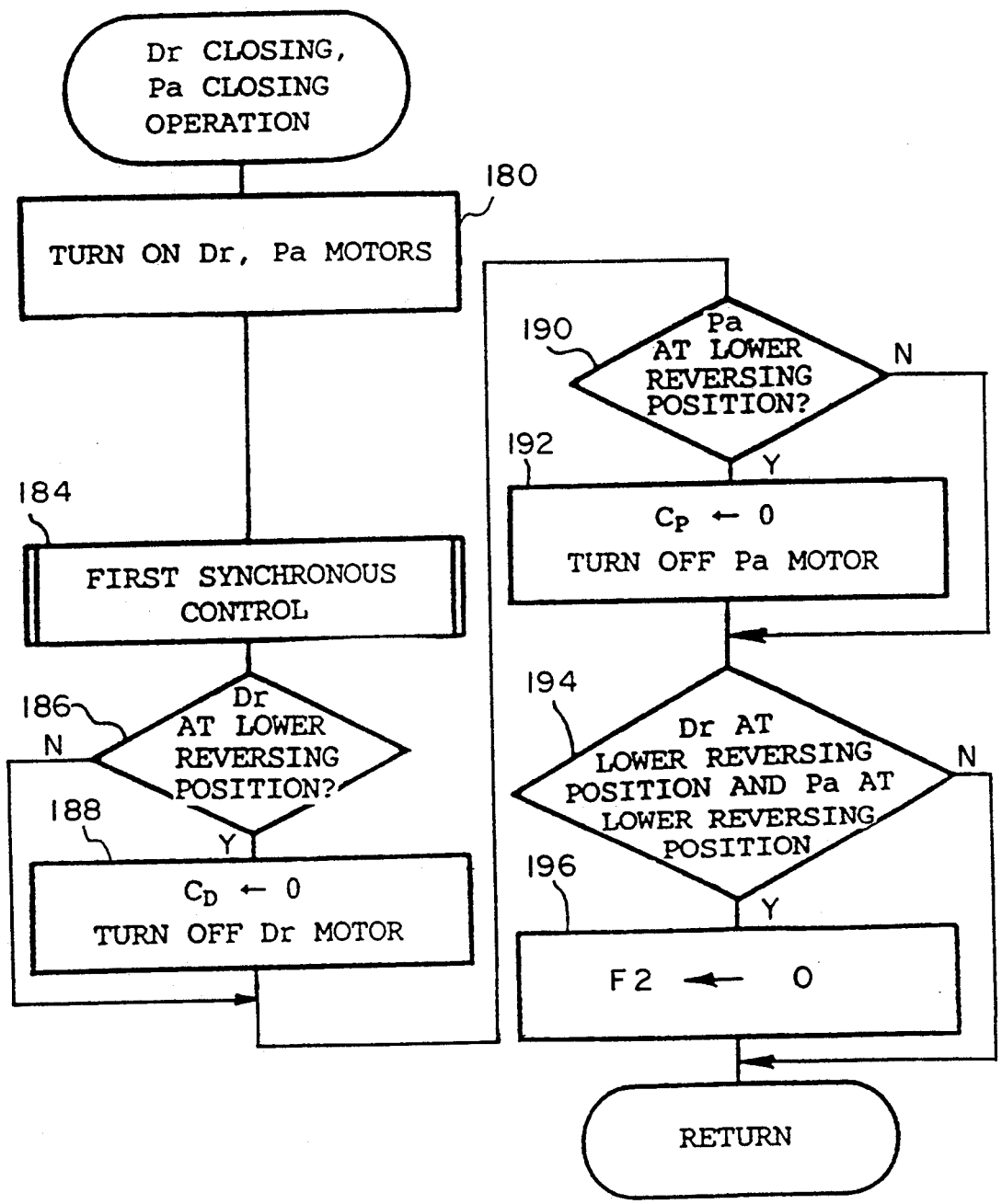
FIG. 39 is a flowchart illustrating a routine for closing the pair of wiper blades when the second embodiment is applied to a windshield wiper assembly of a type in which the pair of wiper blades are moved in the same direction to effect wiping.

In addition, the driver-side position detector in accordance with the second embodiment is also applicable to a windshield wiper assembly of a type in which both the driver- and passenger-side wiper blades are moved in the same direction to effect wiping. The cam signals 1, 2 and the pulse signal in this case are shown in FIG. 38. In addition, since interference preventing control is effected over the entire wiping zones, the routine of operation for closing the driver- and passenger-side wiper blades is shown in FIG. 39. In the same way as this routine, the step of determining the range of interference is omitted in the routine of operation for opening the driver- and passenger-side wiper blades. In addition, at the time of stopping the wiper blade by applying a brake to the motor, it suffices if the step for determining on the basis of the cam signals 1 and 2 whether or not the wiper blade is in the brake-controllable area is provided before the step for applying a brake to the driver-side motor or the passenger-side motor, as described in connection with FIG. 28. If it is determined in this step that the wiper blade is in the brake-controllable area, a brake may be applied to the motor, and if it is determined that the wiper blade is not in the brake-controllable area, the motor may be turned off.

A description will now be given of another embodiment of the signal generating device for generating a synchronous signal, i.e., a pulse signal, which can be used for the foregoing embodiments. FIG. 40A shows a cross-sectional view of the driver-side driving device 16. The passenger side driving device is provided with the same arrangement. In FIG. 40A, portions that are identical to those of FIG. 2 will be denoted by the same reference numerals, and description thereof will be omitted. The annular bipolar magnet M is secured to the rotating shaft 38 on the commutator 34 side in such a manner as to surround the rotating shaft 38 (FIG. 40B). The Hall element 74 is disposed in the vicinity of the magnet M in such a manner as to face the outer periphery of the magnet M. In addition, a worm 40 having one helical thread is secured to the tip portion of the rotating shaft 38.

The worm wheel 44 meshing with the worm 40 and having m teeth is rotatably accommodated in the second casing 42 coupled with the first casing 36.

Figure 41:
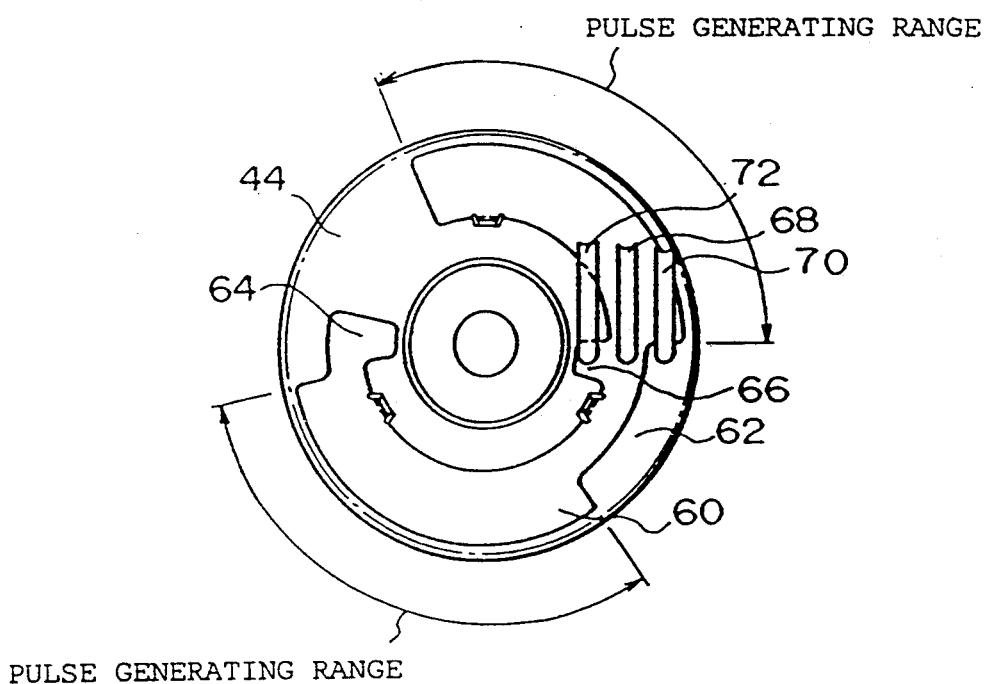
FIG. 41 is a plan view of a cam plate portion of the driving device shown in FIG. 40A.

As shown in FIG. 41, the cam plate 60 having substantially the same external configuration as that shown in FIG. 3 is secured to the other surface of the worm wheel 44 along the circumferential direction of the worm wheel 44. In FIG. 41, portions corresponding to those of FIG. 3 will be denoted by the same reference numerals, and description thereof will be omitted.

Figure 42:
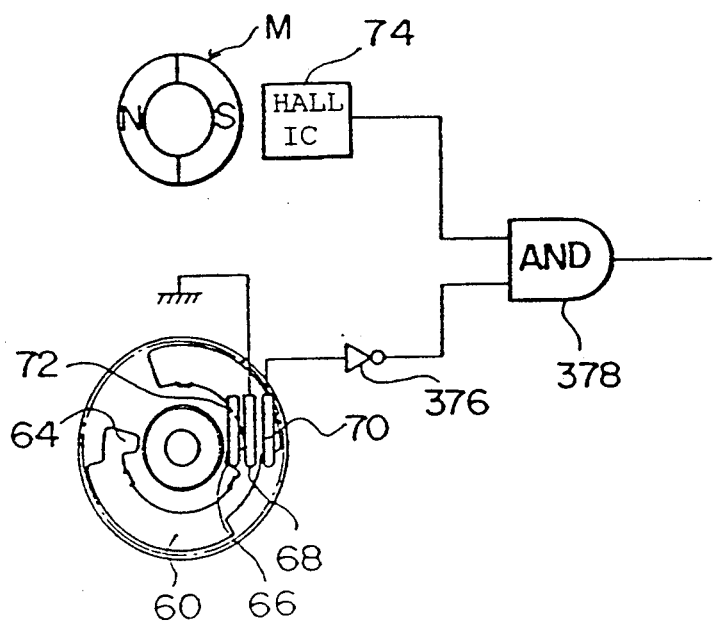
FIG. 42 is a circuit diagram of a synchronous signal generating device.

As shown in FIG. 42, the Hall element is connected to one input terminal of an AND circuit 378, and the second contact spring 70 is connected to the other input terminal of the AND circuit 378.

Figure 43:
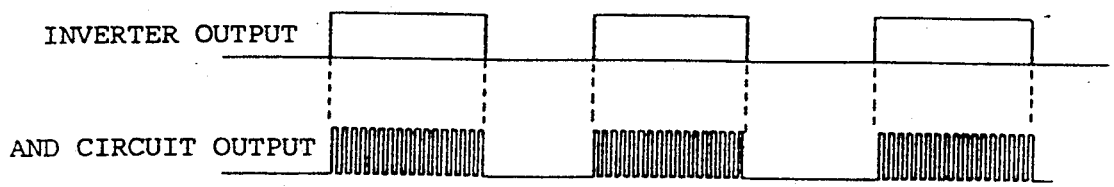
FIG. 43 is a diagram illustrating waveforms of units shown in FIG. 42.
Figure 44:
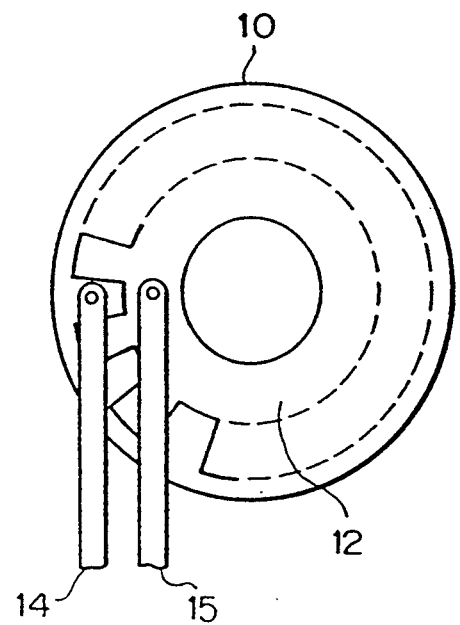
FIG. 44 is a plan view of a conventional cam plate.

The operation of this embodiment will be described hereinunder. As the rotating shaft 38 of the motor rotates, the output shaft 58 is reciprocatingly rotated within the range of a predetermined angle via the worm 40, worm wheel 44, first link 50, sector gear 48, and sector gear 56, thereby causing the wiper arm 24 to swing. Since the bipolar magnet M rotates with, the rotation of the rotating shaft 38, twice the number of pulses as the number of teeth m of the worm wheel, i.e., 2m pulses, are generated by the Hall element 74 during one revolution of the worm wheel 44. When the common contact spring 68 and the second contact spring 70 are made electrically conductive with each other by means of the cam plate 60 in conjunction with the rotation of the worm wheel 44, input terminal of the inverter 376 is grounded via the second contact spring 70, cam plate 60, and common contact spring 68. Hence, as shown in FIG. 43, a high-level rectangular pulse train is outputted from the output terminal of the inverter 376 during the time when the common contact spring 68 and the second contact spring 70 are electrically conductive. Since the pulse signal outputted from the Hall element 74 is inputted to one input terminal of the AND circuit 378, the pulse signal shown in FIG. 43 is outputted from the output terminal of the AND circuit 378 as the synchronous signal during the time when the output of the inverter 376 is at high level. By counting the number of pulses of this pulse signal, the position of the wiper blade 22 is detected, and the driver-side driving device 16 and the passenger-side driving device 18 are respectively controlled in such a manner that the driver-side wiper blade and the passenger-side wiper blade will not interfere with each other, as described before.

It should be noted that when the first contact spring 72 is brought into contact with the upper reversing projection 64, a signal representing the reversing position of the wiper blade is outputted, and when the first contact spring 72 is brought into contact with the lower reversing projection 66, a signal representing the lower reversing position, i.e., the parking position, of the wiper blade is outputted.

Although the bipolar magnet and the worm wheel having m teeth are used in the above-described embodiment, it is possible to further shorten the pulse width and pulse interval of the synchronous signal generated per revolution of the worm wheel by increasing the number of poles of the magnet or by increasing the number of teeth of the worm wheel. Thus, it is possible to effect the positional control of the wiper blade more accurately by shortening the pulse width and pulse interval of the pulse signal.

Although in the above-described embodiment the pulse signal is outputted by using the Hall element, it is possible to output the pulse signal by using a magnetism detecting element (magnetoresistance element) such as a reed switch. In addition, it is possible to use a rotor formed of a gear-shaped magnetic member instead of the magnet, and use an electromagnetic pickup having a detection coil, instead of the Hall element. In addition, although a speed-reducing mechanism comprising a worm and a worm wheel is used, it is possible to use a speed-reducing mechanism comprising a gear train, a helical gear, and the like. Furthermore, although a logical circuit comprising an inverter and an AND circuit is used in this embodiment, the signal generating device may be arranged by a combination of other logical elements. Although in this embodiment the rotation is detected by using magnetism so as to output a pulse signal, an arrangement may be alternatively provided such that a disk provided with slits is disposed in the same position as that of the magnet, and the rotation is detected by means of a photocoupler or the like so as to output the pulse signal.

What is claimed is:

1. A windshield wiper assembly comprising:
   a pair of wiper blades for wiping windshield glass;
   driving means for reciprocating said pair of wiper blades, respectively, independently of each other within wiping zones which partially overlap with each other in the vicinity of lower reversing positions of said pair of wiper blades;
   detecting means for detecting respective positions of said pair of wiper blades;
   determining means for determining on the basis of results of detection by said detecting means which of said wiper blade moving toward a upper reversing position in the wiping zone and said wiper blade moving toward the lower reversing position precedes the other; and
   control means for controlling said driving means on the basis of results of determination by said determining means in such a manner as to move said pair of wiper blades to effect wiping, and for controlling said driving means in such a manner that said wiper blade moving toward the lower reversing position is stopped when said wiper blade moving toward the lower reversing position has preceded said wiper blade moving toward the upper reversing position by a first predetermined value or more, and said wiper blade moving toward the upper reversing position is stopped when said wiper blade moving toward the upper reversing position has preceded said wiper blade moving toward the lower reversing position by a second predetermined value or more exceeding the first predetermined value.

2. A windshield wiper assembly according to claim 1, wherein said control means further controls said driving means in such a manner that said wiper blade moving toward the lower reversing position is stopped suddenly when said wiper blade moving toward the lower reversing position has preceded the other wiper blade by a third predetermined value or more exceeding the first predetermined value.

3. A windshield wiper assembly according to claim 2, wherein a motor is used as said driving means, and each of said pair of wiper blades is stopped suddenly by shortcircuiting brushes of said motor.

4. A windshield wiper assembly according to claim 1, wherein said control means further controls said driving means in such a manner that said wiper blade moving toward the lower reversing position in a predetermined area of the wiping zone is stopped suddenly when said wiper blade moving toward the lower reversing position has preceded the other wiper blade by a third predetermined value or more exceeding the first predetermined value.

5. A windshield wiper assembly according to claim 4, wherein said predetermined area is an overlapping area in which the wiping zones partially overlap with each other, or a specific area including the overlapping area.

6. A windshield wiper assembly according to claim 1, wherein said determining means determines on the basis of the results of detection by said detecting means which of said pair of wiper blades precedes the other, and said control means controls said driving means on the basis of the results of determination by said determining means in such a manner as to move said pair of wiper blades so as to effect wiping, and controls said driving means in such a manner that said wiper blade moving in a direction of approaching an overlapping area is stopped when said wiper blade moving in the direction of approaching the overlapping area has preceded said wiper blade moving in a direction of moving away from the overlapping area by the first predetermined value or more, and that said wiper blade moving in the direction of moving away from the overlapping area is stopped when said wiper blade moving in the direction of moving away from the overlapping area has preceded said wiper blade moving in the direction of approaching the overlapping area by the second predetermined value or more exceeding the first predetermined value.

7. A windshield wiper assembly according to claim 6, wherein said control means further controls said driving means in such a manner that said wiper blade moving in the direction of approaching the overlapping area is stopped suddenly when said wiper blade moving in the direction of approaching the overlapping area has preceded by a third predetermined value or more exceeding the first predetermined value with said wiper blade moving in the direction of moving away from the overlapping area being located in the overlapping area.

8. A windshield wiper assembly according to claim 1, wherein said driving means comprises speed-reducing means having a motor and a plurality of gears and adapted to reduce a rotational speed of a rotating shaft of said motor so as to transmit torque of said motor to a driven shaft connected to a wiper arm, and
   said detecting means comprises a cam plate disposed on a driven shaft-side gear of said speed-reducing means, a contact spring adapted to be brought into contact with said cam plate, and signal outputting means for outputting a pulse signal responsive to the rotation of said driven shaft-side gear within a predetermined range of a rotational angle of said gear in correspondence with a state of contact between said cam plate and said contact spring and for outputting a reversing signal at positions corresponding to the upper reversing position and the lower reversing position.

9. A windshield wiper assembly according to claim 1, wherein said driving means comprises speed-reducing means having a motor and a plurality of gears and adapted to reduce a rotational speed of a rotating shaft of said motor so as to transmit torque of said motor to a driven shaft connected to a wiper arm, and
   said detecting means comprises rotating means secured to said rotating shaft of said motor in such a manner as to rotate with said rotating shaft of said motor, pulse signal generating means for generating a pulse signal in conjunction with rotation of said rotating means, and signal outputting means having a cam plate disposed on a driven shaft-side gear of said speed-reducing means and a contact spring adapted to be brought into contact with said cam plate, said signal outputting means being adapted to output a signal which is set at a predetermined level within a predetermined range of a rotational angle of said driven shaft-side gear.

10. A windshield wiper assembly according to claim 9, further comprising a logical circuit for allowing the pulse signal outputted from said pulse signal generating means to be passed therethrough as a synchronous signal when the signal is outputted from said signal outputting means.

11. A windshield wiper assembly comprising:
a pair of wiper blades for wiping windshield glass;
driving means for reciprocating said pair of wiper blades, respectively, independently of each other within wiping zones which partially overlap with each other in the vicinity of lower reversing positions of said pair of wiper blades;
detecting means for detecting respective positions of said pair of wiper blades;
determining means for determining on the basis of results of detection by said detecting means which of said pair of wiper blades precedes the other; and
control means for controlling said driving means on the basis of the results of determination by said determining means in such a manner as to move said pair of wiper blades in a same direction so as to effect wiping, and for controlling said driving means in such a manner that said wiper blade moving in a direction of approaching an overlapping area is stopped when said wiper blade moving in the direction of approaching the overlapping area has preceded said wiper blade moving in a direction of moving away from the overlapping area by a first predetermined value or more, and that said wiper blade moving in the direction of moving away from the overlapping area is stopped when said wiper blade moving in the direction of moving away from the overlapping area has preceded said wiper blade moving in the direction of approaching the overlapping area by a second predetermined value or more exceeding the first predetermined value.

12. A windshield wiper assembly according to claim 11, wherein said control means further controls said driving means in such a manner that said wiper blade moving in the direction of approaching the overlapping area is stopped suddenly when said wiper blade moving in the direction of approaching the overlapping area has preceded by a third predetermined value or more exceeding the first predetermined value with said wiper blade moving in the direction of moving away from the overlapping area being located in the overlapping area or in a predetermined area including the overlapping area.

13. A windshield wiper assembly according to claim 11, wherein said driving means comprises speed-reducing means having a motor and a plurality of gears and adapted to reduce a rotational speed of a rotating shaft of said motor so as to transmit torque of said motor to a driven shaft connected to a wiper arm, and
said detecting means comprises a cam plate disposed on a driven shaft-side gear of said speed-reducing means, a contact spring adapted to be brought into contact with said cam plate, and signal outputting means for outputting a pulse signal responsive to rotation of said driven shaft-side gear within a predetermined range of a rotational angle of said gear in correspondence with a state of contact between said cam plate and said contact spring and for outputting a reversing signal at positions corresponding to an upper reversing position and a lower reversing position.

14. A windshield wiper assembly according to claim 11, wherein said driving means comprises speed-reducing means having a motor and a plurality of gears and adapted to reduce a rotational speed of a rotating shaft of said motor so as to transmit torque of said motor to a driven shaft connected to a wiper arm, and
said detecting means comprises rotating means secured to said rotating shaft of said motor in such a manner as to rotate with said rotating shaft of said motor, pulse signal generating means for generating a pulse signal in conjunction with rotation of said rotating means, and signal outputting means having a cam plate disposed on a driven shaft-side gear of said speed-reducing means and a contact spring adapted to be brought into contact with said cam plate, said signal outputting means being adapted to output a signal which is set at a predetermined level within a predetermined range of a rotational angle of said driven shaft-side gear.

15. A windshield wiper assembly according to claim 14, further comprising a logical circuit for allowing the pulse signal outputted from said pulse signal generating means to be passed therethrough as a synchronous signal when the signal is outputted from said signal outputting means.

16. A windshield wiper assembly according to claim 11, wherein a motor is used as said driving means, and each of said pair of wiper blades is stopped suddenly by shortcircuiting brushes of said motor.

* * * * *

UNITED STATES PATENT AND TRADEMARK OFFICE
CERTIFICATE OF CORRECTION

PATENT NO. : 5,256,950
DATED     : 26 October 1993
INVENTOR(S) : Hiroshi MATSUMOTO et al.

It is certified that error appears in the above-identified patent and that said Letters Patent is hereby corrected as shown below:

Title page, item

"[73] Assignee: ASMO Co., Ltd., Osai, Japan" should be corrected to read:

--[73] Assignee: ASMO Co., Ltd., Kosai, Japan--.

Signed and Sealed this

Ninth Day of August, 1994

Attest:

BRUCE LEHMAN

Attesting Officer

Commissioner of Patents and Trademarks